US010578732B2

(12) United States Patent
Jiang et al.

(10) Patent No.: US 10,578,732 B2
(45) Date of Patent: *Mar. 3, 2020

(54) LOCATION MEASUREMENT REPORTING

(71) Applicant: Intel IP Corporation, Santa Clara, CA (US)

(72) Inventors: Feng Jiang, Santa Clara, CA (US); Jonathan Segev, Sunnyvale, CA (US); Chittabrata Ghosh, Fremont, CA (US); Qinghua Li, San Ramon, CA (US); Robert J. Stacey, Portland, OR (US); Po-Kai Huang, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,728

(22) Filed: Jun. 13, 2019

(65) Prior Publication Data

US 2019/0361108 A1 Nov. 28, 2019

Related U.S. Application Data

(63) Continuation of application No. 16/127,860, filed on Sep. 11, 2018, now Pat. No. 10,365,362.
(Continued)

(51) Int. Cl.
*H04L 12/42* (2006.01)
*G01S 13/76* (2006.01)
(Continued)

(52) U.S. Cl.
CPC ............ *G01S 13/765* (2013.01); *H04W 24/10* (2013.01); *H04W 4/025* (2013.01); *H04W 4/20* (2013.01); *H04W 4/33* (2018.02); *H04W 4/80* (2018.02)

(58) Field of Classification Search
CPC ..... H04L 12/403; H04L 12/417; H04L 12/43; H04L 12/433; H04L 74/06; G01S 13/765;
(Continued)

(56) References Cited

U.S. PATENT DOCUMENTS 9,559,884 B2 * 1/2017 Davydov ............... H04B 7/024
10,365,362 B2 7/2019 Jiang et al.
(Continued)

OTHER PUBLICATIONS

"U.S. Appl. No. 16/127,860, Notice of Allowance dated Mar. 13, 2019", 15 pgs.

*Primary Examiner* — Huy C Ho
(74) *Attorney, Agent, or Firm* — Schwegman Lundberg & Woessner, P.A.

(57) ABSTRACT

Methods, apparatuses, and computer readable media for location measurement reporting in a wireless network are disclosed. An apparatus of an initiator station (ISTA), where the apparatus comprises processing circuitry configured to encode a null data packet announce (NDPA) frame for transmission to a responder station (RSTA), the NDPA frame indicating a sounding sequence number, and encode a first null data packet (NDP) for transmission at a time T1 to the RSTA. The processing circuitry may be further configured to: decode a second NDP, the second NDP received from the RSTA, wherein the second NDP is received at a time T4, and decode a first location measurement report (LMR). The processing circuitry may be further configured to in response to an ISTA-to-RSTA LMR feedback agreement between the RSTA and ISTA indicating the ISTA is to send a second LMR, encode a second LMR.

20 Claims, 37 Drawing Sheets

Related U.S. Application Data

(60) Provisional application No. 62/556,969, filed on Sep. 11, 2017, provisional application No. 62/578,993, filed on Oct. 30, 2017.

(51) Int. Cl.
  *H04W 24/10*  (2009.01)
  *H04W 4/33*  (2018.01)
  *H04W 4/80*  (2018.01)
  *H04W 4/02*  (2018.01)
  *H04W 4/20*  (2018.01)

(58) Field of Classification Search
  CPC ......... H04W 24/10; H04W 4/33; H04W 4/80; H04W 4/025; H04W 4/20
  USPC ....................................................... 370/450
  See application file for complete search history.

(56) References Cited

U.S. PATENT DOCUMENTS

| | | | |
|---|---|---|---|
| 2011/0116386 A1* | 5/2011 | Blanchard | H04B 7/155 370/242 |
| 2018/0249437 A1 | 8/2018 | Lindskog et al. | |
| 2018/0292518 A1* | 10/2018 | Chu | G01S 5/0205 |
| 2018/0310133 A1 | 10/2018 | Ramasamy et al. | |
| 2019/0041509 A1 | 2/2019 | Jiang et al. | |

\* cited by examiner

| CATEGORY | PUBLIC ACTION | DIALOG TOKEN | TOD (N) | TOA (N) | TOD ERROR (N) | TOA ERROR (N) | TOD (N-1) | TOA (N-1) | TOD ERROR (N-1) | TOA ERROR (N-1) |
|---|---|---|---|---|---|---|---|---|---|---|
| 1802 | 1804 | 1806 | 1808 | 1810 | 1812 | 1814 | 1816 | 1818 | 1820 | 1822 |

1800

| HE TB PPDU LENGTH | RU ALLOCATION | DL TX POWER | UL TARGET RSSI | UL MCS | RESERVED |
|---|---|---|---|---|---|
| 2502 | 2504 | 2506 | 2508 | 2510 | 2510 |

FIG. 25

LOCATION MEASUREMENT REPORTING

PRIORITY CLAIM

This application is a continuation of U.S. patent application Ser. No. 16/127,860, filed Sep. 11, 2018, which claims the benefit of priority under 35 U.S.C. 119(e) to U.S. Provisional Patent Application Ser. No. 62/556,969, filed Sep. 11, 2017, and U.S. Provisional Patent Application Ser. No. 62/578,993, filed Oct. 30, 2017, each of which is incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11az, IEEE 802.11ax, and/or IEEE 802.11 extremely high-throughput (EHT). Some embodiments relate to location measurement reporting (LMR).

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIG. 25 illustrates a trigger response scheduling (TRS) control field in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to methods, computer readable media, and apparatus for ordering or scheduling location measurement reports, traffic indication maps (TIMs), and other information during SPs. Some embodiments relate to methods, computer readable media, and apparatus for extending TIMs. Some embodiments relate to methods, computer readable media, and apparatus for defining SPs during beacon intervals (BI), which may be based on TWTs.

Figure 1:
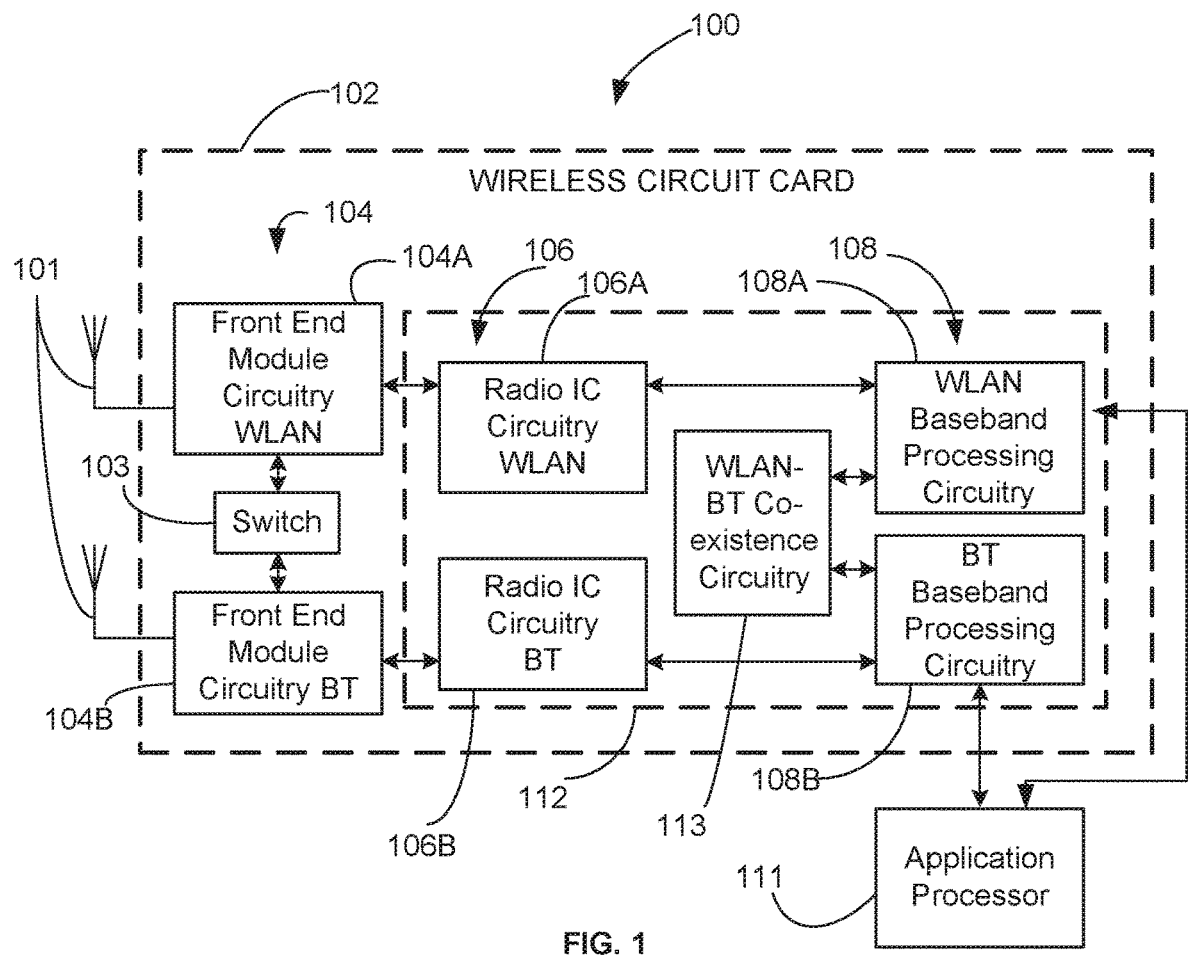
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE)

standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
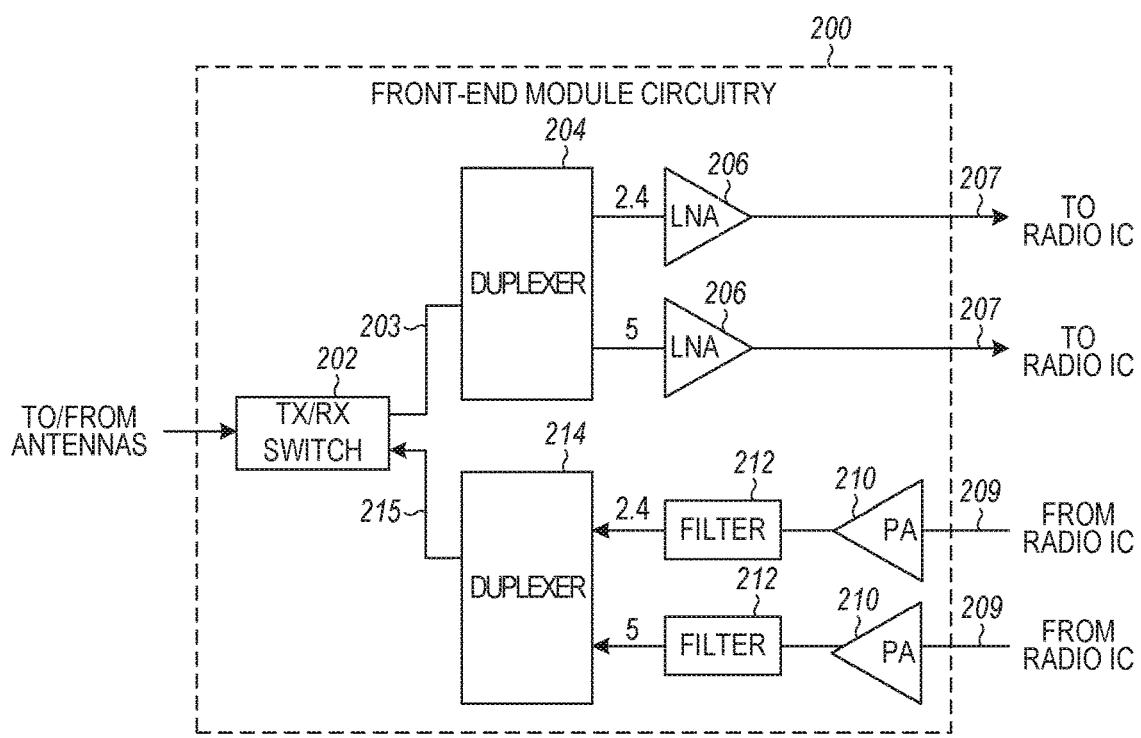
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
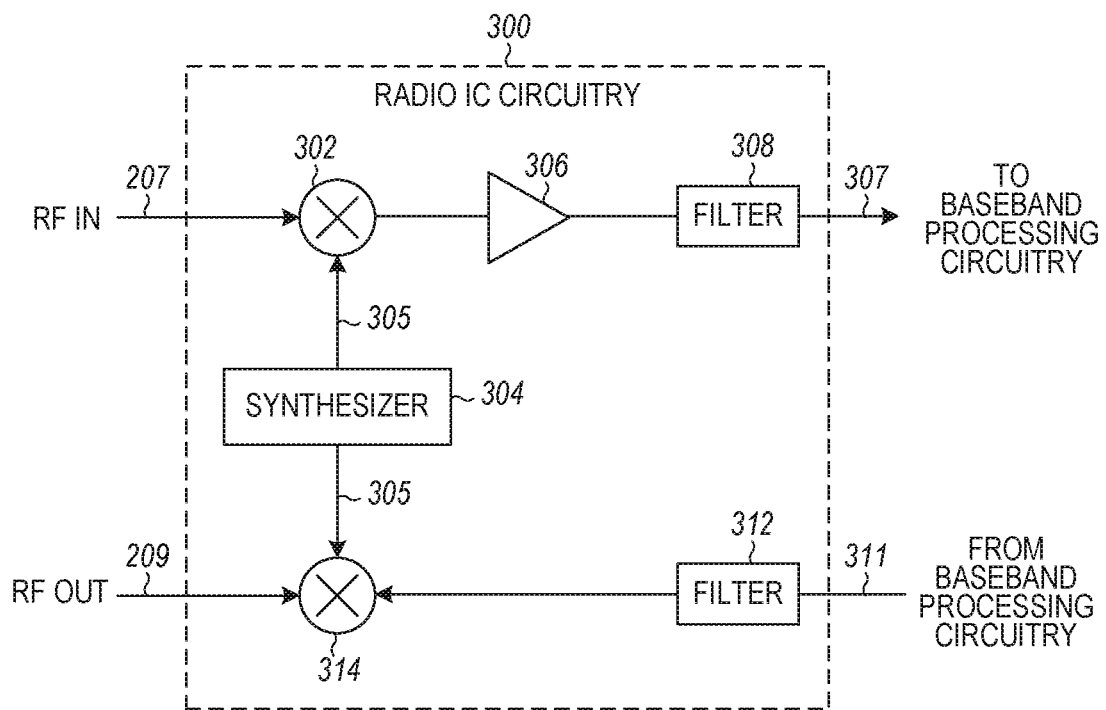
FIG. 3 illustrates a radio IC circuitry for use in the radio architecture of FIG. 1 in accordance with some embodiments.

FIG. 3 illustrates radio integrated circuit (IC) circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
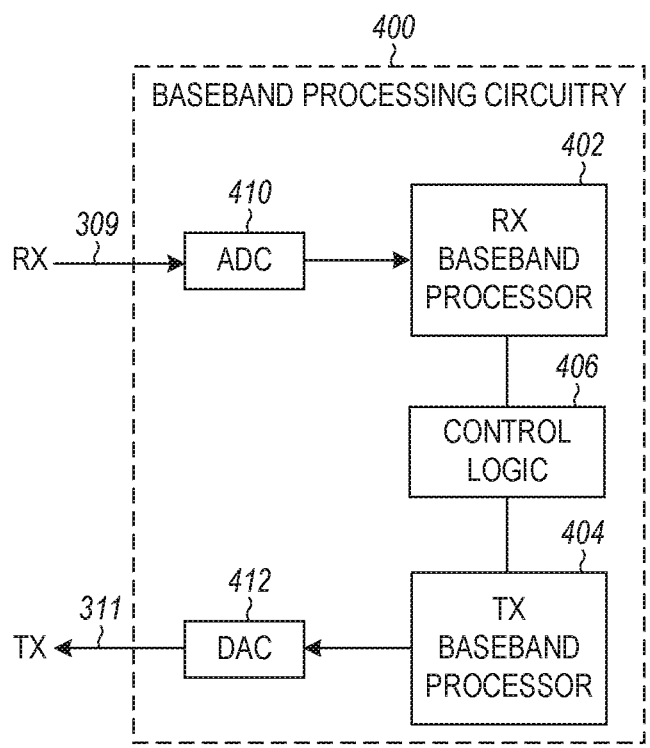
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
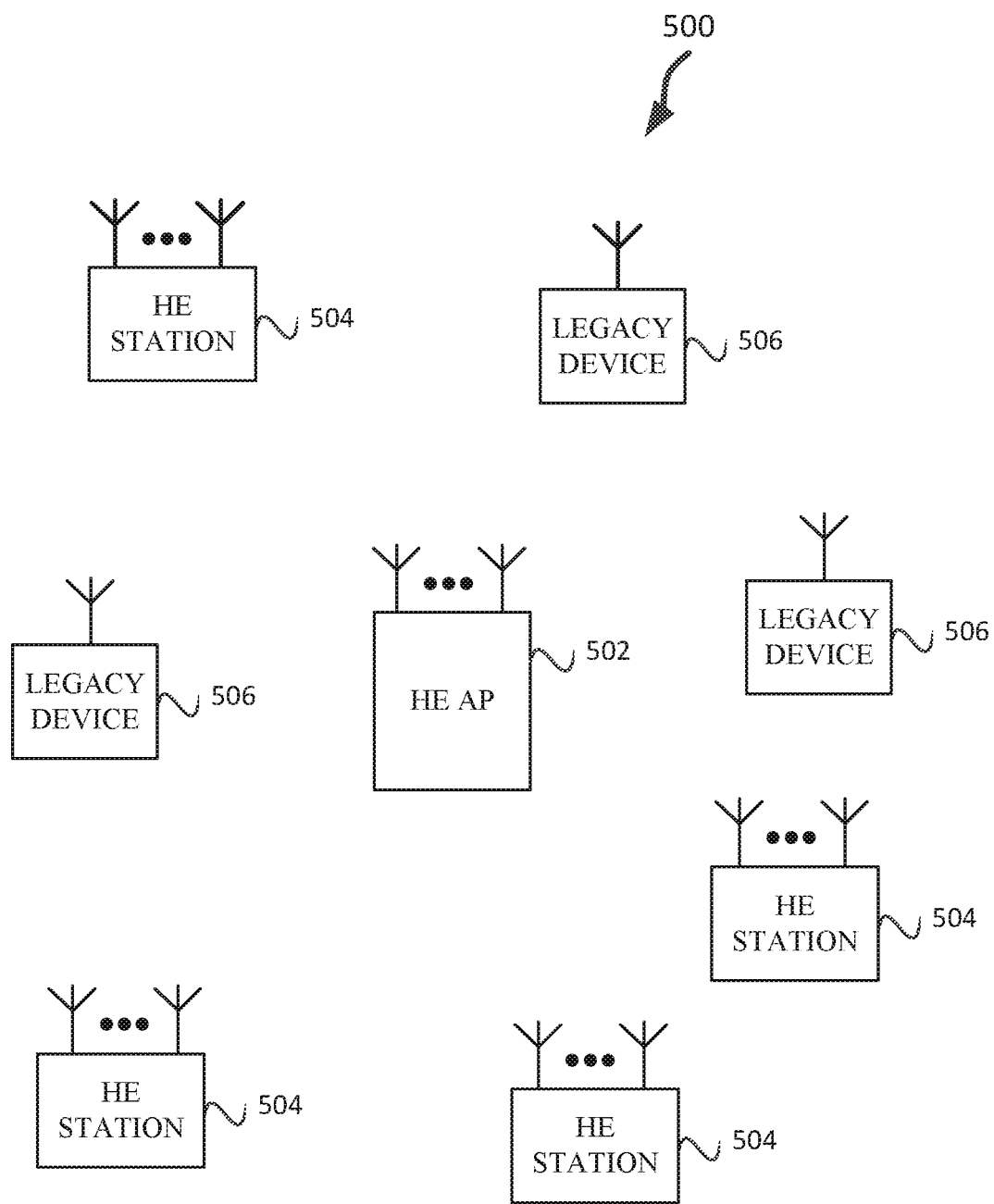
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be termed an AP, a plurality of HE (e.g., IEEE 802.11ax) stations (STAs) 504, and a plurality of legacy (e.g., IEEE 802.11g/n/ac) devices 506. In some embodiments, the HE STAs 504 and/or HE AP 502 are configured to operate in accordance with IEEE 802.11 extremely high throughput (EHT). In some embodiments, the HE STAs 504 and/or HE AP 520 are configured to operate in accordance with IEEE 802.11az. In some embodiments, IEEE 802.11EHT may be termed Next Generation 802.11.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may be IEEE 802.11 next generation. The EHT protocol may be termed a different name in accordance with some embodiments. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one EHT AP 502 that is part of an extended service set (ESS). A controller (not illustrated) may store information that is common to the more than one HE APs 502 and may control more than one BSS, e.g., assign primary channels, colors, etc. HE AP 502 may be connected to the internet.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. In some embodiments, when the HE AP 502 and HE STAs 504 are configured to operate in accordance with IEEE 802.11EHT, the legacy devices 506 may include devices that are configured to operate in accordance with IEEE 802.11ax. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11EHT or another wireless protocol. In some embodiments, the HE STAs 504 may be termed extremely high throughput (EHT) stations or stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE or EHT frame may be configurable to have the same bandwidth as a channel. The HE or EHT frame may be a physical Layer Convergence Procedure (PLCP) Protocol Data Unit (PPDU). In some embodiments, there may be different types of PPDUs that may have different fields and different physical layers and/or different media access control (MAC) layers. For example, a single user (SU) PPDU, multiple-user (MU) PPDU, extended-range (ER) SU PPDU, and/or trigger-based (TB) PPDU. In some embodiments EHT may be the same or similar as HE PPDUs.

The bandwidth of a channel may be 20 MHz, 40 MHz, or 80 MHz, 80+80 MHz, 160 MHz, 160+160 MHz, 320 MHz, 320+320 MHz, 640 MHz bandwidths. In some embodiments, the bandwidth of a channel less than 20 MHz may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE or EHT frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, low-power BlueTooth®, or other technologies.

In accordance with some IEEE 802.11 embodiments, e.g., IEEE 802.11EHT/ax embodiments, a HE AP 502 may operate as a master station which may be arranged to contend for a wireless medium (e.g., during a contention period) to receive exclusive control of the medium for a transmission opportunity (TXOP). The HE AP 502 may transmit a EHT/HE trigger frame transmission, which may include a schedule for simultaneous UL transmissions from HE STAs 504. The HE AP 502 may transmit a time duration of the TXOP and sub-channel information. During the TXOP, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE or EHT control period, the HE AP 502 may communicate with HE stations 504 using one or more HE or EHT frames. During the TXOP, the HE STAs 504 may operate on a sub-channel smaller than the operating range of the HE AP 502. During the TXOP, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE or EHT TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 or IEEE 802.11EHT/ax communication techniques, although this is not a requirement.

In some embodiments the HE station 504 may be a "group owner" (GO) for peer-to-peer modes of operation. A wireless device may be a HE station 502 or a HE AP 502.

In some embodiments, the HE STA 504 and/or HE AP 502 may be configured to operate in accordance with IEEE 802.11mc. In example embodiments, the radio architecture of FIG. 1 is configured to implement the HE STA 504 and/or the HE AP 502. In example embodiments, the front-end module circuitry of FIG. 2 is configured to implement the HE STA 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-41.

In example embodiments, the HE station 504 and/or the HE AP 502 are configured to perform the methods and operations/functions described herein in conjunction with FIGS. 1-41. In example embodiments, an apparatus of the EHT station 504 and/or an apparatus of the HE AP 502 are configured to perform the methods and functions described herein in conjunction with FIGS. 1-41. The term Wi-Fi may refer to one or more of the IEEE 802.11 communication standards. AP and STA may refer to EHT/HE access point 502 and/or EHT/HE station 504 as well as legacy devices 506.

In some embodiments, a HE AP STA may refer to a HE AP 502 and/or a HE STAs 504 that is operating as a HE APs 502. In some embodiments, when a HE STA 504 is not operating as a HE AP, it may be referred to as a HE non-AP STA or HE non-AP. In some embodiments, HE STA 504 may be referred to as either a HE AP STA or a HE non-AP.

Figure 6:
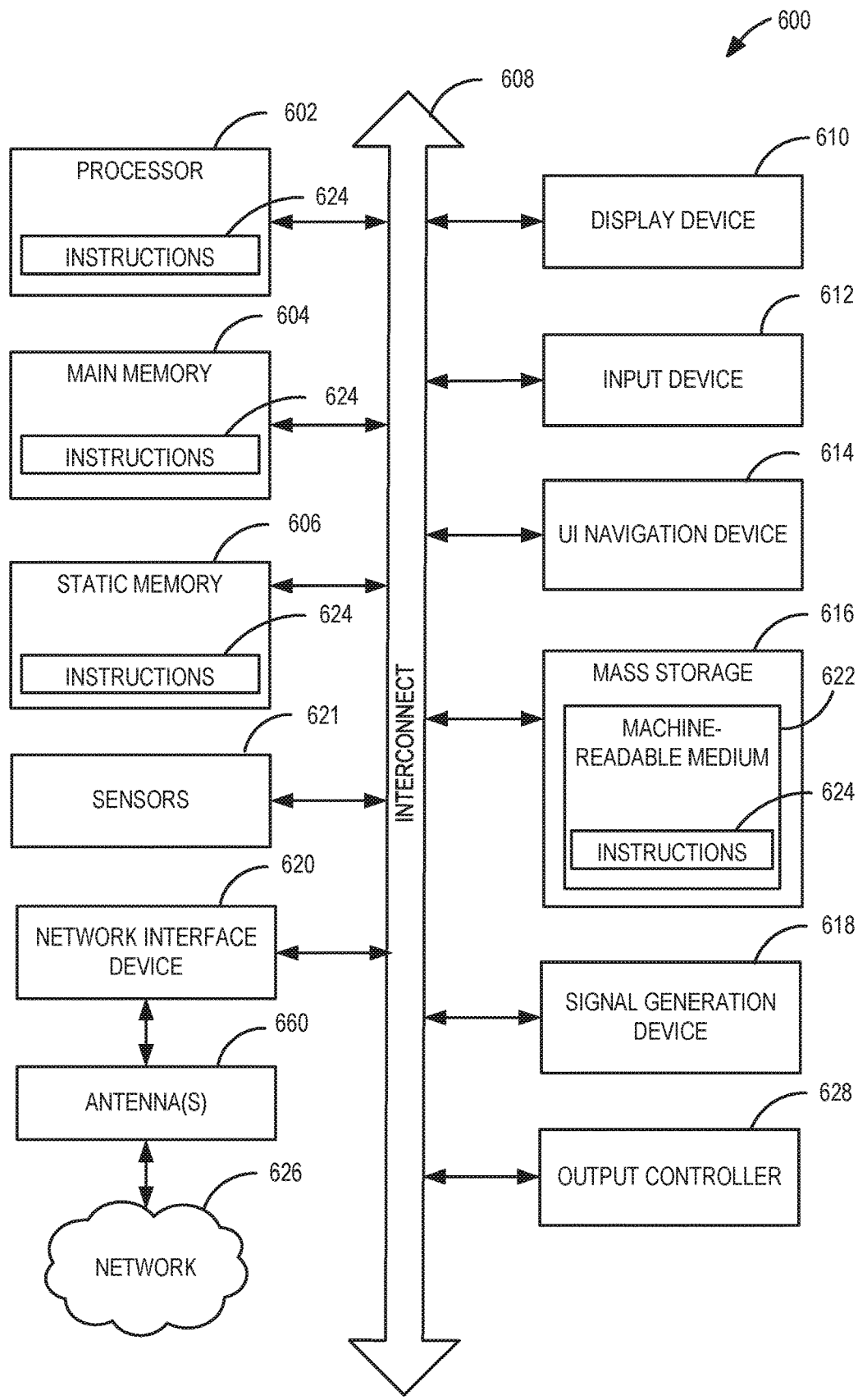
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, EVT station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
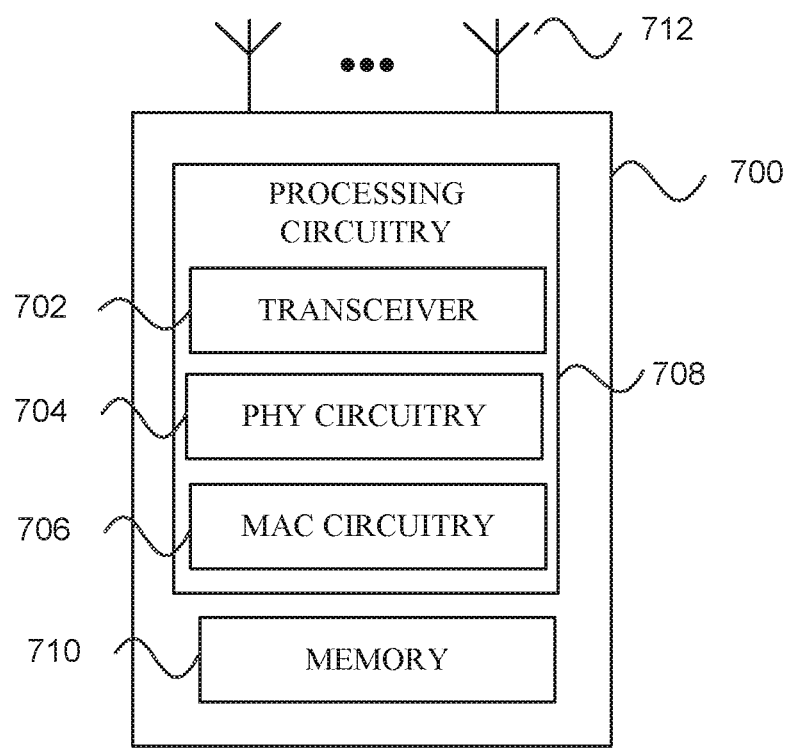
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device or HE wireless device. The wireless device 700 may be a HE STA 504, HE AP 502, and/or a HE STA or HE AP. A HE STA 504, HE AP 502, and/or a HE AP or HE STA may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Figure 8:
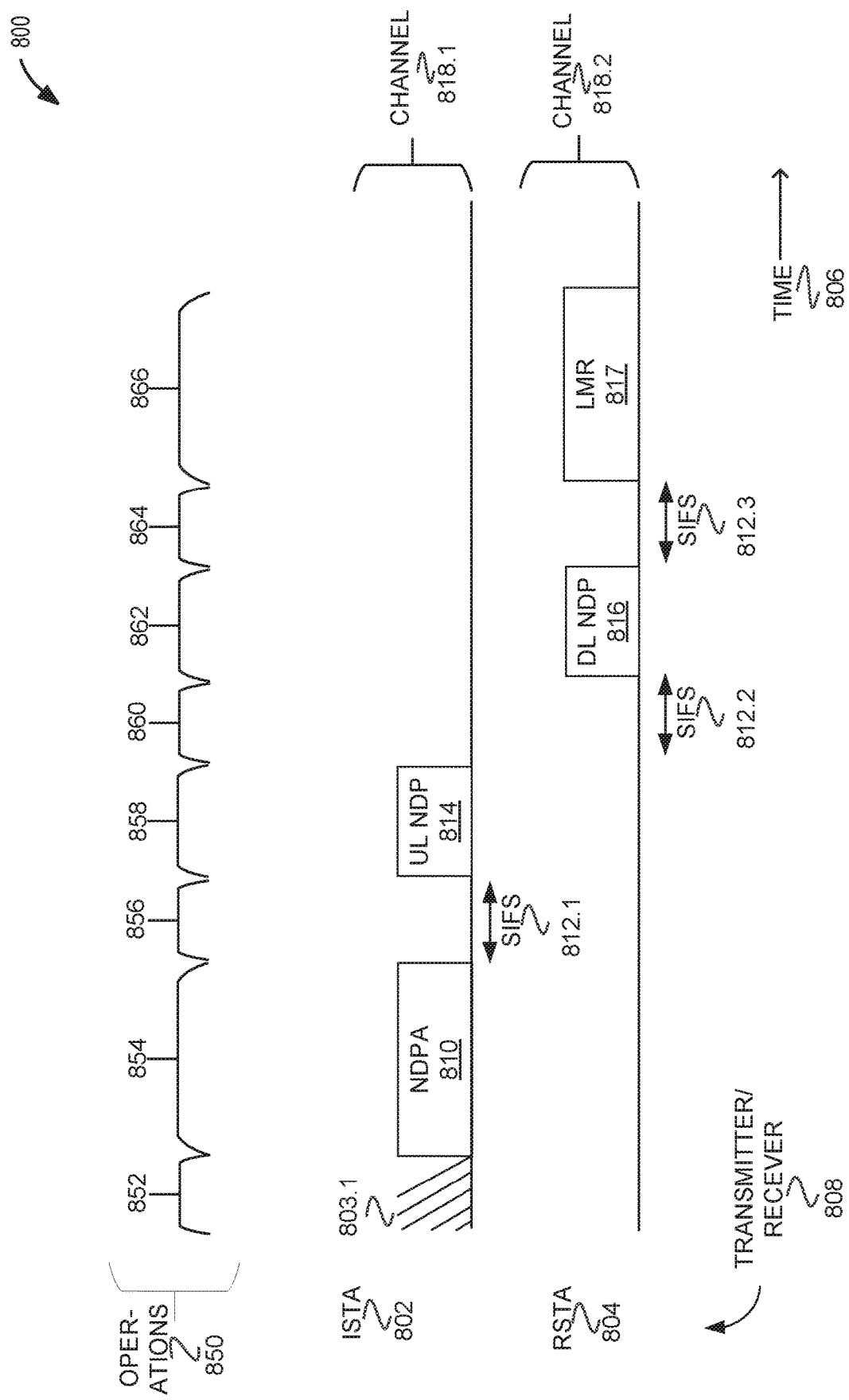
FIGS. 8 and 9 illustrates a method for LMR in accordance with some embodiments.
Figure 9:
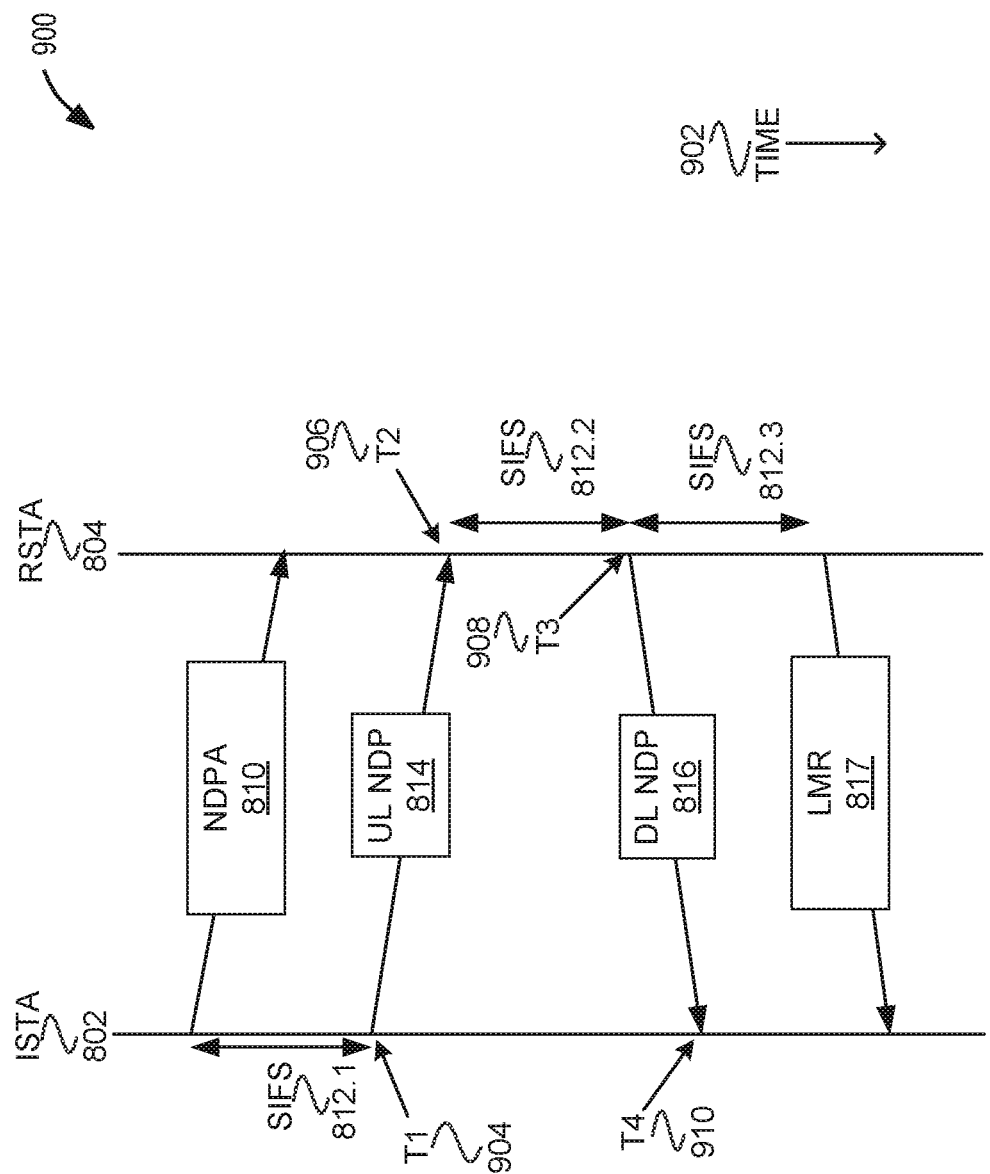

FIGS. 8 and 9 illustrates a method for LMR 800 in accordance with some embodiments. Illustrated in FIG. 8 is time 806 along a horizontal axis, transmitter/receiver 808, initiator STA (ISTA) 802, responder STA (RSTA) 804, channels 818, and operations 850 along the top. Illustrated in FIG. 9 is ISTA 802, RSTA 804, and time 902 along a vertical axis.

The ISTA 802 may be a HE STA 504 or HE AP 502 as described in conjunction with FIG. 5, e.g., ISTA and RSTA may be configured to operate in accordance with IEEE 802.11az. Channel 818.1 and channel 818.2 may be a subband, e.g., 20 MHz, of a bandwidth, e.g., 320 MHz, and may be a number of tones or subcarriers. Channel 818.1 and channel 818.2 may be the same channel. Channel 818.1 and channel 818.2 may partially overlap.

The method 800 begins at operation 852 with the ISTA 802 contending for the wireless medium 803.1, e.g., channel 818.1. The method 800 continues at operation 854 with ISTA 802 transmitting a NDP announce (NDPA) frame 810. A duration field (e.g., 1504) of the NDPA frame 810 may indicate a TXOP duration that may include to the end of the transmission of LMR 817. For example, the NDPA frame 810 may be NDPA frame 1500. NDPA frame 810 may be addressed to RSTA 804, e.g., the RA field 1506 may include a MAC address that addresses RSTA 804 and/or a STA Info field 1512 may include a AID field 1516 that addresses RSTA 804. The NDPA frame 810 may address other RSTAs 804 (not illustrated). The NDPA 810 may be different from NDPA 1500.

FIG. 9 illustrates the transmitting of NDPA 810. The method 800 continues at operation 856 with waiting a short interframe space (SIFS) 812.1. FIG. 9 illustrates ISTA 802 waiting SIFS 812.1. The method 800 continues at operation 858 with transmitting uplink (UL) NDP 814. The UL NDP 814 may be packet that does not include a data portion. FIG. 9 illustrates ISTA 802 transmitting UL NDP 814 at time T1 904. FIG. 9 illustrates RSTA 804 receiving UL NDP 814 at time T2 906.

The method 800 may continue at operation 860 with RSTA 804 waiting SIFS 812.2. FIG. 9 illustrates RSTA 804 waiting SIFS 812.2. The method 800 continues at operation 862 with RSTA 804 transmitting downlink (DL) NDP 816. FIG. 9 illustrates RSTA 804 transmitting DL NDP 816 at time T3 908, and ISTA 802 receiving DL NDP 816 at time T4 910.

The method 800 continues at operation 864 with RSTA 804 waiting SIFS 812.3. FIG. 9 illustrates RSTA 804 waiting SIFS 812.3. The method 800 continues at operation 866 with RSTA 804 transmitting LMR 817. FIG. 9 illustrates RSTA 804 transmitting LMR 817. The LMR 817 may be a LMR frame 1700, 1800, or 1900. The LMR 817 may include times T2 906 and T3 908. ISTA 802 will then have T1 904, T2 906, T3 908, and T4 910. ISTA 802 may then determine a Round Trip Time (RTT) in accordance with equation (1): RTT= [(T4−T1)−(T3−T2)]. The RTT may be used to determine a distance between RSTA 804 and ISTA 802. The LMR 817 may include a CSI 1902. In accordance with some embodiments, the ISTA 802 does not acknowledge the receipt of the LMR 817.

The RSTA 804 may have transmitted the LMR 817 because a LMR type of reporting may have been set to immediate, e.g., immediate/delayed which may have been set to immediate in a negotiation between ISTA 802 and RSTA 804.

In some embodiments, if the UL NDP 814 was received in error and/or the DL NDP 816 was transmitted in error, the LMR 817 may indicate that an error occurred, e.g., by setting a value of the TOA field 1712 to zero, or a value of a TOA Error field 1714 to a maximum value.

Figure 10:
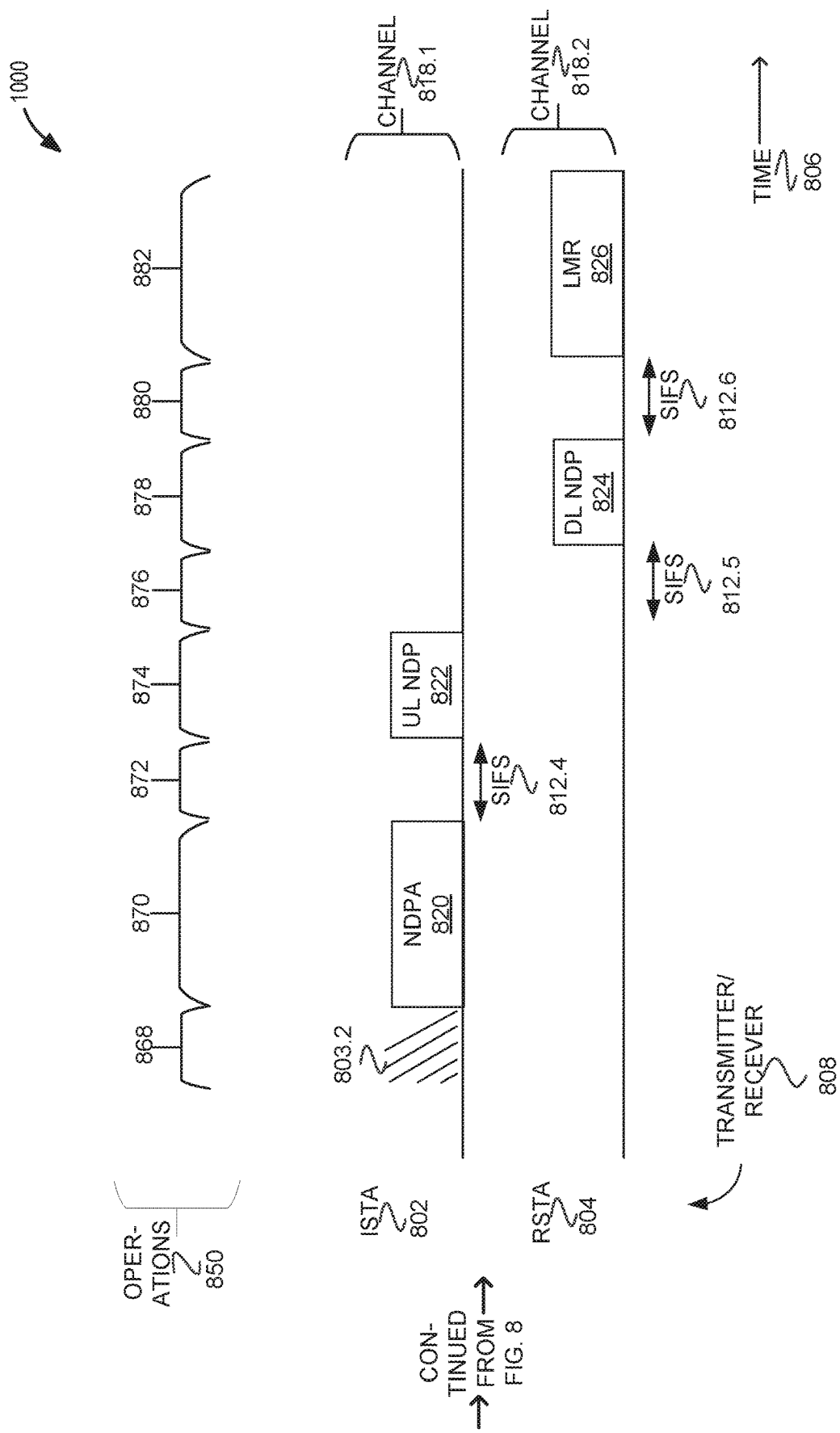
FIG. 10 illustrates a method for LMR in accordance with some embodiments.

FIG. 10 illustrates a method for LMR 1000 in accordance with some embodiments. FIG. 10 may be a continuation of FIG. 8 in accordance with some embodiments. The method 1000 may continue at operation 868 with ISTA 802 contending for the wireless medium 803.2, e.g., channel 818.1, and obtaining access to the wireless medium. The method 1000 continues at operation 870 with the ISTA 802 transmitting NDPA frame 820, e.g., NDPA frame 1500. The method 1000 continues at operation 872 with ISTA 802 waiting a SIFS 812.4. The method 1000 continues at operation 874 with the ISTA 802 transmitting UL NDP 822. UL NDP 822 may be the same or similar to UL NDP 814.

The method 1000 continues at operation 876 with RSTA 804 waiting a SIFS 812.5 after receiving UL NDP 822. The method 1000 continues at operation 878 with RSTA 804 transmitting DL NDP 824. DL NDP 824 may be the same or similar as DL NDP 816. The method 1000 may continue at operation 880 with RSTA 804 waiting a SIFS 812.6. The method 1000 may continue at operation 882 with RSTA 804 transmitting LMR 826. The LMR 826 may include information, e.g., LMR frame 1700, 1800, or 1900. The LMR 826 information may be for this round if immediate/delayed is set to immediate (e.g., in accordance with a field or negotiation prior to operation 852) and from the last round (e.g., FIG. 8) if immediate/delayed is determined to be delayed in accordance with a field or a previous negotiation prior to operation 852. In some embodiments, the LMR frame 1700, 1800, 1900 may include information for a different round or FTM sequence. In some embodiments, round and FTM sequence may be used interchangeably.

Figure 11:
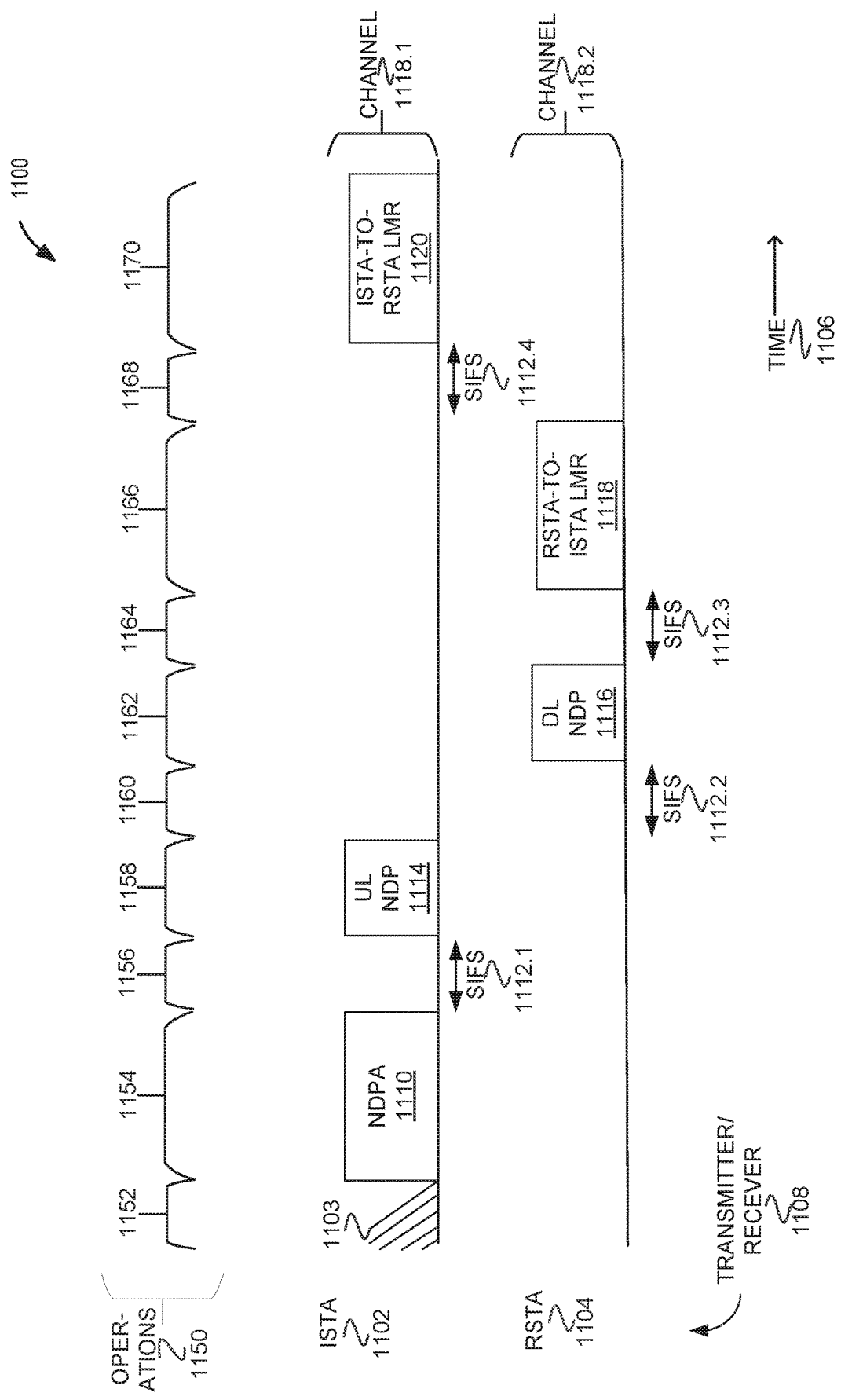
FIG. 11 illustrates a method for LMR in accordance with some embodiments.

FIG. 11 illustrates a method for LMR 1100 in accordance with some embodiments. Illustrated in FIG. 11 is time 1106 along a horizontal axis, transmitter/receiver 1108, ISTA 1102, RSTA 1104, channels 1118, and operations 1150 along the top. ISTA 1102 may be the same or similar as ISTA 802. RSTA 1104 may be the same or similar as RSTA 804.

Channel 1118.1 and channel 1118.2 may be a sub-band, e.g., 20 MHz, of a bandwidth, e.g., 320 MHz, and may be a number of tones or subcarriers. Channel 1118.1 and channel 1118.2 may be the same channel. Channel 818.1 and channel 818.2 may partially overlap.

The method 1100 begins at operation 1152 with the ISTA 802 contending for the wireless medium 1103, e.g., channel 1118.1. ISTA 1102 may gain access to channel 1118.1. The method 1100 continues at operation 1154 with ISTA 1102 transmitting a NDPA frame 1110. A duration field (e.g., 1504) of the NDPA frame 1110 may indicate a TXOP duration that may include to the end of the transmission of ISTA-to-RSTA LMR 1120. In accordance with some embodiments, ISTA-to-RSTA LMR and LMR may be used interchangeably. In accordance with some embodiments RSTA-to-ISTA LMR and LMR may be used interchangeably. The NDPA frame 1110 may be NDPA frame 1500, in accordance with some embodiments. NDPA frame 1110 may be addressed to RSTA 1104, e.g., the RA filed 1506 may include a MAC address that addresses RSTA 804 and/or a STA Info field 1512 may include a AID field 1516 that addresses RSTA 1104. The NDPA frame 1110 may address other RSTAs 1104 (not illustrated). The NDPA 1110 may be different from NDPA 1500. The NDPA 1110 may be a trigger frame.

The method 1100 continues at operation 1156 with ISTA 1102 waiting a SIFS 1112.1. The method 1100 continues at operation 1158 with transmitting UL NDP 1114. The UL NDP 1114 may be packet that does not include a data portion.

The method 1100 may continue at operation 1160 with RSTA 1104 waiting SIFS 1112.2. The method 1100 continues at operation 1162 with RSTA 804 transmitting DL NDP 1116. The DL NDP 1116 may be packet that does not include a data portion.

The method 1100 continues at operation 1164 with RSTA 1104 waiting SIFS 1112.3. The method 1100 continues at operation 1166 with RSTA 1104 transmitting RSTA-TO-ISTA LMR 1118. The RSTA-TO-ISTA LMR 1118 may be a LMR frame 1700, 1800, or 1900. The LMR 1118 may include times as described in conjunction with FIGS. 8 and 9, or a CSI reporting, e.g., 1902. The information in the RSTA-TO-ISTA LMR 1118 may be sufficient for ISTA 1102 to determine a RTT as described in conjunction with equation (1).

The RSTA-TO-ISTA LMR 1118 may be immediate or delayed, which may be indicated in RSTA-TO-ISTA LMR 1118, e.g., immediate/delayed. Whether RSTA 1104 is to transmit an immediate or delayed RSTA-TO-ISTA LMR 1118 may have been negotiated or determined prior to operation 1152. In accordance with some embodiments, the ISTA 1102 does not acknowledge the receipt of the LMR 1118.

In some embodiments, the RSTA-TO-ISTA LMR 1118 includes a dialog token field, e.g., 1706, and the NDPA 1110 includes a dialog token field, e.g., sounding dialog token field 1510. In some embodiments, the dialog token field 1706 and the sounding dialog token field 1510 identify a FTM sequence number, round or sounding sequence. In some embodiments, if the dialog token field, e.g., 1706, value in the RSTA-TO-ISTA LMR 1118 equals to the sounding dialog token, e.g., 1510, value in the NDPA frame 1110, then a report type of the RSTA-TO-ISTA LMR frame 1118 is immediate and if the dialog token field, e.g., 1706, value in the RSTA-TO-ISTA LMR frame 1118 equals to the sounding dialog token, e.g., 1510, value indicated in a NDPA frame 1110 minus one, then a reporting type of the RSTA-TO-ISTA LMR frame 1118 is delayed.

The method continues at operation 1168 with the ISTA 1102 waiting a SIFS 1112.4. ISTA 1102 may have determined that it is to transmit an ISTA-to-RSTA LMR 1120 based on an agreement in a negotiation between ISTA 1102 and RSTA 1104 indicating that the ISTA 1102 is to transmit ISTA-to-RSTA LMR 1120 to RSTA 1104. Whether to send the ISTA-to-RSTA LMR 1120 may have been negotiated or determined prior to the beginning of method 1100. The ISTA-to-RSTA LMR 1120 may be a LMR frame 1700, 1800, 1900.

The method continues at operation 1170 with the ISTA 1102 transmitting ISTA-to-RSTA LMR 1120 to RSTA 1104. The ISTA-to-RSTA LMR 1120 may be a LMR frame, e.g., 1700, 1800, or 1900. The ISTA-to-RSTA LMR 1120 may include times, e.g., T1 904 and T4 910, so that RSTA 1104 has all four times to determine a RTT as described in conjunction with equation (1). The ISTA-to-RSTA LMR 1120 may include a CSI report field, e.g., 1902. In accordance with some embodiments, the RSTA 1104 does not acknowledge the ISTA-to-RSTA LMR 1120. In accordance with some embodiments, the ISTA-TO-RSTA LMR 1120 may include a dialog token field, e.g., 1706 that indicates the round or FTM sequence for the timing reports, e.g., field in 1700, 1800, 1900, or CSI report, e.g., 1902.

The RSTA 1104 may have transmitted the RSTA-TO-ISTA LMR 1118 because a LMR type of reporting may have been set to immediate, e.g., an immediate/delayed field or indication may have been set to immediate in a negotiation phase between ISTA 1102 and RSTA 1104.

The ISTA-to-RSTA LMR 1120 may be immediate or delayed, which may be indicated in ISTA-to-RSTA LMR 1120, e.g., an immediate/delayed field or indication. Whether ISTA 1102 is to transmit an immediate or delayed ISTA-to-RSTA LMR 1120 may have been negotiated or determined prior to operation 1152. Immediate may mean that the information in RSTA-to-ISTA LMR 1118 or ISTA-to-RSTA LMR 1120 is from the current channel sounding round and delayed may mean that the information in RSTA-to-ISTA LMR 1118 or ISTA-to-RSTA LMR 1120 is from the previous channel sounding round. In some embodiments, the round or FTM sequence number is indicated by the value of the dialog token field, e.g., 1706. For example, if the value of the dialog token field 1706 indicates the round or FTM sequence that the reported information is for an immediately previous round or FTM sequence, then the reporting type is delayed. In some embodiments, the ISTA and RSTA may negotiate whether the RSTA-to-ISTA LMR 1118 and ISTA-to-RSTA LMR 1120 will include immediate results or delayed results (e.g., from the last round or FTM sequence). In some embodiments, the agreement for RSTA-to-ISTA LMR 1118 may be different than for ISTA-to-RSTA LMR 1120, e.g., one immediate and one delayed. In some embodiments, delayed is only for the TOA and TOD reporting and CSI reporting is supported only for immediate mode. The negotiation for delayed or immediate, and/or for whether the ISTA-to-RSTA LMR 1120 should be transmitted may be established at the time of service establishment.

In some embodiments, if the UL NDP 1114 was received in error and/or the DL NDP 1116 was transmitted in error, the RSTA-to-ISTA LMR 1118 may indicate that an error occurred, e.g., by setting a value of the TOA field 1710 to zero, or a value of a TOA Error field 1712 to a maximum value. In some embodiments, if the UL NDP 1114 was transmitted in error and/or the DL NDP 1116 was received in error, the ISTA-to-RSTA LMR 1120 may indicate that an error occurred, e.g., by setting a value of the TOA field 1710 to zero, or a value of a TOA Error field 1714 to a maximum value.

In some embodiments, the ISTA 1102 and/or RSTA 1104 store the feedback for the current round, FTM sequence, or sounding sequence for a maximum available time. The stored feedback enables the ISTA 1102 and RSTA 1104 to respond to delayed feedback mode with the feedback from the immediately previous round, FTM sequence, or sounding sequence.

Figure 12:
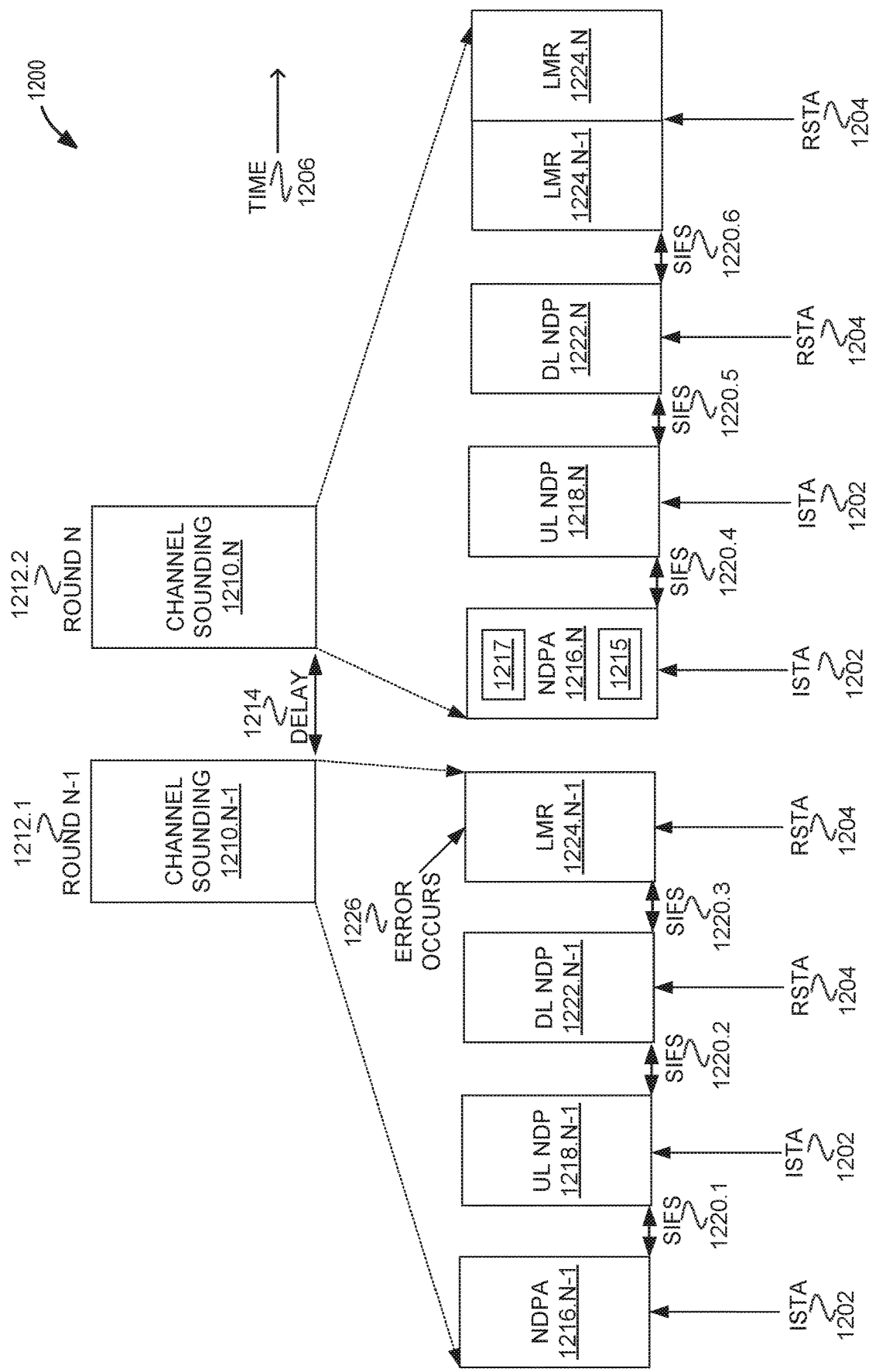
FIG. 12 illustrates a method for LMR in accordance with some embodiments.

FIG. 12 illustrates a method 1200 for LMR in accordance with some embodiments. Illustrated in FIG. 12 is time 1206 along a horizontal axis, Round N−1 1212.1, Round N 1212.2, ISTA 1202, and RSTA 1204. ISTA 1202 may be the same or similar as ISTA 802. RSTA 1204 may be the same or similar as RSTA 804.

Round N−1 1212.1 includes NDPA 1216.N−1, UL NDP 1218.N−1, DL NDP 1222.N−1, and LMR 1224.N−1. Round N 1212.2 includes NDPA 1216.N, UL NDP 1218.N, DL NDP 1222.N, and LMR 1224.N. The LMR frame 1224.N−1, N may include information such as a LMR frame 1700, 1800, 1900. NDPAs 1216.N−1, N may be the same or similar as NDPA 810, 820, 1110. UL NDP 1218.N−1, N may be the same or similar as UL NDP 814, 822, 1114. DL NDPs 1222.N−1, N may be the same or similar as DL NDP 816, 824, 1116. LMRs 1224.N−1, N may be the same or similar as LMR 817, 826, 1118, 1120 (ISTA-to-RSTA LMR).

The methods illustrated by Round N−1 1212.1 and Round N 1212.2 may be the same or similar as methods 800, 1000, 1100, which may include the SIFS 1220. An error occurs 1226 so that the LMR 1224.N−1 is received in error by ISTA 1202. ISTA 1202 may transmit NDPA 1216.N with an error indication 1215 that indicates that the LMR 1224.N−1 was received in error, e.g., LMR error 1522. RSTA 1204 may respond by transmitting LMR 1224.N−1 and LMR 1224.N to ISTA 1202. In some embodiments, RSTA 1204 may just transmit LMR 1224.N−1 in response to the error indication 1215. The NDPA 1216.N may include a sounding dialog token number field 1217, e.g., 1604. The value of the sounding dialog token field may be set to indicate that ISTA 1202 is requesting that RSTA 1204 send the measurements from the round indicated by the value of the sounding dialog token field 1217. For example, the sounding dialog token field 1217 may be set to the value of Round N−1. Delay 1214 may be a delay parameter between Rounds 1212. The delay 1214 may be negotiated or determined prior to performing FTMs. The delay 1214 is at least as large as SIFS.

Figure 13:
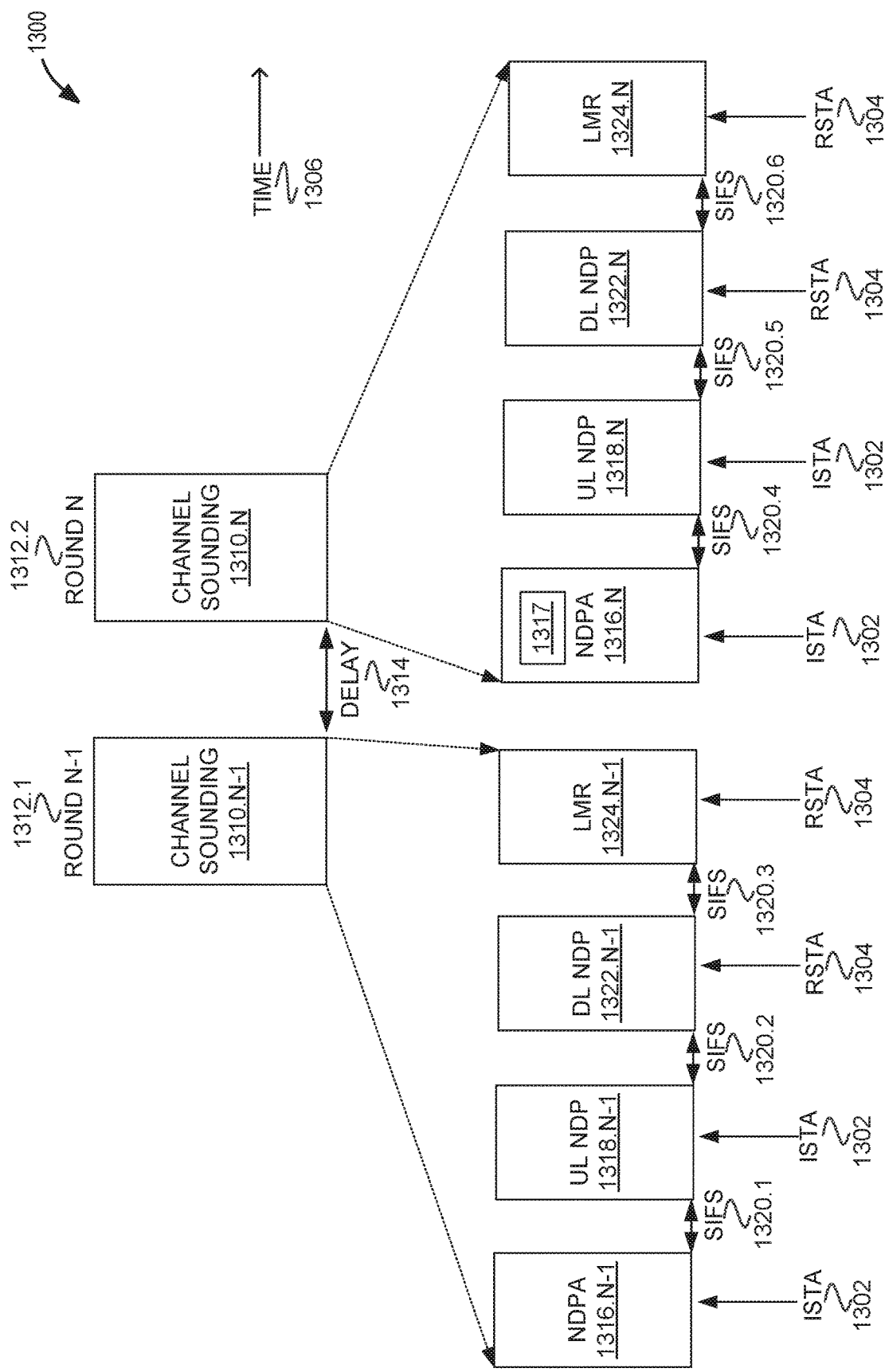
FIG. 13 illustrates a method for LMR in accordance with some embodiments.

FIG. 13 illustrates a method 1300 for LMR in accordance with some embodiments. Illustrated in FIG. 13 is time 1306 along a horizontal axis, Round N−1 1312.1, Round N 1312.2, ISTA 1302, and RSTA 1304. ISTA 1302 may be the same or similar as ISTA 802. RSTA 1304 may be the same or similar as RSTA 804.

Round N−1 1312.1 includes NDPA 1316.N−1, UL NDP 1318.N−1, DL NDP 1322.N−1, and LMR 1324.N−1. Round N 1312.2 includes NDPA 1316.N, UL NDP 1318.N, DL NDP 1322.N, LMR 1324.N. The LMR frames 1324.N−1, N may include information such as a LMR frame 1700, 1800, 1900. NDPAs 1316.N−1, N may be the same or similar as NDPA 810, 820, 1110. UL NDP 1318.N−1, N may be the same or similar as UL NDP 814, 822, 1114. DL NDPs 1322.N−1, N may be the same or similar as DL NDP 816, 824, 1116. LMRs 1324.N−1, N may be the same or similar as LMR 817, 826, 1118, 1120 (ISTA-to-RSTA). In some embodiments the LMRs 1324.N−1, N may include both measurement information (e.g., time reporting and/or CSI) for Round N−1 1312.1 and Round N 1312.2. For example, LMR 1324.N−1 and LMR 1324.N may be LMR frame 1800. In some embodiments, LMR 1324.N−1 and/or LMR 1324.N may include more than one measurement information for different Rounds 1312.

The NDPA 1316.N may include a sounding dialog token number field 1317, e.g., 1604. The value of the sounding dialog token field may be set to indicate that ISTA 1302 is requesting that RSTA 1304 send the measurements from the round (or FTM sequence) indicated by the value of the sounding dialog token field 1317. For example, the sounding dialog token field 1317 may be set to the value of Round N−1, and RSTA 1304 would reply with the measurements from Round N−1 in LMR 1324.N. The RSTA 1304 may include measurements from the current Round N and the Round indicated in the sounding dialog token field 1317.

The methods illustrated by Round N−1 1312.1 and Round N 1312.2 may be the same or similar as methods 800, 1000, 1100, which may include the SIFS 1320. RSTA 1304 may transmit LMR 1324.N−1 and LMR 1324.N to ISTA 1302. In some embodiments, RSTA 1304 may transmit only LMR 1224.N−1 in response to the error indication 1315.

Figure 14:
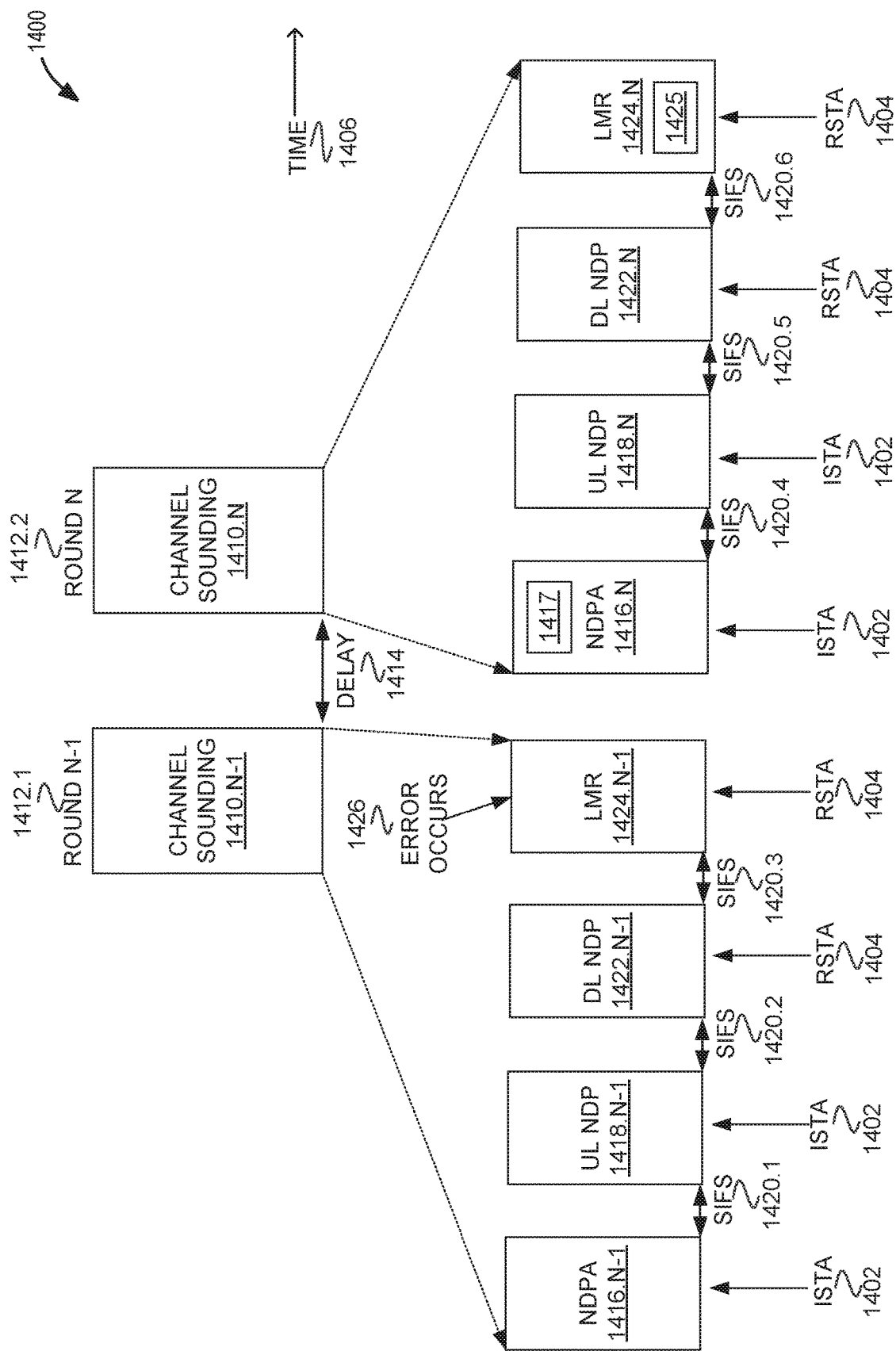
FIG. 14 illustrates a method for LMR in accordance with some embodiments.

FIG. 14 illustrates a method 1400 for LMR in accordance with some embodiments. Illustrated in FIG. 14 is time 1406 along a horizontal axis, Round N−1 1412.1, Round N 1412.2, ISTA 1402, and RSTA 1404. ISTA 1402 may be the same or similar as ISTA 802. RSTA 1404 may be the same or similar as RSTA 804.

Round N−1 1412.1 includes NDPA 1416.N−1, UL NDP 1418.N−1, DL NDP 1422.N−1, and LMR 1424.N−1. Round N 1412.2 includes NDPA 1416.N, UL NDP 1418.N, DL NDP 1422.N, and LMR 1424.N. The LMR frames 1424.N−1, N may include information such as a LMR frames 1700, 1800, 1900. NDPAs 1416.N−1, N may be the same or similar as NDPA 810, 820, 1110. UL NDP 1418.N−1, N may be the same or similar as UL NDP 814, 822, 1114. DL NDPs 1422.N−1, N may be the same or similar as DL NDP 816, 824, 1116. LMRs 1424.N−1, N may be the same or similar as LMR 817, 826, 1118, 1120 (ISTA-to-RSTA).

The methods illustrated by Round N−1 1412.1 and Round N 1412.2 may be the same or similar as methods 800, 1000, 1100, which may include SIFS 1420 between transmissions (e.g., PPDUs). An error occurs 1426 so that the LMR 1424.N−1 is received in error by ISTA 1402. ISTA 1202 may transmit NDPA 1416.N with a new sounding dialog token number field 1417, e.g., 1604. The value of the sounding dialog token field 1417 is set to indicate that ISTA 1402 is requesting a new round of measurement with the RSTA 1404. In some embodiments, the value of the sounding token field 1417 may be set to Round N. RSTA 1404 may respond by transmitting LMR 1424.N with measurements from the Round indicated by the sounding token field 1425. Delay 1414 may be a delay parameter between Rounds 1412. The delay 1414 may be negotiated or determined prior to performing the measurement sequences or rounds 1412.

Figures 15, 16:
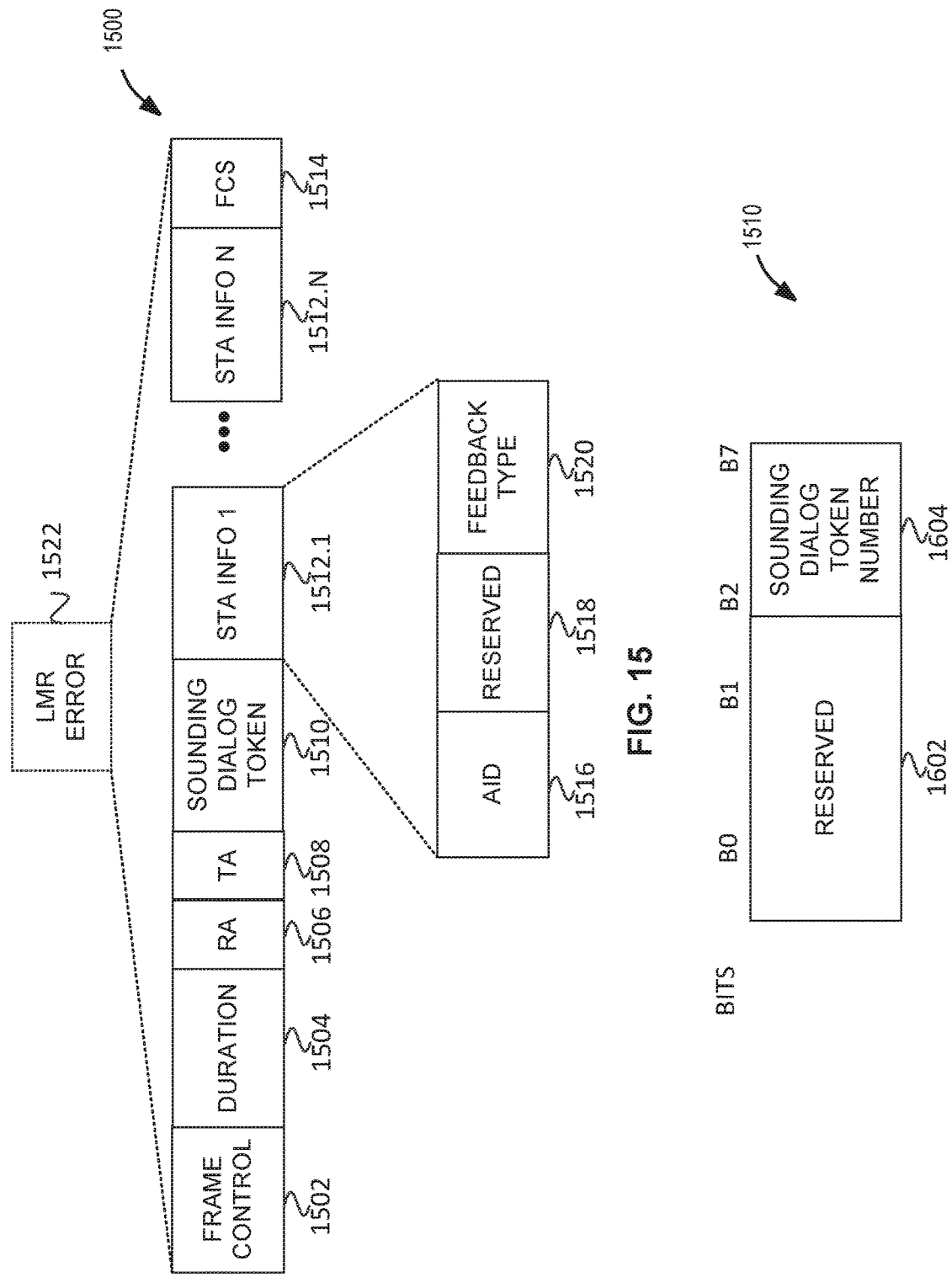
FIG. 15 illustrates a null data packet (NDP) announcement (NDPA) frame in accordance with some embodiments.
FIG. 16 illustrates a sounding dialog token field in accordance with some embodiments.

FIG. 15 illustrates a null data packet (NDP) announcement (NDPA) frame 1500 in accordance with some embodiments. The NDPA frame 1500 comprises a frame control field 1502, a duration field 1504, a receiver address (RA) field 1506, transmitter address field 1508, a sounding dialog token field 1510, STA information (info) 1 field 1512.1 through STA info N field 1512.N, a frame control sequence (FCS) field 1514, and a LMR Error field 1522.

The NDP announcement frame 1500 may have different formats. The frame control field 1502 may include information about the NDP announcement frame 1500 such as the type of the frame, etc. The duration field 1504 may indicate a duration of a transmission opportunity (TXOP). The RA field 1506 may have an intended receiver address, which may be a group address or broadcast address. The RA field 1506 may indicate a MAC address. The TA field 1508 may have a transmitter address of the ISTA (e.g., 802). The TA field 1508 may be a MAC address. In some embodiments, one or more of the fields of the NDP announcement frame 1500 may be set in accordance with an IEEE communication protocol, e.g., IEEE 802.11ac/ax/az. The STA INFO fields 1512 may include an association identification (AID) field 1516, a reserved field 1518, and feedback type 1520. The AID field 1516 may identify a RSTA (e.g., 804). The AID field 1516 may indicate a RSTA (e.g., 804) in a different way. The reserved field 1518 may be reserved for future use. In some embodiments, the reserved field 1518 may have fields that are used to convey values. The feedback type 1520 may indicate a type of feedback that is solicited. In some embodiments, the feedback type 1520 may indicate a type of feedback included in RSTA-to-ISTA LMR frame 1118 or ISTA-to-RSTA LMR frame 1120 (or another LMR frame), e.g., CSI or timing.

The LMR Error field 1522 may be optional. The LMR Error field 1522 may indicate whether an error occurred in the reception of a LMR. The LMR Error field 1522 may be a reserved bit in the STA info field 1512. In some embodiments, the NDP announcement frame, e.g., 1500, may include a field to indicate whether the last LMR (e.g., 1700, 1800, 1900) was received in error.

FIG. 16 illustrates a sounding dialog token field 1510 in accordance with some embodiments. The sounding dialog token field 1510 may include a reserved field 1602 and sounding dialog token number field 1604.

The sounding dialog token number field 1604 may contain a value from 0 to 31, in accordance with some embodiments. The sounding dialog token number field 1604 may contain a value from 0 to 63 in accordance with some embodiments. The value of the sounding dialog token field 1604 may indicate a measurement sequence number, e.g., indicate a LMR (e.g., 817, 826, 1118, LMR 1224.N−1, N, 1324.N−1, N, 1424.N−1, N). The value of the sound dialog token field 1604 may correspond to LMR for a specific sounding. The sounding dialog token number field 1604 may be six bits in length. The sounding dialog token number field 1604 may be bits B2 through B7 of the sounding dialog token field 1510.

The value of the sounding dialog token number field 1604 may indicate that the RSTA (e.g., 804) is to transmit the location measurement results that are indicated by the value of the sound dialog token field 1606. For example, when the LMR (e.g., 817, 826, 1118, LMR 1224.N−1, N, 1324.N−1, N, 1424.N−1, N) in round N−1 is lost, the initiator can set a value in the sounding dialog number field 1604 to indicate that the LMR for round N−1 needs to be retransmitted. Round may be termed a FTM sequence number, in accordance with some embodiments. In some embodiments, the terms FTM sequence number, round, and sounding sequence may be used interchangeably. The sounding dialog token number field 1604 may indicate a sounding sequence number in accordance with some embodiments. In some embodiments, a field of the NDP announcement frame 1500 indicates that a previously LMR was not received properly. In some embodiments, when the field of the NDP announcement frame 1500 indicates that a previously LMR was not received properly, then the sounding dialog token number field 1604 indicates which LMR was not received. The reserved field 1602 may be used to indicate a type of NDP announcement frame 1500 in accordance with some embodiments.

Figure 17:
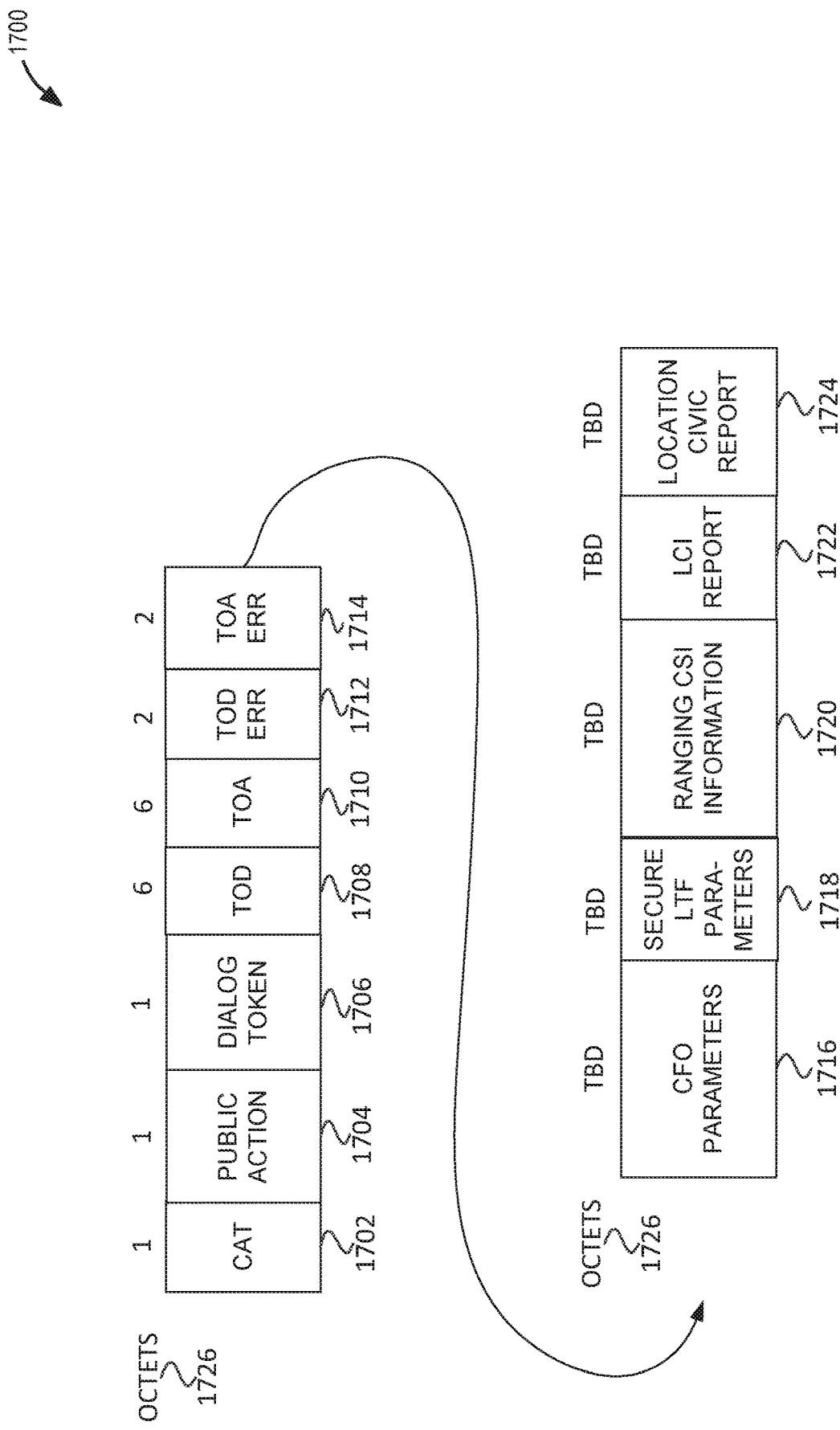
FIG. 17 illustrates LMR frame in accordance with some embodiments.

FIG. 17 illustrates LMR frame 1700 in accordance with some embodiments. LMR may be used for an abbreviation or acronym of both location measurement reporting and location measurement report. The LMR frame 1700 may include a category field 1702, a public action field 1704, a dialog token field 1706, a time of departure (TOD) field 1710, a time of arrival (TOA) field 1712, a TOD error field 1714, a TOA error field 1716, a carrier frequency offset (CFO) field 1716, secure LTF parameters field 1718, ranging CSI information field 1720, a location configuration information (LCI) field 1722, and a location civic report field 1724. One or more of the fields may be optional, e.g., one or more of the following fields may be optional the CFO parameters field 1716, secure LTF parameters field 1718, ranging CSI information field 1720, LCI report field 1722, and location civic report field 1724. Octets 1726 may indicate a number of octets of a field where to be determined (TBD) may be used to indicate the number of octets to use has not been determined. A different number of octets may be used, in accordance with some embodiments.

The LMR frame 1700 may be an a LMR action frame. The category field 1702 may indicate a category for the LMR frame 1700. The public action field 1704 may indicate the format of the LMR frame 1700 from different action frame formats. The dialog token field 1706 may be a nonzero value chosen by the RSTA (e.g., 804) to identify the LMR frame 1700 and/or a channel sounding round. The TOD field 1708, TOA field 1710, ranging CSI information field 1720, and CFO parameters field 1716 contain values of the parameters captured with the channel sounding indicated by the dialog token field 1706. The TOD field 1708 may include a maximum (max) TOD error exponent (not illustrated), a reserved field (not illustrated), and TOD not continuous field (not illustrated). The TOA field 1710 may include a Max TOA Error Exponent field (not illustrated) and a reserved field (not illustrated).

In some embodiments, the TOD field 1708 and TOA field 1710 are represented in units of picoseconds. The maximum errors represented in the TOD error field 1712 and the TOA error field 1714 may be represented in accordance with a function indicating a maximum TOD or TOA error.

The TOD field 1708 may contain a timestamp that represents the time, with respect to a time base, at which the start of the preamble of the NDP frame was transmitted at the transmit antenna connector.

The TOA field 1710 contains a timestamp that represents the time with respect to a time base at which the start of the preamble of the NDP (e.g., 1110) arrived at the receive antenna connector. The Max TOD Error Exponent field indicates an upper bound for the error exponent in the value specified in the TOD field 1708.

The Max TOA Error Exponent field contains an upper bound for the error exponent in the value specified in the TOA field 1710. The LCI report field 1722 is optionally present. If present, contains a Measurement Report Element with Measurement Type Field equal to LCI. The Location Civic Report field 1724 is optionally present. If present, it contains a Measurement Report element with Measurement Type field equal to Location Civic.

The CFO parameters field 1716 is optionally present and may indicate the clock rate difference between ISTA and RSTA. The secure LTF parameters field 1718 is optionally present and may include parameters for secure LTF. The ranging CSI information field 1720 is optionally present and may include the CSI information for the channel sounding identified by the dialog token field 1706. In some embodiments, the LMR frame 1700 may include a field to indicate whether there was an error in determining the values for the LMR frame 1700, e.g., a UL NDP (e.g., 1114), DL NDP 1116, or NDPA 1110 was transmitted or received with errors. One or more additionally fields may be present, e.g., a parameters field for the CSI, in accordance with some embodiments. One or more of the fields of LMR frame 1700 may be optional and/or not present.

Figures 18, 19:
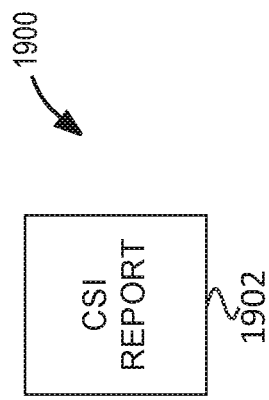
FIG. 18 illustrates LMR frame in accordance with some embodiments.
FIG. 19 illustrates LMR frame in accordance with some embodiments.

FIG. 18 illustrates LMR frame 1800 in accordance with some embodiments. The LMR frame 1800 may include one or more of the following fields category field 1802, public action field 1804, dialog token field 1806, TOD (N) field 1808, TOA (N) field 1810, TOD Error (N) field 1812, TOA Error (N) field 1814, TOD (N–1) field 1816, TOA (N–1) field 1818, TOD error (N–1) field 1820, and TOA Error (N–1) field 1822. The LMR frame 1800 may include one or more fields not illustrated.

The category field 1802 may be the same or similar as category field 1702. The public action field 1804 may be the same or similar as the public action field 1804. The dialog token field 1806 may be the same or similar as the dialog token field 1706. The TOD (N) field 1808 may be the same or similar as the TOD field 1710 for a round N of measurement sequence. The TOD (N–1) field 1816 may be the same or similar as the TOD field 1710 for a previous round N–1 of measurement sequence.

TOD Error (N) field 1812 may be the same or similar as TOD Error 1714 for a round N of measurement sequence. TOD Error (N–1) field 1820 may be the same or similar as TOD Error 1714 for a round N–1 of measurement sequence.

TOA Error (N) field 1814 may be the same or similar as TOA Error field 1716 for round N of measurement sequence. TOA Error (N–1) field 1818 may be the same or similar as TOA Error field 1716 for round N–1 of measurement sequence.

In fields 1808, 1810, 1812, 1814, 1816, 1818, 1820, and 1822, the N or N–1 may represent a round of measurement sequence, e.g., FTM sequence number. In some embodiments one or more of the fields 1808, 1810, 1812, 1814, 1816, 1818, 1820, and 1822 may include a subfield to indicate the value of N.

FIG. 19 illustrates LMR frame 1900 in accordance with some embodiments. Illustrated in FIG. 19 is a channel status indication (CSI) report 1902. The CSI report 1902 may be a report indicating a status of one or channels. The CSI report 1902 may be included in LMR frame 1700 or 1800. The LMR frame 1900 may include one or more of the fields disclosed in conjunction with FIGS. 17 and 18, e.g. TOA 1710 and TOD 1708.

Figure 20:
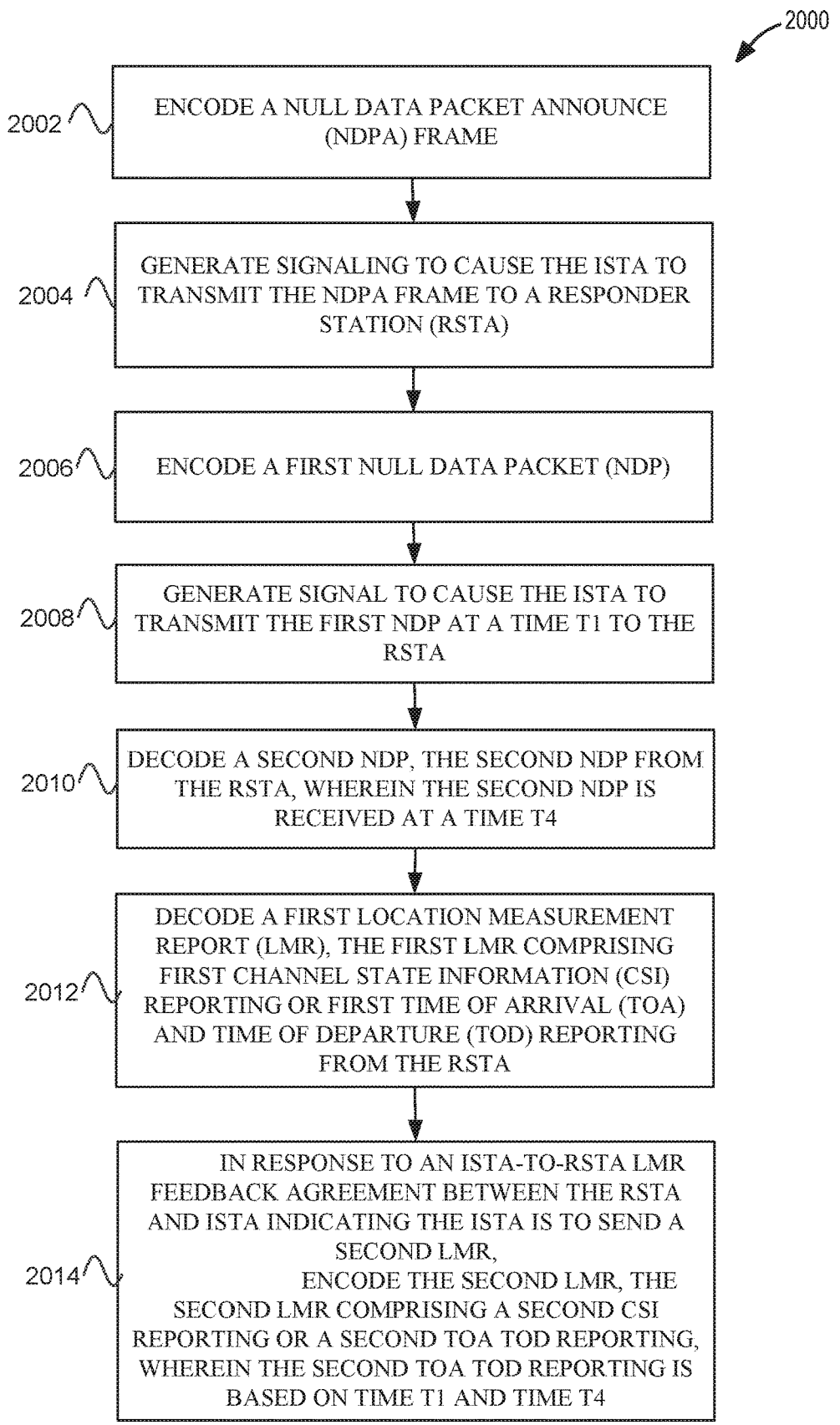
FIG. 20 illustrates a method for LMR in accordance with some embodiments.

FIG. 20 illustrates a method 2000 for LMR in accordance with some embodiments. The method 2000 begins at operation 2002 with encoding a NDPA frame. For example, ISTA 1102 may encode NDPA 1110. The method 2000 continues at operation 2004 with generating signaling to cause the ISTA to transmit the NDPA frame to a RSTA. For example, an apparatus of the ISTA 1102 may generating signaling to cause the ISTA 1102 to transmit the NDPA 1110. The method 2000 continues at operation 2006 with encoding a NDP. For example, ISTA 1102 may encode UL NDP 1114.

The method 2000 may continue at operation 2008 with generating signal to cause the ISTA to transmit the first NDP at a time T1 to the RSTA. For example, an apparatus of the ISTA 1102 may generate signaling to cause ISTA 1102 to transmit the UL NDP 1114 at time T1, e.g., 904 of FIG. 9. The method 2000 continues at operation 2010 with decoding a second NDP, the second NDP from the RSTA, where the second NDP is received at a time T4. For example, ISTA 1102 may decode DL NDP 1116 that may be received at a time T4, e.g., time T4 910.

The method 2000 may continue at operation 2012 with decoding a LMR, the first LMR comprising first CSI reporting or first TOA and TOD reporting from the RSTA. For example, ISTA 1102 may decode RSTA-to-ISTA LMR 1118 that may include a LMR frame 1700, 1800, 1900, which may include the CSI reporting and/or TOA and TOD reporting.

The method 2000 may continue at operation 2014 with in response to an ISTA-to-RSTA LMR feedback agreement between the RSTA and ISTA indicating the ISTA is to send a second LMR, encode the second LMR, the second LMR including a second CSI reporting or a second TOA and TOD reporting, wherein the second TOA and TOD reporting is based on time T1 and time T4. For example, ISTA 1102 and RSTA 1104 may have an agreement to send the second LMR, such as ISTA-to-RSTA LMR 1120, e.g., a field or indication of whether to send the ISTA-to-RSTA LMR may have been exchanged. The ISTA 1102 may encode the ISTA-to-RSTA LMR 1120, which may include time T1 904 and time T4 910 or a CSI reporting, e.g., ranging CSI information field 1720 or 1902.

Operation 2014 may include generating signaling to cause the ISTA to transmit the second LMR to the RSTA. For example, an apparatus of ISTA 1102 may generate signaling to cause ISTA 1102 to transmit the ISTA-to-RSTA LMR 1120.

Method 2000 may be performed by an ISTA 1102, a RSTA 1104, an apparatus of an ISTA 1102, or an apparatus of a RSTA 1104. Method 2000 may perform the operations in a different order and may include additional operations or may not include all the operations of method 2000.

Figure 21:
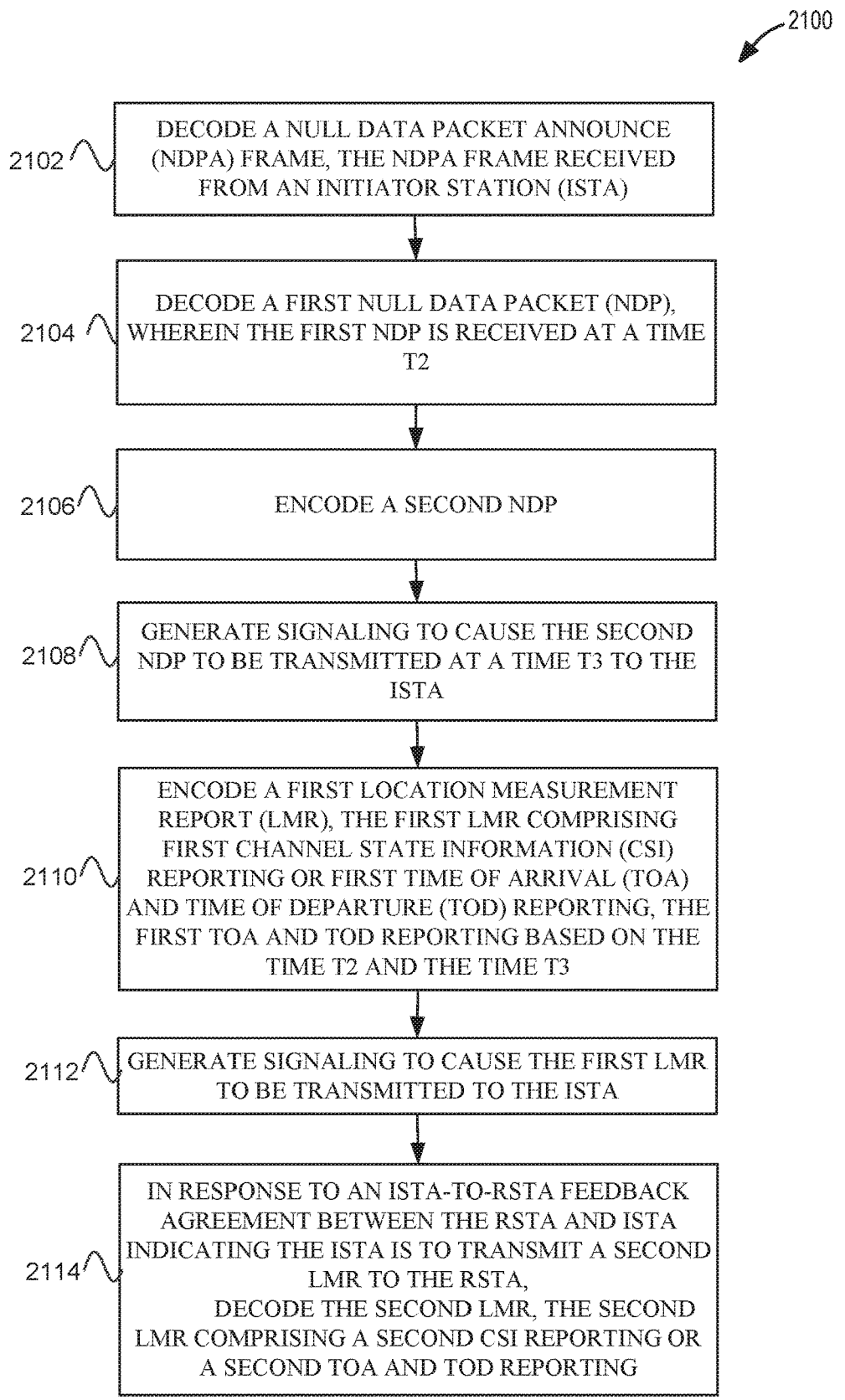
FIG. 21 illustrates a method for LMR in accordance with some embodiments.

FIG. 21 illustrates a method 2100 for LMR in accordance with some embodiments. The method 2100 begins at operation 2102 with decoding a NDPA frame, the NDPA frame received from an ISTA. For example, RSTA 1104 (FIG. 11) may decode NDPA 1110. The method 2100 continues at operation 2104 with decoding a first NDP, where the first NDP is received at a time T2. For example, RSTA 1104 may decode UL NDP 1114 at time T2 906 (FIG. 9).

The method 2100 continues at operation 2106 with encoding a second NDP. For example, RSTA 1104 may encode DL NDP 1116. The method 2100 may continue at operation 2108 with generating signaling to cause the second NDP to be transmitted at a time T3 to the ISTA. For example, an apparatus of RSTA 1104 may generate signaling to cause RSTA 1104 to transmit DL NDP 1116.

The method 2100 continues at operation 2110 with encoding a first LMR, the first LMR comprising first CSI reporting or first TOA and TOD reporting, the first TOA and TOD reporting based on the time T2 and the time T3. For example, RSTA 1104 may encode RSTA-TO-ISTA LMR 1118, e.g., LMR 1118 may include a LMR frame 1700, 1800, or 1900. The method 2100 continues at operation 2112 with generating signaling to cause the first LMR to be transmitted to the ISTA. For example, an apparatus of the RSTA 1104 may cause RSTA 1104 to transmit LMR 1118 to ISTA 1102.

The method 2100 continues at operation 2114 with response to an ISTA-to-RSTA feedback agreement between the RSTA and ISTA indicating the ISTA is to transmit a second LMR to the RSTA, and RSTA decoding the second LMR, the second LMR including a second CSI reporting or a second TOA and TOD reporting. For example, RSTA 1104 may decode ISTA-to-RSTA LMR 1120 that may include LMR frame 1700, 1800, or 1900.

Method 2100 may be performed by a ISTA 1102, RSTA 1104, an apparatus of an ISTA 1102, or an apparatus of a RSTA 1104. Method 2100 may perform the operations in a different order and may include additional operations or may not include all the operations of method 2100.

Figure 22:
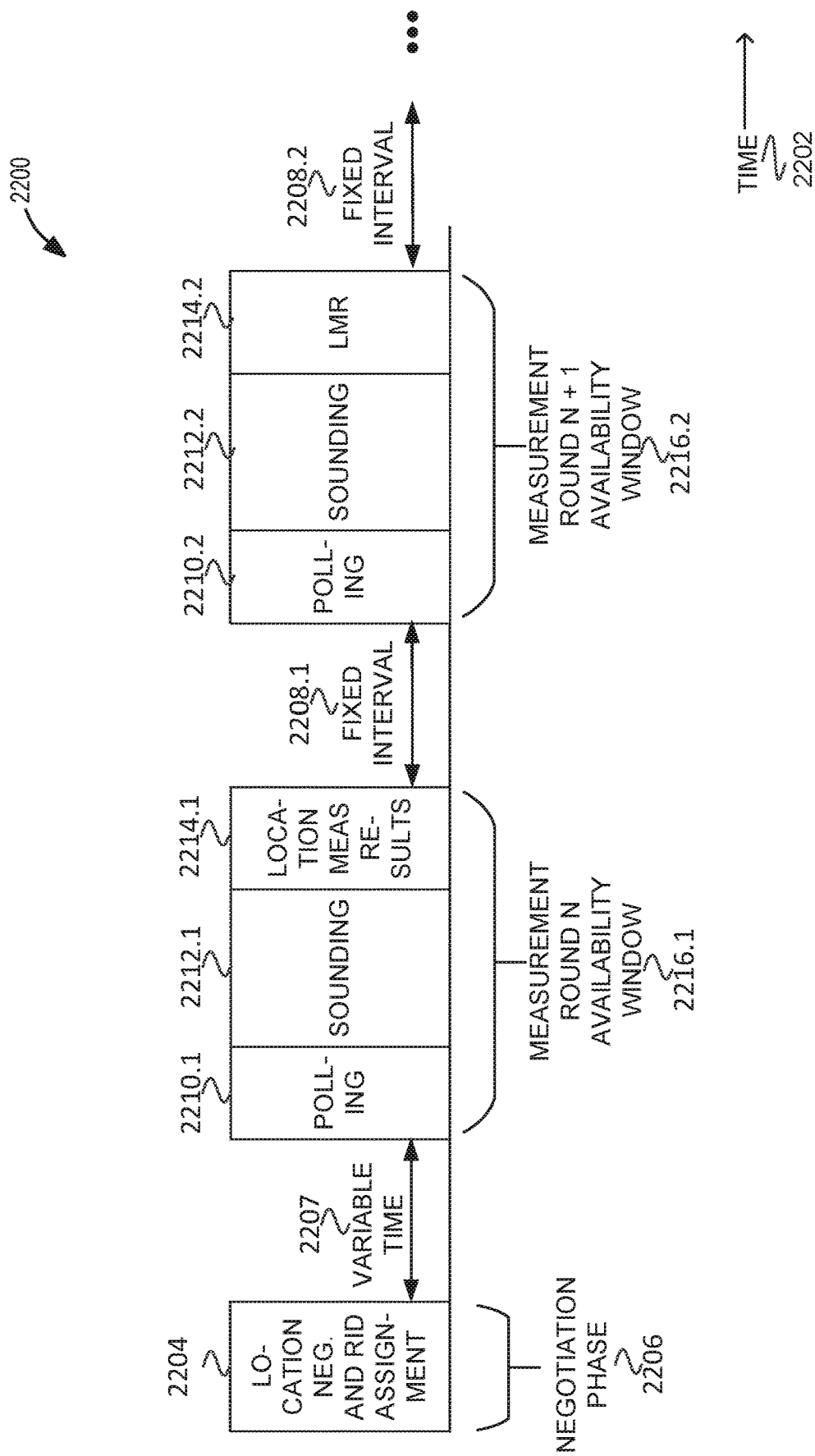
FIG. 22 illustrates multi-user (MU) measurement and measurement report feedback in accordance with some embodiments.

FIG. 22 illustrates multi-user (MU) measurement and measurement report feedback 2200 in accordance with some embodiments. Illustrated in FIG. 22 are time 2202 along a horizontal axis, negotiation phase 2206, measurement round N availability window 2216.1, and availability measurement round N+1 availability window 2216.2.

Negotiation phase 2206 includes location negotiation and ranging identification (ID) (RID) assignment frame 2204. A RID may be for a HE STA 504 and/or HE AP 502 that is not associated with an HE AP 502. During the negotiation phase 2206 parameters for performing measurement sequence may be determined and/or agreed upon. For example, whether a LMR (e.g., 1120) is to be sent from the ISTA (e.g., 1102) to the RSTA (e.g., 1104). As another example, the measurement round availability window 2216 may be negotiated, e.g., what is to be performed. As an example, the measurement report feedback (e.g., ISTA-to-RSTA LMR 1120) could be in a next measurement round availability window 2216 after measurement (e.g., sounding 2212 or UL NDP and DL NDP). The time between the negotiation phase 2206 and the measurement round N availability window 2216.1 may be variable time 2207, which may be larger than fixed interval 2208 and may depend on when an ISTA determines to begin polling 2210.

The measurement round N (N+1) availability window 2216 may include polling 2210, sounding 2212, and/or LMR 2214. The measurement round N availability window 2216 may be separated by a time of fixed interval 2208.1 by measurement round N+1 availability window 2216.2. The fixed interval 2208 may be negotiated during the negotiation phase 2206 and/or the fixed interval 2208 may specified by the IEEE 802.11az communication standard.

Figure 23:
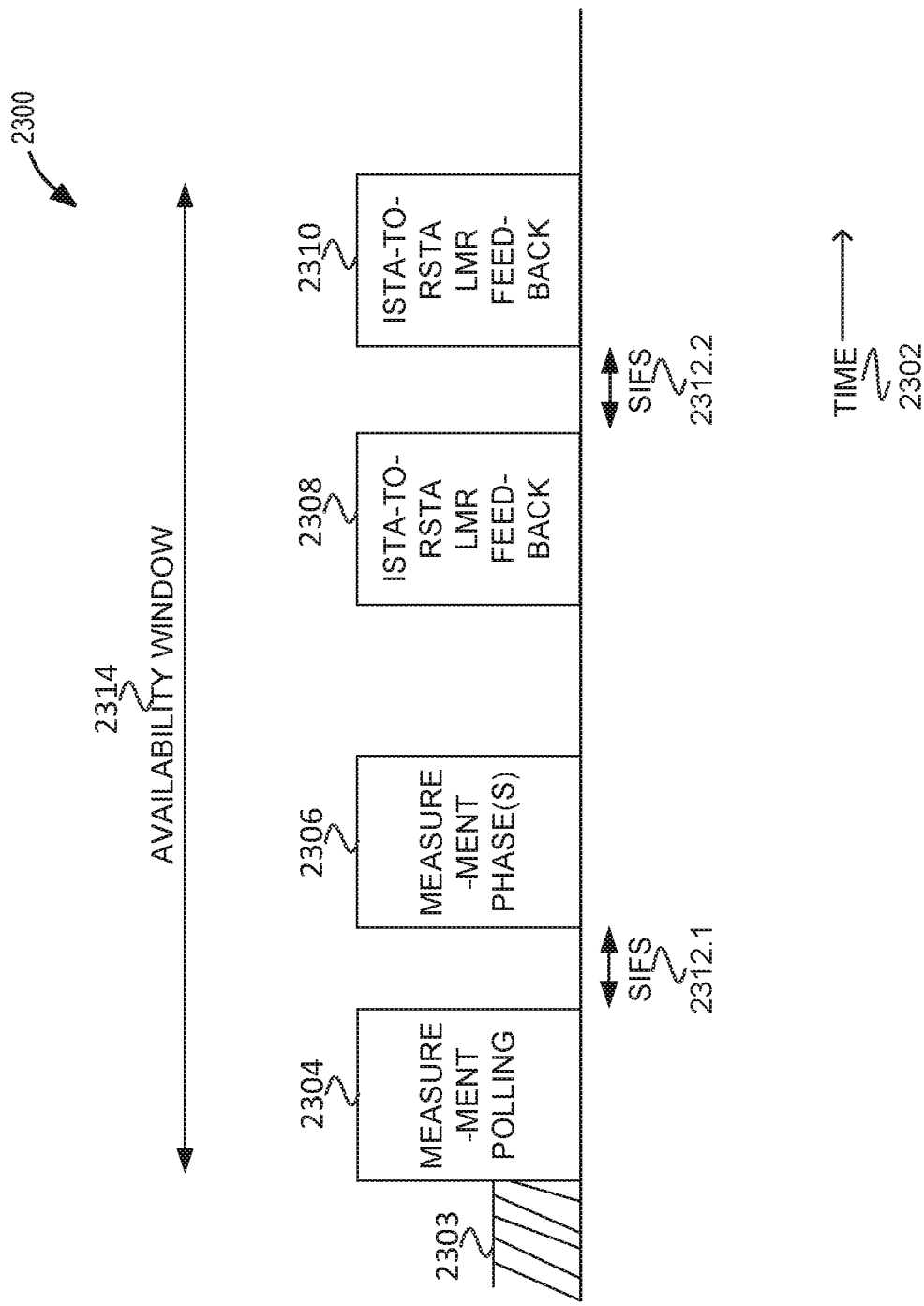
FIG. 23 illustrates an availability window in accordance with some embodiments.

FIG. 23 illustrates an availability window 2300 in accordance with some embodiments. Illustrated in FIG. 23 is availability window 2314, time 2302 along a horizontal axis, contending for the wireless medium 2302, measurement polling 2304, measurement phase(s) 2306, ISTA-to-RSTA LMR feedback 2308, and ISTA-to-RSTA LMR feedback 2310. The availability window 2314 may be a single availability window for MU measurement and LMR feedback. At the beginning of availability window, the RSTA may contend for the wireless medium at 2303 and then transmit a measurement polling 2304. There may then be a measurement phase 2306, which may begin SIFS 2312.1 after the measurement polling 2304. There may be LMR feedback from RSTA to ISTA 2308 and then SIFS 2312 later LMR feedback from ISTA to RSTA 2310. An RSTA (e.g., HE AP 502) may transmit a DL MU PPDU packet or broadcast packet to send the ToA/ToD or CSI information (e.g., feedback) to ISTAs (e.g., HE STAs 504). For ISTA-to-RSTA LMR feedback, the RSTA needs to send a trigger frame to solicit the ToA/ToD or CSI from the multiple ISTAs. The trigger frame (e.g., 2800) may be used to allocate RUs to the ISTAs so that they can transmit their feedback to the RSTA simultaneously.

Figure 24:
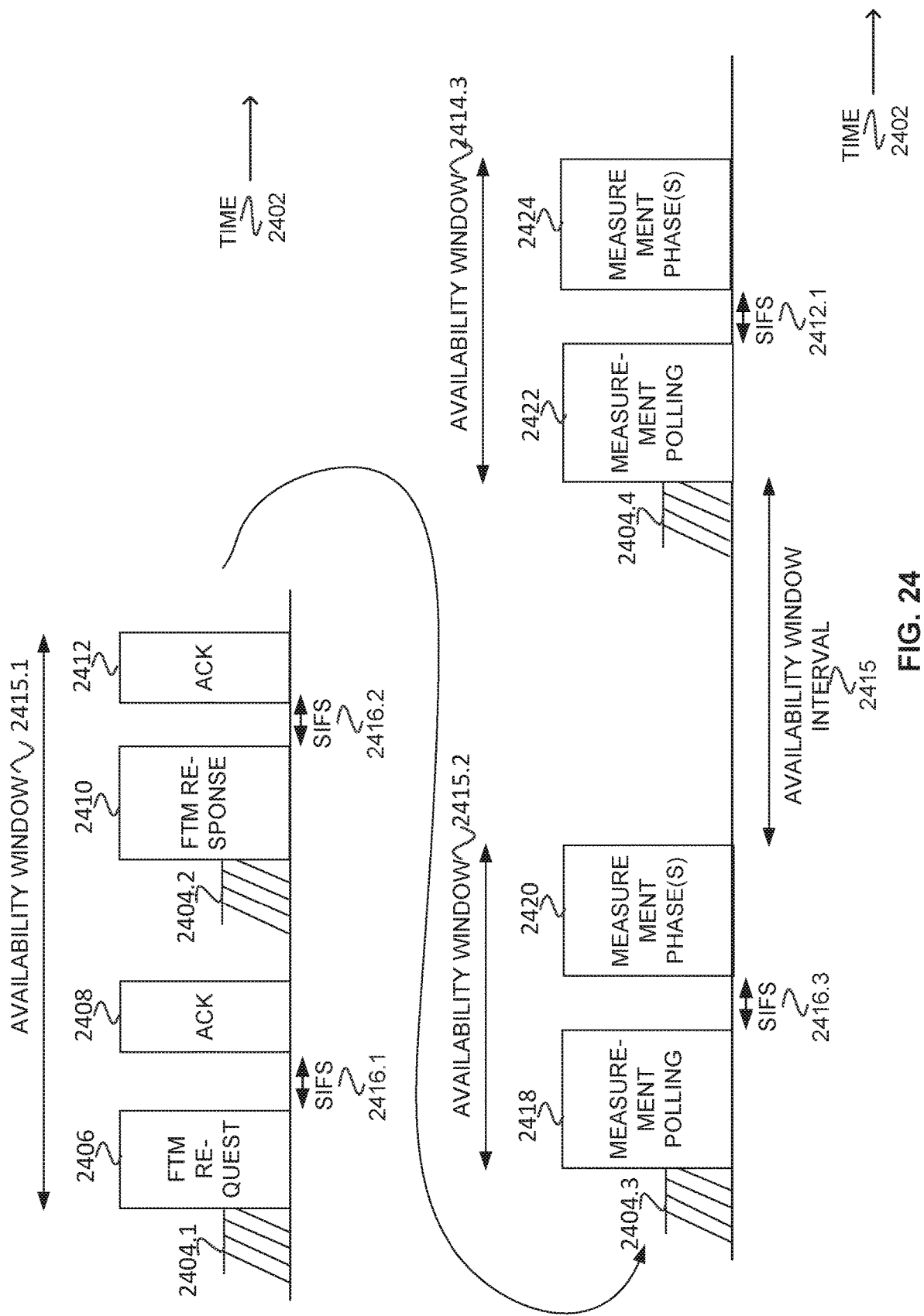
FIG. 24 illustrates multiple availability windows for MU measurement and LMR feedback in accordance with some embodiments.

FIG. 24 illustrates multiple availability windows for MU measurement and LMR feedback 2400 in accordance with some embodiments. Illustrated in FIG. 24 is availability windows 2414 and time 2402. Availability window 2141.1 may include FTM request 2406, ACK 2408, FTM response 2410, and ACK 2412. The FTM request 2404.1 may be transmitted by a ISTA and the FTM response 2410 may be transmitted by a RSTA. The ACKs 2412 may be optionally in some embodiments. The RSTA may not need to contend for the wireless medium at 2404.2 because a TXOP duration of the FTM request 2406 in accordance with some embodiments.

Availability window 2414.2 may include contend for the wireless medium at 2404.3, measurement polling 2418, SIFS 2416.3, and measurement phases(s) 2420. In accordance with some embodiments, the availability windows 2412 may be at least a duration of an availability window interval 2415 apart. Availability window 2414.3 may include contend for the wireless medium at 2404.4, measurement polling 2422, and measurement phases(s) 2424. The availability windows 2415 may need to be at least the duration of availability window interval 2415 apart from availability window 2415.2.

FIG. 25 illustrates a trigger response scheduling (TRS) control field 2500 in accordance with some embodiments. Illustrated in FIG. 25 are HE TB PPDU length subfield 2502, RU allocation subfield 2504, downlink (DL) transmit (TX) power subfield 2506, UL target received signal strength indication (RSSI) subfield 2508, UL MCS subfield 2510, and reserved subfield 2510. The TRS control field 2500 solicits an HE TB PPDU that follows an HE MU PPDU, HE SU PPDU or HE ER SU PPDU carrying the TRS control field 2500. The HE TB PPDU length subfield 2502 indicates a length of the HE TB PPDU that is transmitted in response to the TRS control field 2500. The RU allocation subfield 2504 indicates an RU assigned for transmitting the HE TB PPDU response. The DL TX Power subfield 2506 indicates the AP transmit power in dBm used to transmit the PPDU that included the TRS control field 2500. The UL target RSSI subfield 2508 indicates in units of dBm the expected receive power at the transmitter of the PPDU that included the TRS control 2500. The UL MCS subfield 2510 indicates the MCS to be used to encode the response HE TB PPDU. In some embodiments, one or more fields of TRS control field 2500 may be optional or not present. In some embodiments, TRS control field 2500 may include one or more fields.

Figure 26:
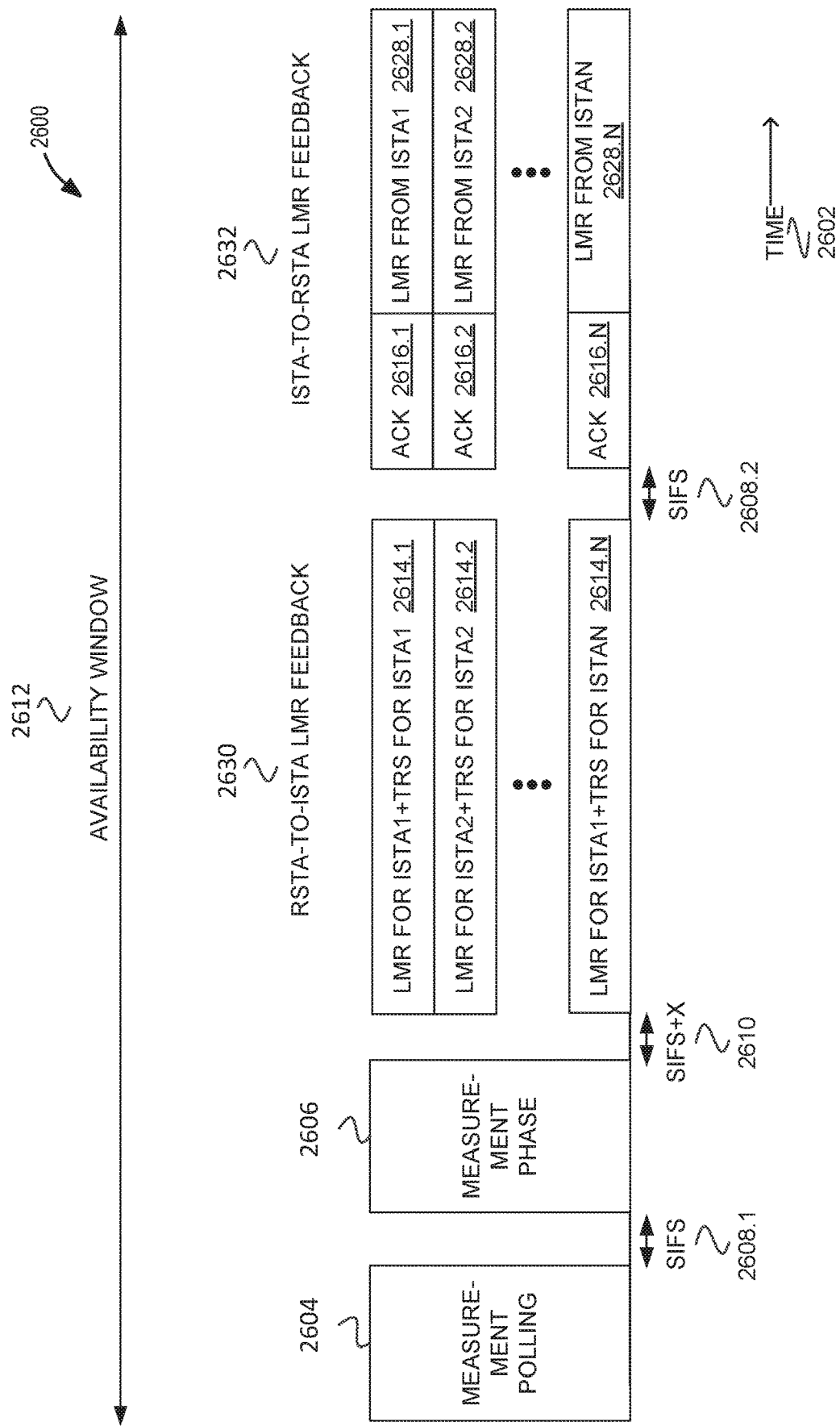
FIG. 26 illustrates two-sided MU LMR feedback with TRS in accordance with some embodiments.

FIG. 26 illustrates two-sided MU LMR feedback with TRS 2600 in accordance with some embodiments. Illustrated in FIG. 26 is availability window 2612, measurement polling 2604, SIFs 2608.1, measurement phase 2606, SIFS+X 2610, RSTA-to-ISTA LMR feedback 2630, SIFS 2608.2, ACK 2616, ISTA-to-RSTA LMR feedback 2632. In some embodiments, the ACKs 2616 are optional. SIFS+X 2610 may indicate that the following transmission (e.g., LMR FOR ISTA+TRS FOR ISTA 2614) may begin at least a SIFS after the end of the measurement phase 2606. The RSTA (e.g., HE AP 502) may transmit a LMR for ISTA1 and TRS for ISTA1 2614.1 (and one for each ISTA to N ISTAs) on a corresponding RU. The TRS for ISTA1 2614.1 (e.g., 2500). The ISTA may respond a SIFS 2606 later with an ACK 2616.1 on an RU (e.g., RU allocation 2504) indicated by the TRS and transmit LMR from STA1 2628. The LMR may be as disclosed herein. The LMR from ISTA1 2628 is transmitted on the RU (e.g., RU allocation 2504) indicated by the TRS (e.g., 2500). The LMR from ISTA1 2628.1 may be included in an A-MPDU of a HE TB PPDU in accordance with some embodiments. In some embodiments, the ISTAs only transmit the ACKs 2616. It may be determined whether the ISTAs are to transmit the ISTA-to-RSTA LMR feedback during a negotiation phase (e.g., 2206). In some embodiments, a packet will indicate whether the ISTAs are to transmit the ISTA-to-RSTA LMR feedback 2632 where the packet is sent in the measurement polling 2604, the measurement phase 2606, or RSTA-to-ISTA LMR feedback 2630.

Figure 27:
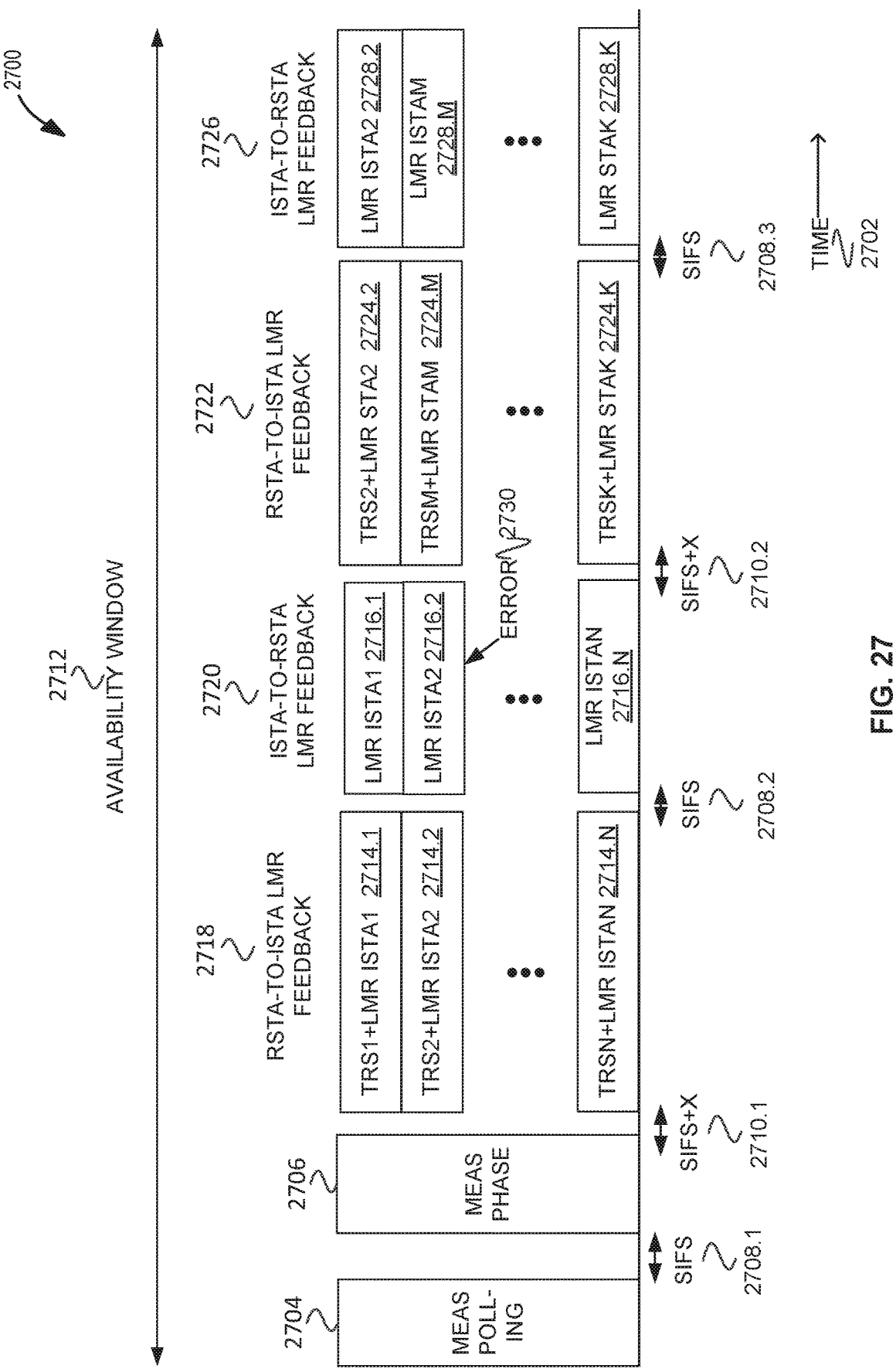
FIG. 27 illustrates two-sided MU LMR feedback with TRS in accordance with some embodiments.

FIG. 27 illustrates two-sided MU LMR feedback with TRS 2600 in accordance with some embodiments. Illustrated in FIG. 27 is time 2702, measurement polling 2704, SIFS 2708.1, measurement phase 2706, SIFS+X 2710.1, RSTA-to-ISTA LMR feedback 2718, SIFS 2708.2, ISTA-to-RSTA LMR feedback 2720, SIFS+X 2710.2, RSTA-to-ISTA LMR feedback 2722, SIFS 2708.3, ISTA-to-RSTA LMR feedback 2726, and availability window 2712. The TRS2_LMR ISTA2 2714.2 may include a LMR and a TRS (e.g., 2500). The LMR ISTA2 2716.2 may be transmitted according to the TRS of 2714.2. The LMR ISTA2 2716.2 may not be received. The RSTA may send TRS2+LMR STA2 2724.2 which includes a TRS for ISTA2 to transmit LMR ISTA2 2728.2 again. In this way, the RSTA can get the LMR from ISTA2 during another ISTA-to-RSTA LMR feedback 2726.

Figure 28:
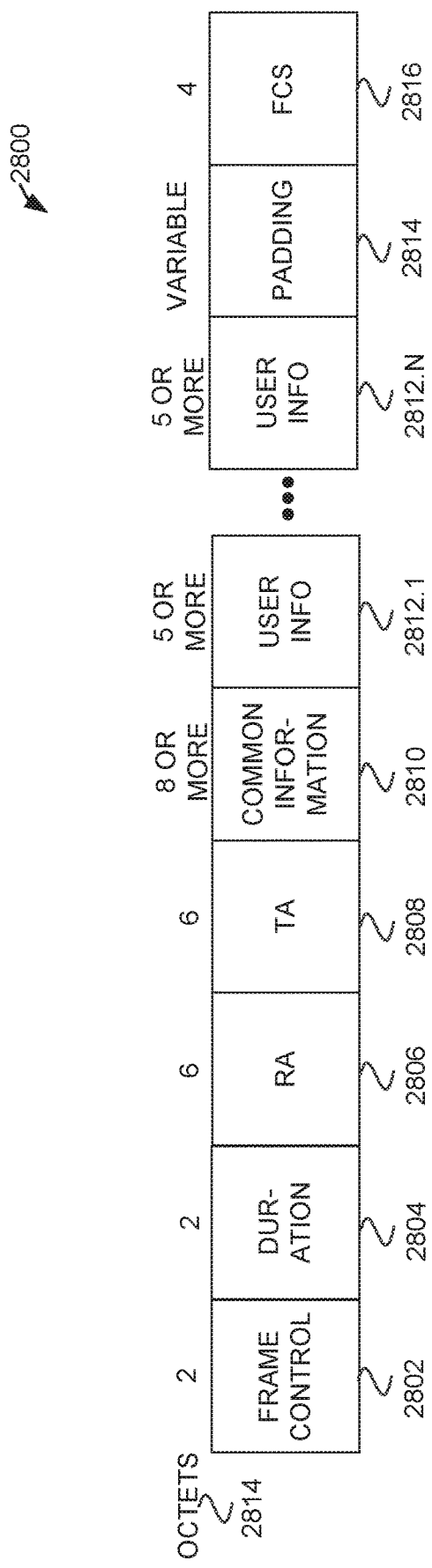
FIG. 28 illustrates a trigger frame in accordance with some embodiments.

FIG. 28 illustrates a trigger frame 2800 in accordance with some embodiments. The trigger frame 2800 may include a frame control field 2802, a duration field 2804, receive address (RA) field 2806, transmitter address (TA) field 2808, a common information field 2810, user information fields 2812, padding field 2814, and frame control sequence (FCS) field 2816.

The frame control field 2802 may include information relating to the type of the trigger frame 2800. For example, the frame control field 2802 may include a protocol version that indicates a protocol version of a media access control (MAC) portion of the trigger frame 2800. In some embodiments, the frame control field 2802 is 2 octets. In some embodiments, the frame control field 2806 is a different number of octets.

The duration field 2804 may be set to an estimated time for one or more response frames to the trigger frame 2800, which may include additional frames from the transmitter of the trigger frame 2800. The duration field 2804 may include information regarding how long wireless devices not identified in the trigger frame 2800 should set their network allocation vectors (not illustrated). The duration field 2804 may include a duration of a transmission opportunity. In some embodiments, the duration field 2804 is 2 octets. In some embodiments, the duration field 2804 is a different number of octets.

The RA field 2806 may be an address of the recipient HE station 504 or recipient HE AP 502. If the trigger frame 2800 is addressed to more than one HE station 504 and/or HE AP 502, then the RA field 2806 may be a broadcast address. In some embodiments, different addresses may be used for RA field 2806, e.g., a MAC address of the group of HE stations 504 and/or HE APs 502. In some embodiments, the RA field 2806 is 6 octets. In some embodiments, the RA field 2806 is a different number of octets.

The TA field 2808 may be the address of the RSTA (e.g. HE AP 502 that is transmitting the trigger frame 2800). In some embodiments, the TA field 2808 is the value of a BSS identification (ID)(BSSID)(not illustrated) when the trigger frame 2800 is addressed to STAs from at least two different BSS.

The common information field 2810 may include information that is common to two or more the STAs the trigger frame 2800 is for. An example common information field 2810 is given in FIG. 29.

The user information field 2812 may be one or more fields (e.g., 2812.1 through 2812.N) that are particular for a STA (e.g., HE station 504 and/or HE AP 502). In some embodiments, there are no user information fields 2812.

The padding field 2814 may include one or more octets to for padding. The padding field 2814 may pad the trigger frame 2800 so that a length of the trigger frame 2800 matches the number of bits required to end on a physical-level symbol boundary. The number of octets of the padding field 2814 may be variable to match the number of bits required to end on a physical-level symbol, or may be variable for other reasons.

The FCS field 2816 may be a checksum appended to the trigger frame 2800 that may be for detecting corruption of the trigger frame 2800. In some embodiments forward error correction information may be included in the FCS field 2816. One or more of the fields of the trigger frame 2800 may not be present, in accordance with some embodiments. In some embodiments, one or more additional fields may be included in the trigger frame 2800. As disclosed in conjunction with FIG. 29, there may be different types of trigger frames 2800, e.g., a null data packet (NDP) feedback report poll trigger frame.

Figure 29:
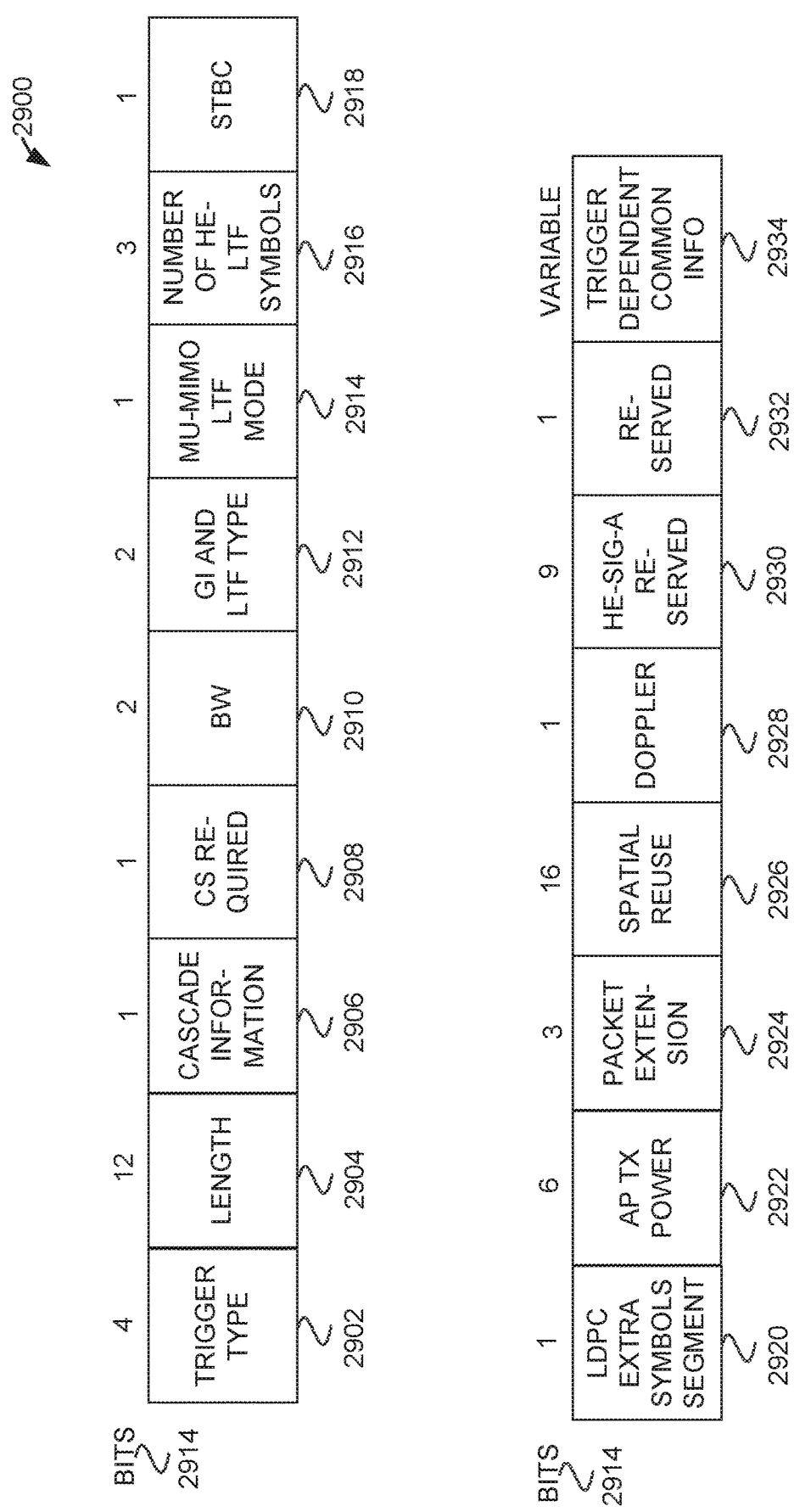
FIG. 29 illustrates a common information field in accordance with some embodiments.

FIG. 29 illustrates a common information field 2900 in accordance with some embodiments. The common information field 2900 may be the same or similar as common information field 2810.

The common information field 2900 may include a trigger type field 2902, a length field 2904, a cascade information field 2906, a carrier sense (CS) required field 2908, a bandwidth (BW) field 2910, a guard interval (GI) and a long-training field (LTF) type field 2912, a MU-MIMO LTF mode field 2914, a number of HE-LTF symbols field 2916, space-time block coding (STBC) field 2918, a low-density parity check (LDPC) extra symbols segment field 2920, AP transmit (TX) power field 2922, a packet extension field 2924, a spatial reuse field 2926, a Doppler field 2928, a HE-SIG-A reserved field 2930, a reserved field 2932, and a trigger dependent common information (INFO) field 2934. In some embodiments one or more of the fields of the common information field 2900 may not be present. In some embodiments one or more additional fields may be included in the common information field 2900.

The trigger type field 2902 may indicate a type of trigger frame. For example, Table 1 indicates some trigger frame types, in accordance with some embodiments.

TABLE 1

Trigger Frame Types

| Trigger Type Field 2902 Value | Description |
|---|---|
| 0 | Basic Trigger |
| 1 | Beamforming Report Poll |
| 2 | MU block acknowledgment request (BAR) |
| 3 | MU request to send (RTS) |
| 4 | Buffer Status Report Poll (BSRP) |
| 5 | Groupcast With Retries (GCR) |
| 6 | Bandwidth Query Report Poll (BQRP) |
| 7 | Null data packet (NDP) Feedback Report Poll |
| 8-15 | Reserved |

The length field 2904 may indicate the value of the L-SIG length field of a HE trigger-based PPDU that is the response to the trigger frame 2800, in accordance with some embodiments. The cascade information field 2906 may indicate if a subsequent trigger frame 2800 follows the current trigger frame 2800, in accordance with some embodiments. The carrier sense (CS) required field 2908 may indicate whether STAs identified in the user information fields 2812 are to perform energy detect (ED) and check a network allocation vector (NAV) prior to transmitting, in accordance with some embodiments.

The BW field 2910 indicates the bandwidth of a response frame in accordance with some embodiments. The GI and a LTF type field 2912 indicates the GI and HE-LTF type of the HE TB PPDU response in accordance with some embodiments.

The MU-MIMO LTF mode field 2914 indicates the LTF mode of the UL MU-MIMO HE TB PPDU response, in accordance with some embodiments. The number of HE-LTF symbols field 2916 indicates the number of HE-LTF symbols present in the HE TB PPDU that are in response to the trigger frame 900, in accordance with some embodiments. The STBC field 2918 indicates the status of STBC encoding of the HE TB PPDU that is in response to the trigger frame 2800, in accordance with some embodiments.

The LDPC extra symbols segment field 2920 indicates the status of the LDPC extra symbol segment in accordance with some embodiments. The AP TX power field 2922 indicates the combined average power per 20 MHz bandwidth referenced to the antenna connector in accordance with some embodiments. The packet extension field 2924 indicates the packet extension duration of the HE TB PPDU that is the response to the trigger frame 2800.

The spatial reuse field 2926 indicates information related to whether spatial reuse is permitted. For example, the spatial reuse field 2926 indicates a value (20 MHz, 40 MHz, 80 MHz, 160 MHz) of the HE-SIG-A field of the HE TB PPDU that is in response to the trigger frame 2800. The Doppler field 2928 indicates a high Doppler mode of transmission. The HE-SIG-A reserved field 2930 indicates the values of the reserved bits in the HE-SIG-A2 subfield of the HE TB PPDU that is in response to the trigger frame 2800, in accordance with some embodiments. The reserved field 2932 may be a reserved field for future use, in accordance with some embodiments. The trigger dependent common information field 2934 may be a common information field 2934 for different trigger types 2902.

Figure 30:
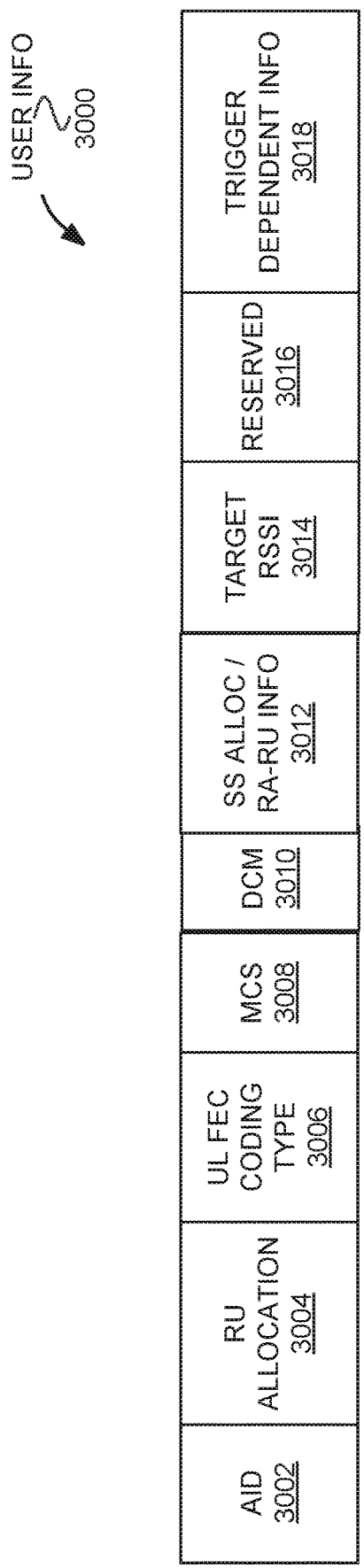
FIG. 30 illustrates a user information field in accordance with some embodiments.

FIG. 30 illustrates a user information field 3000 in accordance with some embodiments. The user information field 3000 may include one or more of the following fields AID 3002, RU allocation field 3004, FEC coding type field 3006, MCS 3008, DCM field 3010, SS allocation/RA-RU information field 3012, target RSSI 3014, reserved 3016, trigger dependent information field 3018, deferral transmission type field 3020. The AID 3002 may be an AID of STA or an indication that the user information 3000 is for any associated station or an unassociated station. In some embodiments, the AID may indicate a neighboring AP. In some embodiments, a value of the AID field 3002 may indicate any neighboring AP. In some embodiments, a RSSI may be encoded in another field, and a neighboring AP that receives the trigger frame 2800 will respond if the RSSI of the trigger frame 2800 is at least the RSSI indicated by one of the fields of the trigger frame 2800. The RU allocation 3004 indicates a subchannel for the station to use to transmit a transmission, e.g., TB PPDU. The FEC coding type field 3006 indicates the code type of the HE/EHT TB PPDU that is the response to the trigger frame 2800, e.g., 0 to indicate binary convolution coding (BCC) and 1 to indicate low-density parity check (LDPC). MCS field 3008 indicates a modulation and coding scheme (MCS) to use for the HE/EHT TB PPDU. The DCM field 3010 indicates the dual carrier modulation (DCM) of the HE/EVT TB PPDU that is the response to the trigger frame 2800.

The SS allocation/RA-RU information field 3012 indicates a number of spatial streams for the RU or may indicate a number resource allocation (RAs) for random access use. The target RSSI field 3014 may indicate the expected receive signal power, averaged over the APs antenna connectors, for the HE TB PPDU transmitted on the assigned RU (indicated in RU allocation 3004) at the AP that transmitted the trigger frame 2800. In some embodiments, the target RSSI 3014 may indicate a minimum RSSI of the received trigger frame 2800 for a neighboring or overlapping AP to respond to the trigger frame 2800. The reserved field 3016 indicates portions of the user information 3000 that may be assigned for future use. The trigger dependent information field 3018 may indicate information that is particular for a particular type of trigger frame, e.g., a trigger frame for FTM.

Figure 31:
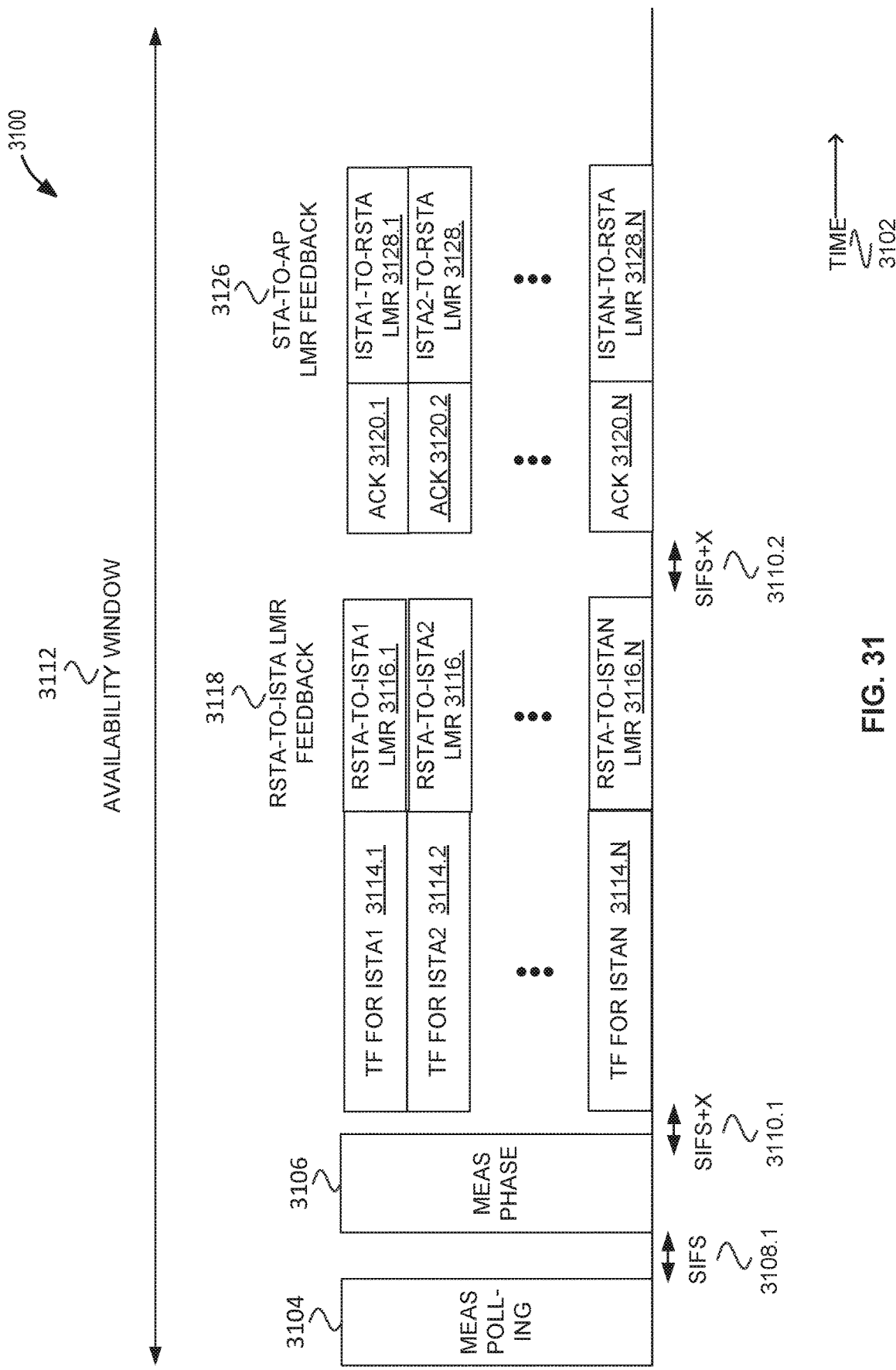
FIG. 31 illustrates two-sided MU LMR feedback with aggregated TFs in accordance with some embodiments.

FIG. 31 illustrates two-sided MU LMR feedback with aggregated TFs 3100 in accordance with some embodiments. FIG. 31 illustrates time 3102, measurement polling 3104, SIFS 3108.1, measurement phase 3106, SIFS+X 3110.1, TF for ISTAs 3114, (RSTA-to-ISTA) LMR 3116, RSTA-to-ISTA LMR feedback 3118, SIFS+X 3110.2, ACKs 3120, LMR RSTA-to-ISTA LMR 3128, ISTA-to-RSTA LMR feedback 3126, and availability window 3112. The RSTA may transmit TF for ISTA1 3114.1 and RSTA-to-ISTA LMR STA1 3116.1 as part of a HE MU PPDU that includes an A-MPDU. ISTA1 may decode RSTA-to-ISTA LMR STA1 3116.1 to receive the LMR for STA1 and the TF for ISTA1 3114.1 for a TF (e.g., 2800) that provides the information for ISTA1 to transmit ACK 3120.1 and ISTA-to-RSTA LMR STA1 3128.1. In some embodiments, ISTA1 only transmits one of ACK 3120.1 and ISTA-to-RSTA LMR STA1 3128.1. ISTA1 is used as an example, the other STAs 2 through N may be configured the same or similar as ISTA1. The TF (e.g., 2800) provides more flexibility as it provides more parameters for how the ACK 3120.1 and ISTA-to-RSTA LMR STA1 3128.1 are to be transmitted, e.g., in a HE TB PPDU with the ACK 3120.1 and ISTA-to-RSTA LMR STA1 3128.1 in an A-MPDU. In FIGS. 26, 27, and 31-39, the LMR from the ISTA to the RSTA is illustrated as being transmitted on the same RU as the RSTA-to-ISTA LMR from the RSTA to the ISTA, but a different RU may be indicated by the TRS or TF.

Figure 32:
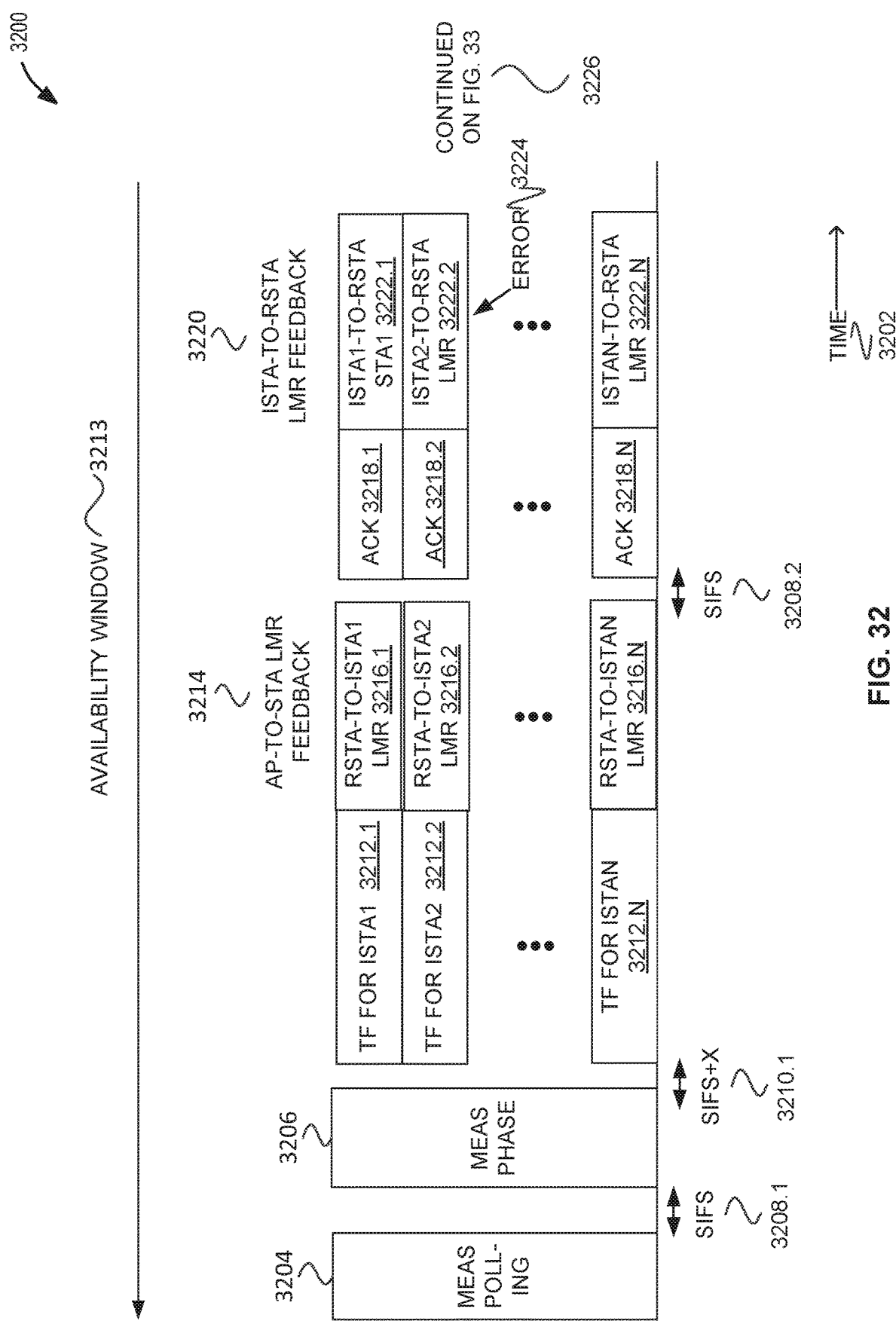
FIGS. 32 and 33 illustrates two-sided MU LMR feedback with aggregated TFs in accordance with some embodiments.
Figure 33:
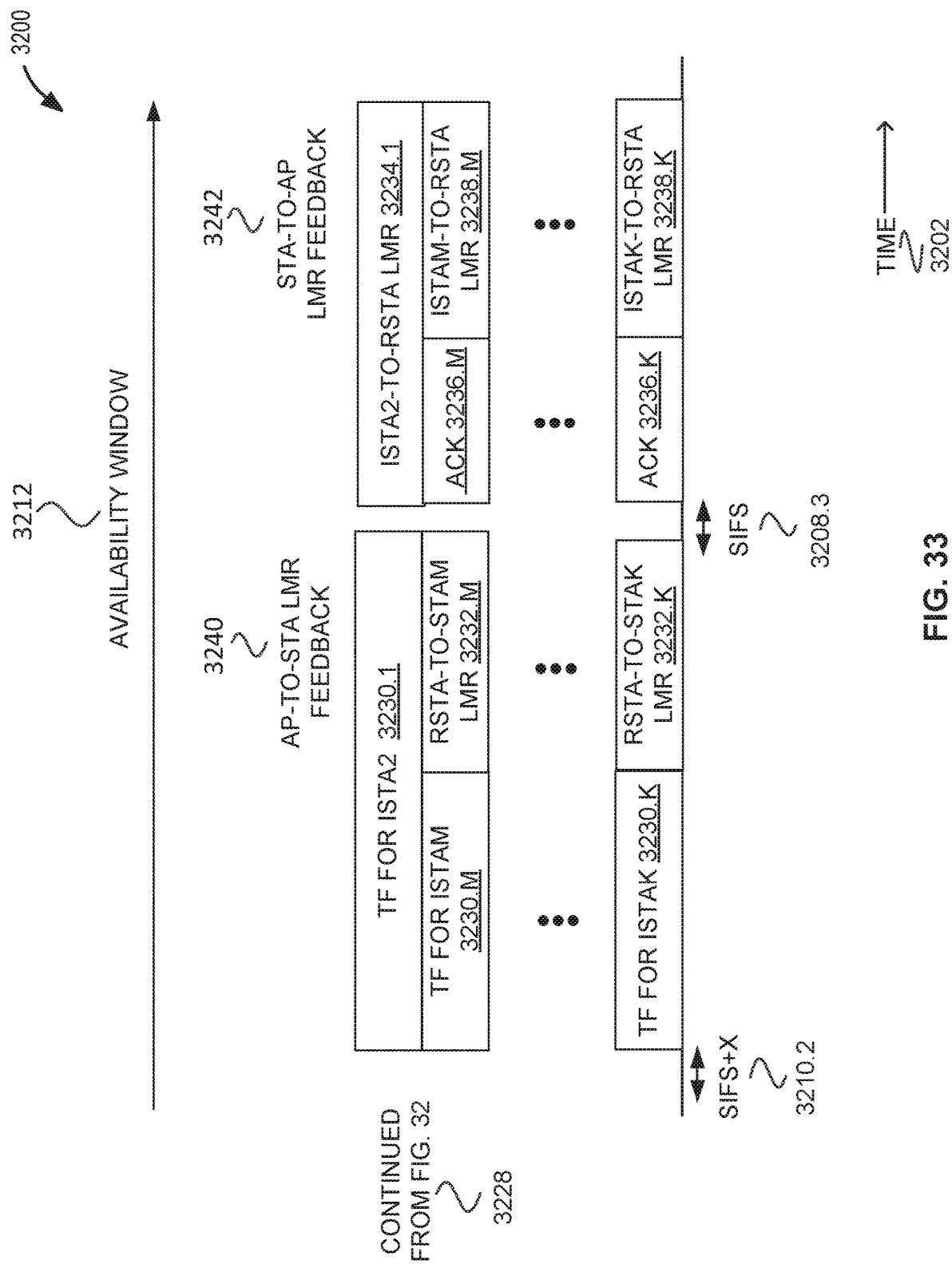

FIGS. 32 and 33 illustrates two-sided MU LMR feedback with aggregated TFs 3200 in accordance with some embodiments. FIG. 32 illustrates time 3202, measurement polling 3204, SIFS 3208, measurement phase 3210, SIFS+X 3210.1, TF for ISTAs 3212, RSTA-to-ISTA LMR 3216, SIFS 3208, ACKs 3218, ISTA-to-RSTA LMR 3222, and availability window 3213. The TF for ISTAs 3214 and RSTA-to-ISTA LMR 3216 may be a HE MU PPDU transmitted by an RSTA (e.g., HE AP 502). The TF for ISTAs 3214 may be a TF (e.g., 2800) that indicates UL RU for the ISTAs to transmit the ACKs 3218 and the ISTA-to-RSTA LMR STAs 3220. The ISTAs (e.g., HE STA 504) may transmit ACKs 3218 and ISTA-to-RSTA LMR STAs 3222 in accordance with a corresponding RU indicated in the TF for ISTAs 3212. The ISTA-to-RSTA LMR STA2 3222.2 may have an error 3224, e.g., not received by the RSTA or not transmitted by the ISTA. FIG. 33 is a continuation of FIG. 32. FIG. 33 illustrates SIFS+X 3210.2, TF for ISTA2 3230.1, TF for ISTAs 3230, ISTA-to-RSTA LMR 3232, SIFS 3208.3, ISTA-to-RSTA LMR 3234.1, ACKS 3236, and ISTA-to-RSTA LMR 3238. The RSTA may transmit a new TF for ISTA2 3230.1 because the ISTA-to-RSTA LMR 3222.2 was received in error 3224. The RSTA may transmit the TF for ISTA2 3230.1 simultaneously with other TF for ISTAs 3230 and RSTA-to-ISTA LMR 3232. ISTA2 may retransmit the ISTA2-to-RSTA LMR 3234.1 in accordance with the TF for ISTA2 3230.1 (e.g., 2800).

Figure 34:
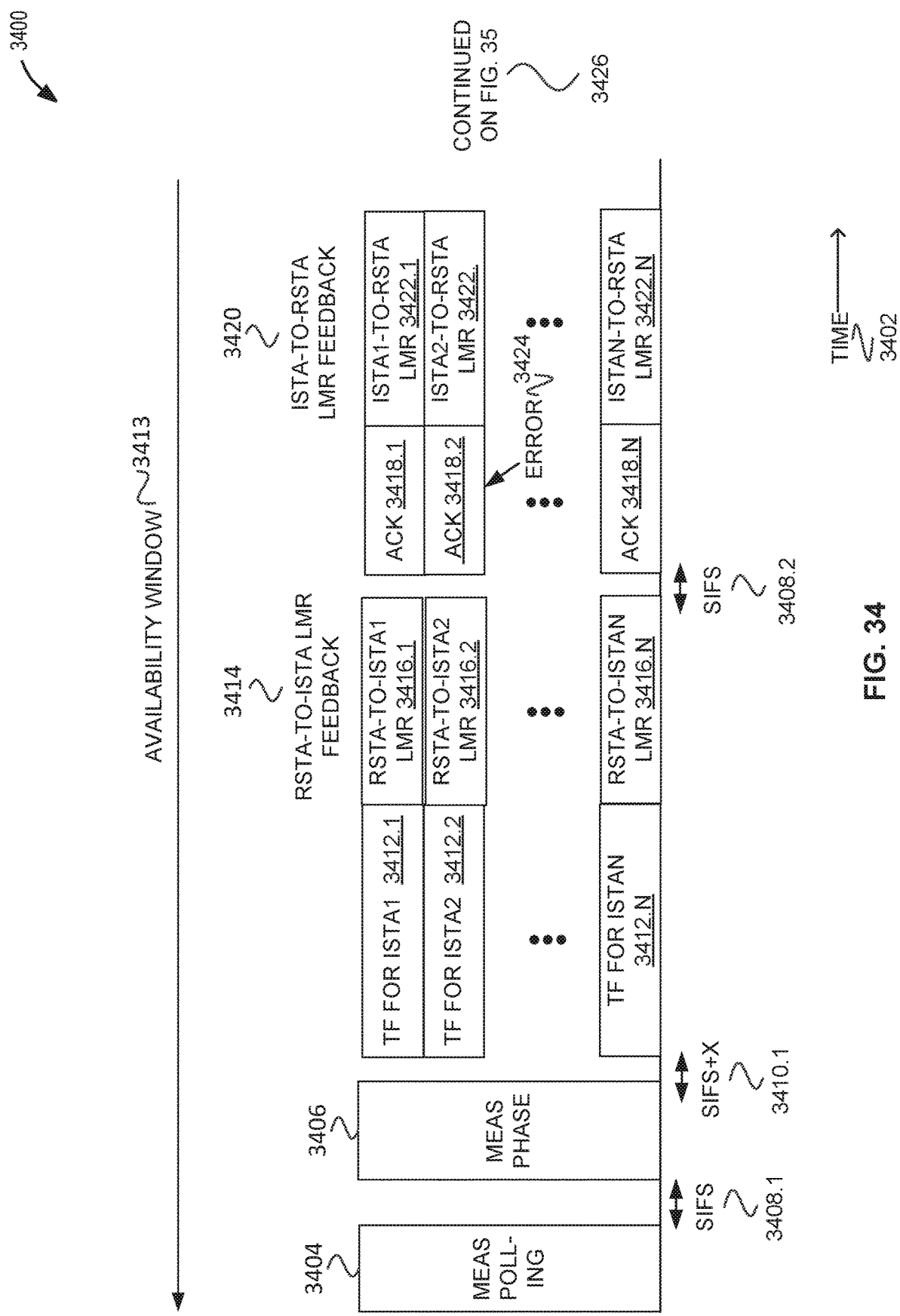
FIGS. 34 and 35 illustrates two-sided MU LMR feedback with aggregated TFs in accordance with some embodiments.
Figure 35:
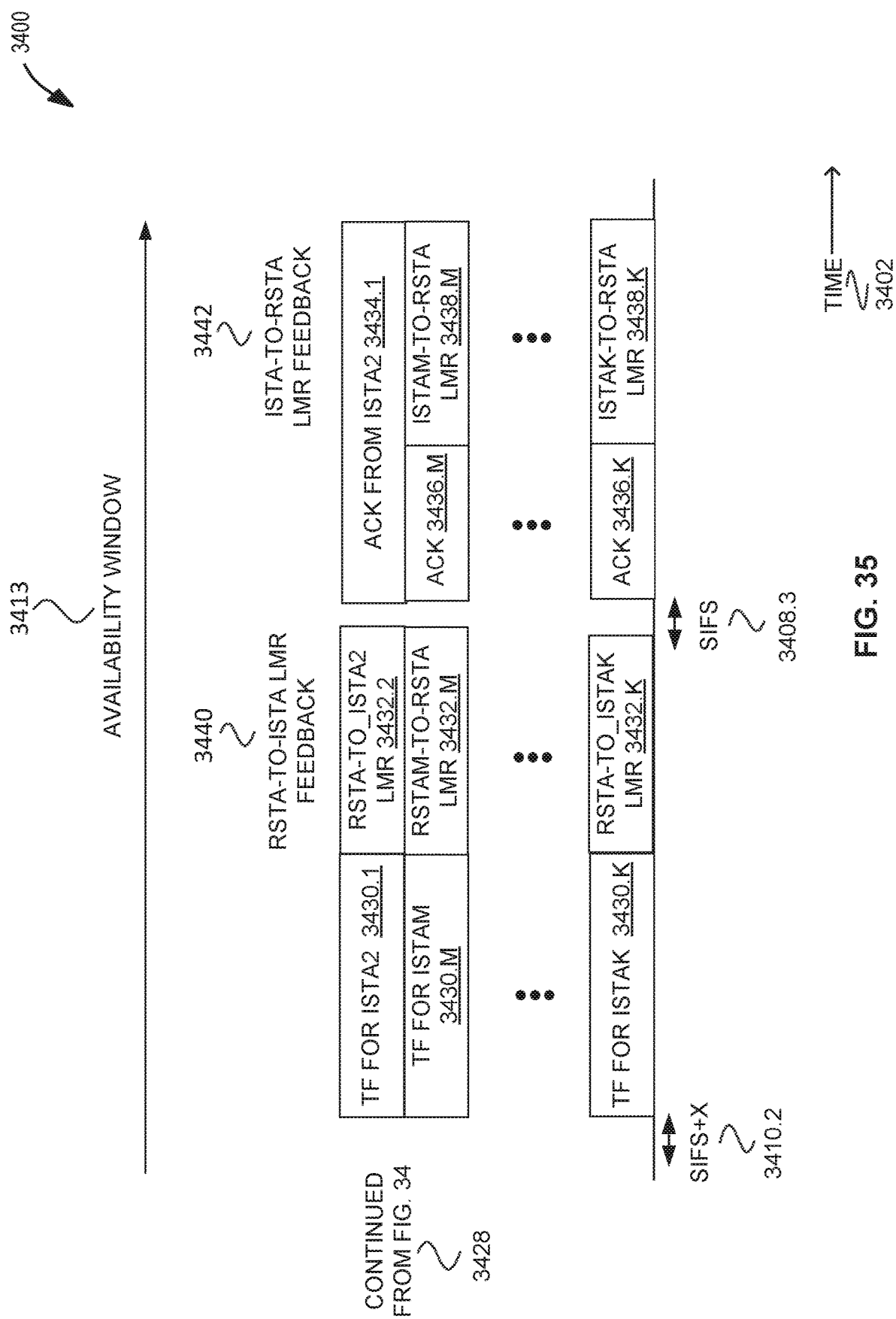

FIGS. 34 and 35 illustrates two-sided MU LMR feedback with aggregated TFs 3400 in accordance with some embodiments. Illustrated in FIG. 34 is measurement polling 3404, SIFS 3408.1, measurement phase 3406, SIFS+X 3410.1, TF for ISTAs 3412, RSTA-to-ISTA LMR 3416, SIFS 3408.2, ACKs 3418, ISTA-to-RSTA LMR 3422, and availability window 3413. The RSTA (e.g., HE AP 502) may transmit TF for ISTAs 3412 and RSTA-to-ISTA LMR 3416. The TF for ISTAs 3412 (e.g., 2800) may include UL RUs for the STAs to transmit ACKs 3418 and ISTA-to-RSTA LMR 3422. The TF for ISTAs 3412 and RSTA-to-ISTA LMR 3416 may a HE MU PPDU with separate A-MPDUs for the STAs. The LMRs may be based on the measurement phase 3406 (or a previous round). The ISTAs (e.g., HE STA 504) may transmit ACKs 3418 and ISTA-to-RSTA LMR 3422 in response to the TF for ISTAs 3412 and RSTA-to-ISTA LMR 3416.

The ACKs 3418 may be optional. The ISTA-to-RSTA LMR STAs 3422 may be optional. There may be an error 3424 with ACK 3418 in that it may not have been received correctly by the RSTA; however, ISTA-to-RSTA LMR 3422.2 may be received correctly by the RSTA. FIG. 35 is a continuation of FIG. 34. FIG. 35 illustrates SIFS+X 3410.2, TF for ISTAs 3430, RSTA-to-ISTA LMR 3432, SIFS 3408.3, ACK from ISTA2 3434.1, ACKs 3436, ISTA-to-RSTA LMR 3438. The RSTA may transmit a new TF for ISTA2 3430 and a new RSTA-to-ISTA LMR 3432.2 because there was an error 3224 with ACK 3218.2. ISTA2 may transmit ACK from ISTA2 3434.1, which may be received without error by the RSTA. The TF for ISTA2 3430 and/or RSTA-to-ISTA LMR STA2 3432 may indicate that the ISTA-to-RSTA LMR 3422.2 does not need to be retransmitted to the RSTA.

Figure 36:
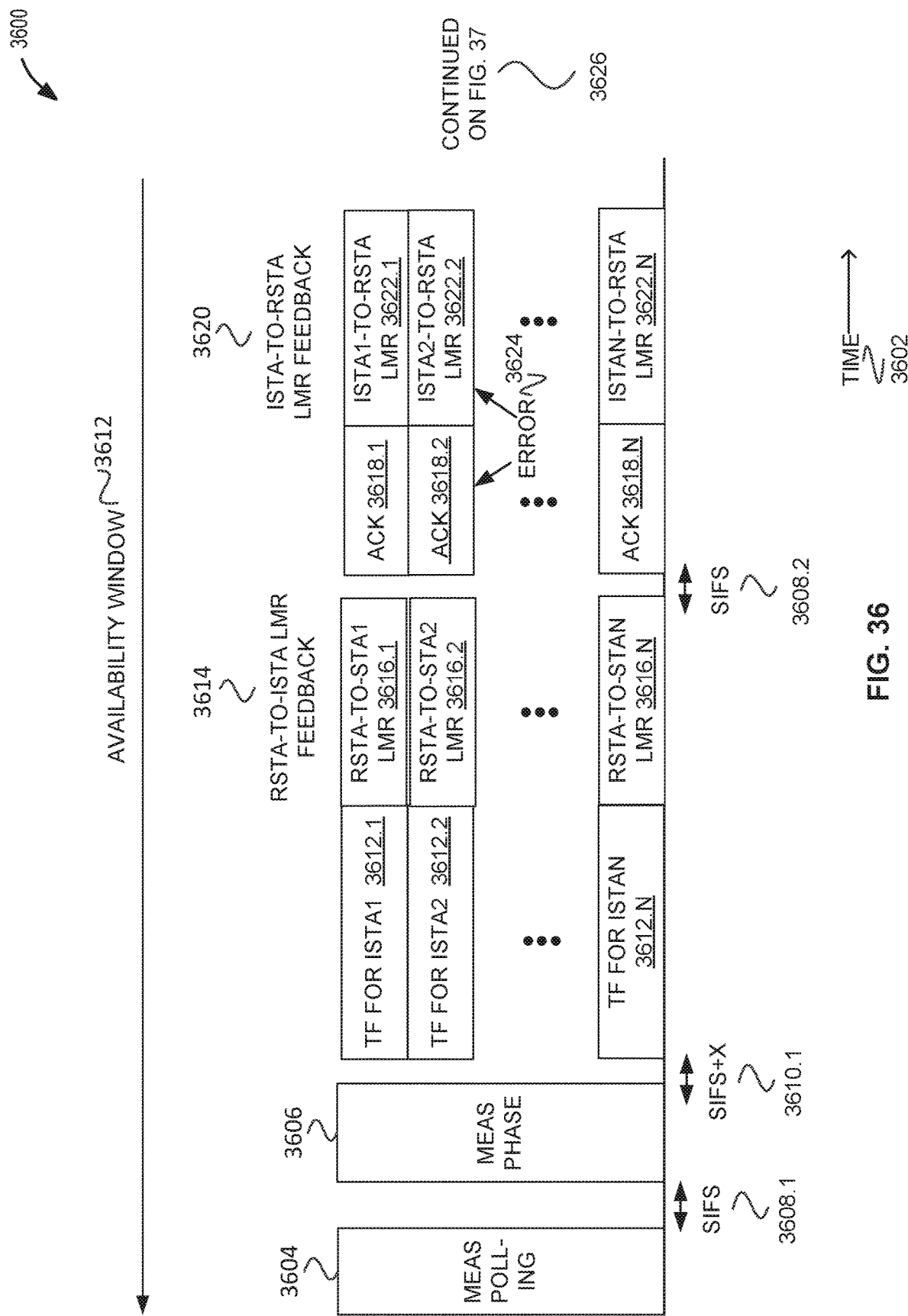
FIGS. 36 and 37 illustrates two-sided MU LMR feedback with aggregated TFs in accordance with some embodiments.
Figure 37:
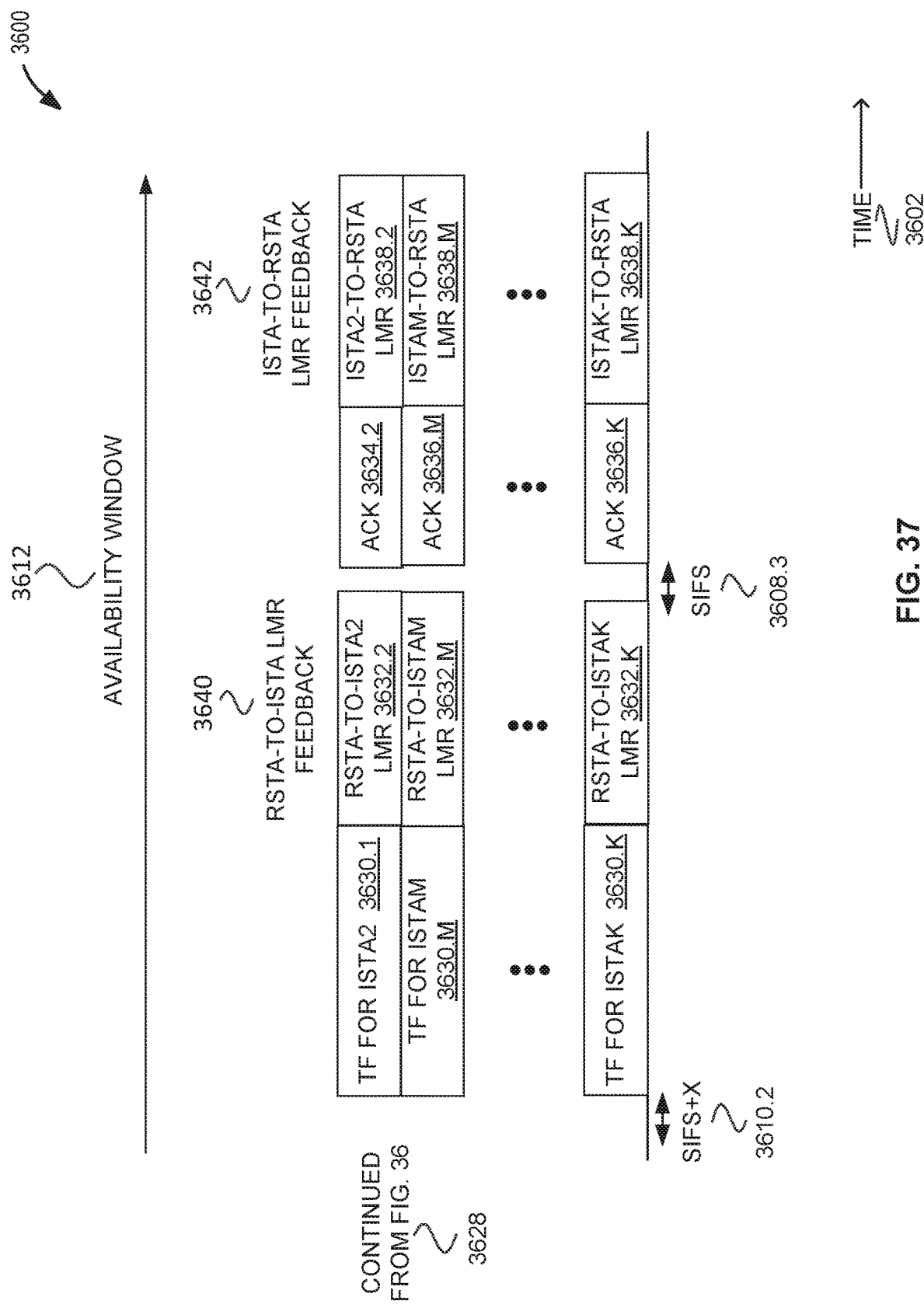

FIGS. 36 and 37 illustrates two-sided MU LMR feedback with aggregated TFs 3600 in accordance with some embodiments. Illustrated in FIG. 36 is time 3602, measurement polling 3604, SIFS 3608.1, measurement phase 3606, SIFS+X 3610, TF for ISTAs 3612, RSTA-to-ISTA LMR 3616, SIFS 3608.2, ACKs 3618, ISTA-to-RSTA LMR 3622. The RSTA may transmit TF for ISTAs 3612 and RSTA-to-ISTA LMR 3616 as part of a HE MU PPDU or multiple HE MU PPDUs. The TF for ISTAs 3612 (e.g., 2800) may include UL RUs for ACKs 3618 and ISTA-to-RSTA LMR 3622. The ISTAs may transmit ACKs 3818 for the RSTA-to-ISTA LMR STAs 3616 and ISTA-to-RSTA LMR STAs 3622. The ACKs 3618 may be optional. The ACKs 3618 and ISTA-to-RSTA LMR STAs 3622 may be combined in a HE TB PPDU in a A-MPDU. The ACK 3618.2 and ISTA-to-RSTA LMR STA2 3622.2 may have an error 3624 so that they are not received by the RSTA.

FIG. 37 is a continuation of FIG. 36. FIG. 37 illustrates SIFS+X 3610.2, TF for ISTAs 3630, RSTA-to-ISTA LMR 3632, SIFS 3608.3, SIFS 3608.3, ACKs 3634, and ISTA-to-RSTA LMR 3638. Because of the error 3624, the RSTA may send a new TF for ISTA2 3630.1 with a new round of RSTA-to-ISTA LMR feedback 3640 and a new RSTA-to-ISTA LMR 3632.2. ISTA2 may transmit ACK 3624.2 and ISTA-to-LMR STA2 3638.2 in response to the TF for ISTA2 3630.1 and the ISTA-to-RSTA LMR 3632.2. The ACK 3634.2 may be optional, in accordance with some embodiments.

Figure 38:
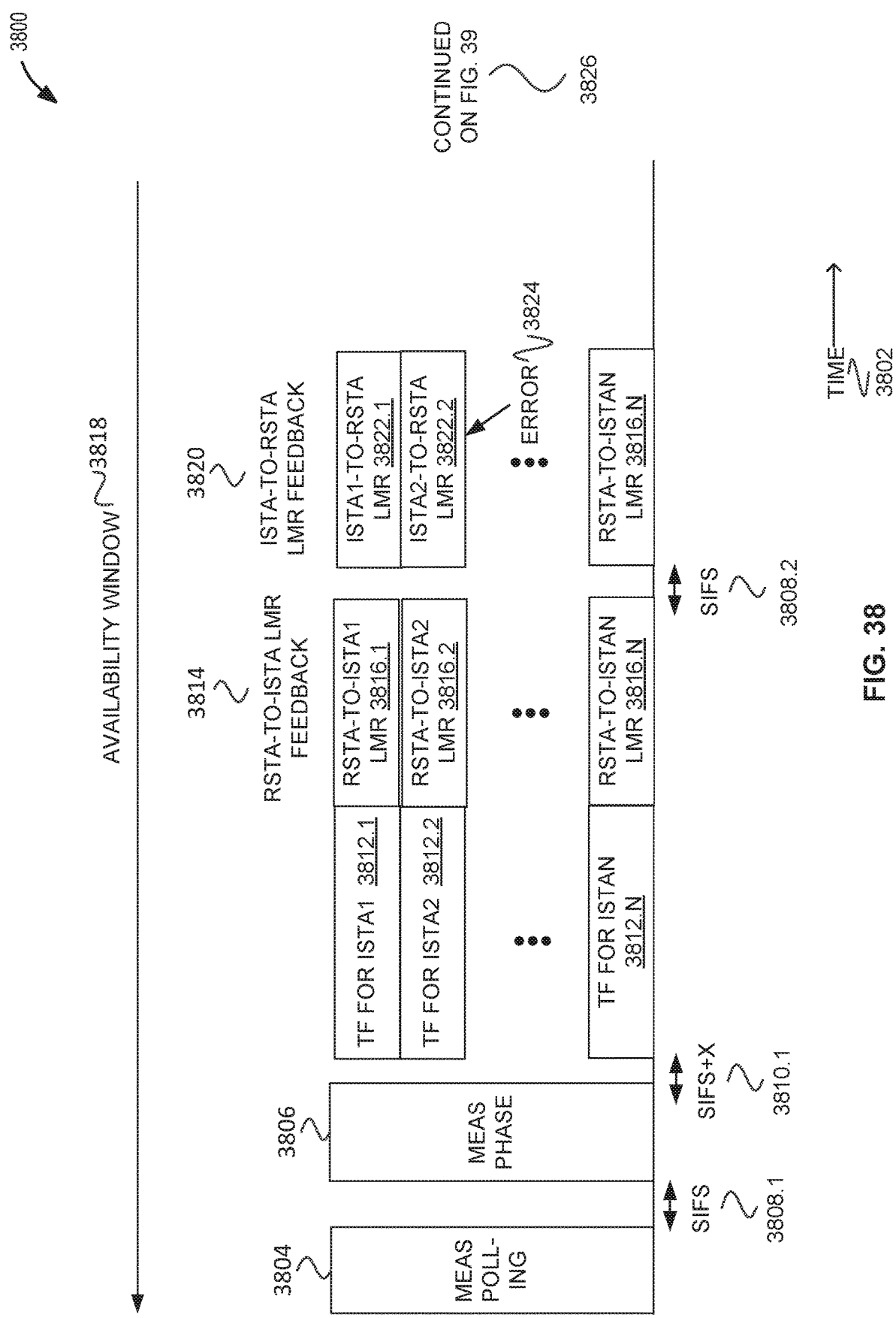
FIGS. 38 and 39 illustrates two-sided MU LMR feedback with aggregated TFs in accordance with some embodiments.
Figure 39:
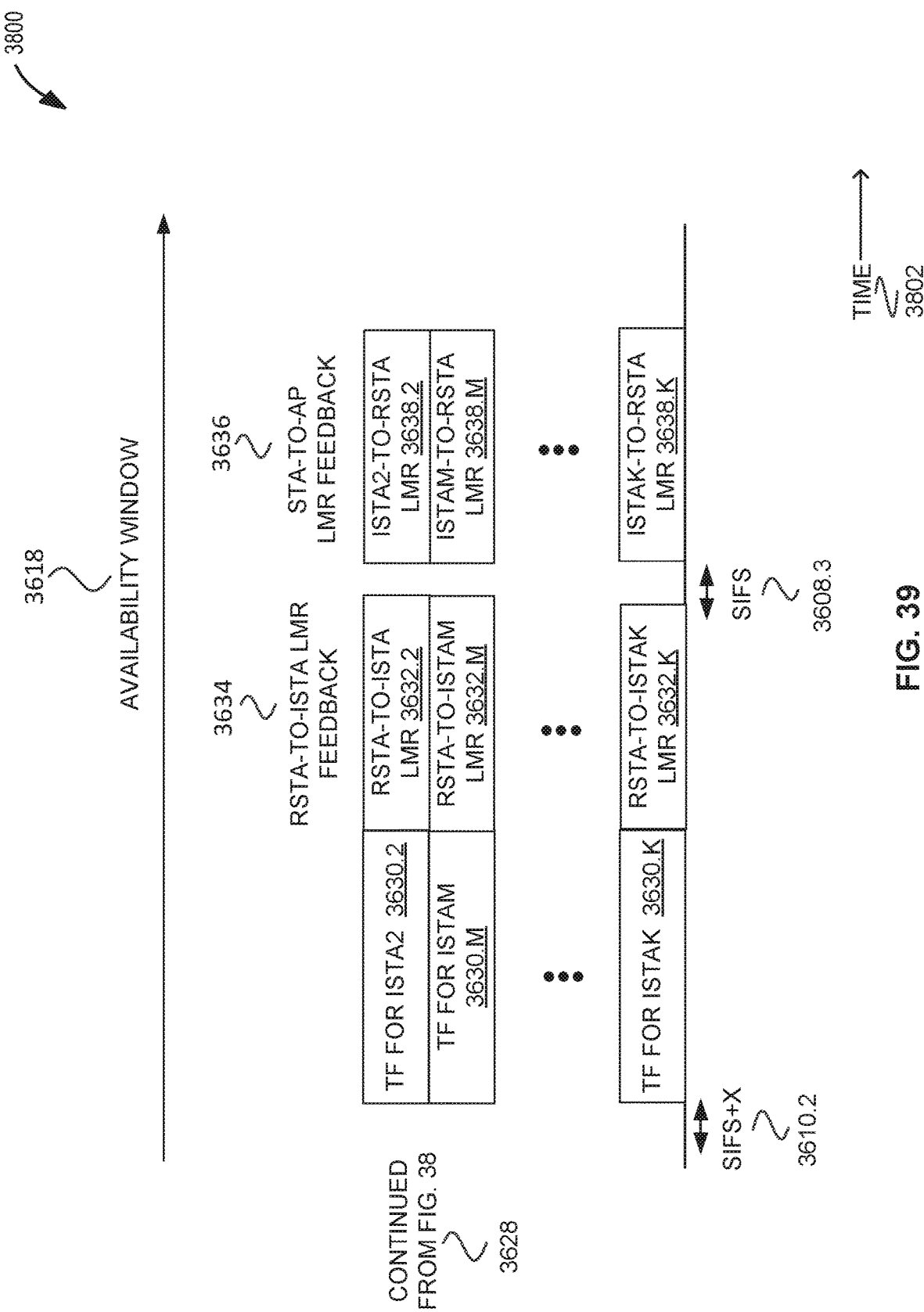

FIGS. 38 and 39 illustrates two-sided MU LMR feedback with aggregated TFs 3800 in accordance with some embodiments. Illustrated in FIG. 38 is measurement polling 3804, SIFS 3808.1, measurement phase 3806, SIFS+X 3810.1, TF for ISTAs 3812, RSTA-TO-ISTA LMR 3816, RSTA-To-STA LMR feedback 3814, SIFS 3808.2, ISTA-TO-RSTA LMR 3822, ISTA-To-RSTA LMR feedback 3820, and availability window 3818. The RSTA may transmit TF for ISTAs 3812 and RSTA-TO-ISTA LMR 3816. The TF for ISTAs 3812 and RSTA-TO-ISTA LMR 3816 may be one or more HE MU PPDUs. The STAs may transmit ISTA-TO-RSTA LMR 3822 in response to the TF for ISTAs 3812 and RSTA-TO-ISTA LMR 3816 in accordance with the TF for ISTAs 3812. The ISTA-TO-RSTA LMR 3822.2 may have an error 3824 so that it is not received by the AP.

FIG. 39 is a continuation of FIG. 38. FIG. 39 illustrates SIFS+X 3610.2, TF for ISTAs 3630, RSTA-TO-ISTA LMR 3632, SIFS 3608.3, ISTA-TO-RSTA LMR 3638, RSTA-To-ISTA LMR feedback 3634, ISTA-To-RSTA LMR feedback 3636, availability window 3618 continued from FIG. 38, and time 3802 continued from FIG. 38.

The RSTA may transmit new TF for ISTAs 3630 and RSTA-TO-ISTA LMR 3632, which may be for different ISTAs than TF for ISTAs 3812 and RSTA-TO-ISTA LMR 3816. The RSTA may include TF for ISTA2 3630.2 and RSTA-TO-ISTA LMR 3632.2 for ISTA2 because of the error 3824. ISTA2 may transmit ISTA-TO-RSTA LMR 3638.2 which may be a retransmission of the LMR of ISTA2-TO-RSTA LMR 3822.2.

In FIGS. 31-39 the TF (e.g., 2800) may be replaced with a TRS (e.g., 2500), in accordance with some embodiments. In FIGS. 31-39 the LMRs from the RSTA to ISTAs and the LMRs from the ISTAs to the RSTA may be for current round N of measurements or a previous round of measurements (e.g., N−1), in accordance with some embodiments. In FIGS. 31-39 the LMRs from the RSTA to ISTAs and the LMRs from the ISTAs to the RSTA may be for current round N of measurements and include a previous round of measurements (e.g., N−1), in accordance with some embodiments. In FIGS. 31-39 the LMRs from the RSTA to ISTAs and the LMRs from the ISTAs to the RSTA may be in accordance with one or more of FIGS. 17-19.

In FIGS. 31-39, in accordance with some embodiments, if a ISTA receives the TF for the ISTA correctly, but does not receive the LMR for the ISTA (or there is an error), then the ISTA will not send the LMR for the RSTA to indicate that the LMR for the ISTA was received in error. In FIGS. 31-39, the RSTA may send ACK or block ACKs to acknowledge receipt of the LMRs from the ISTAs.

Figure 40:
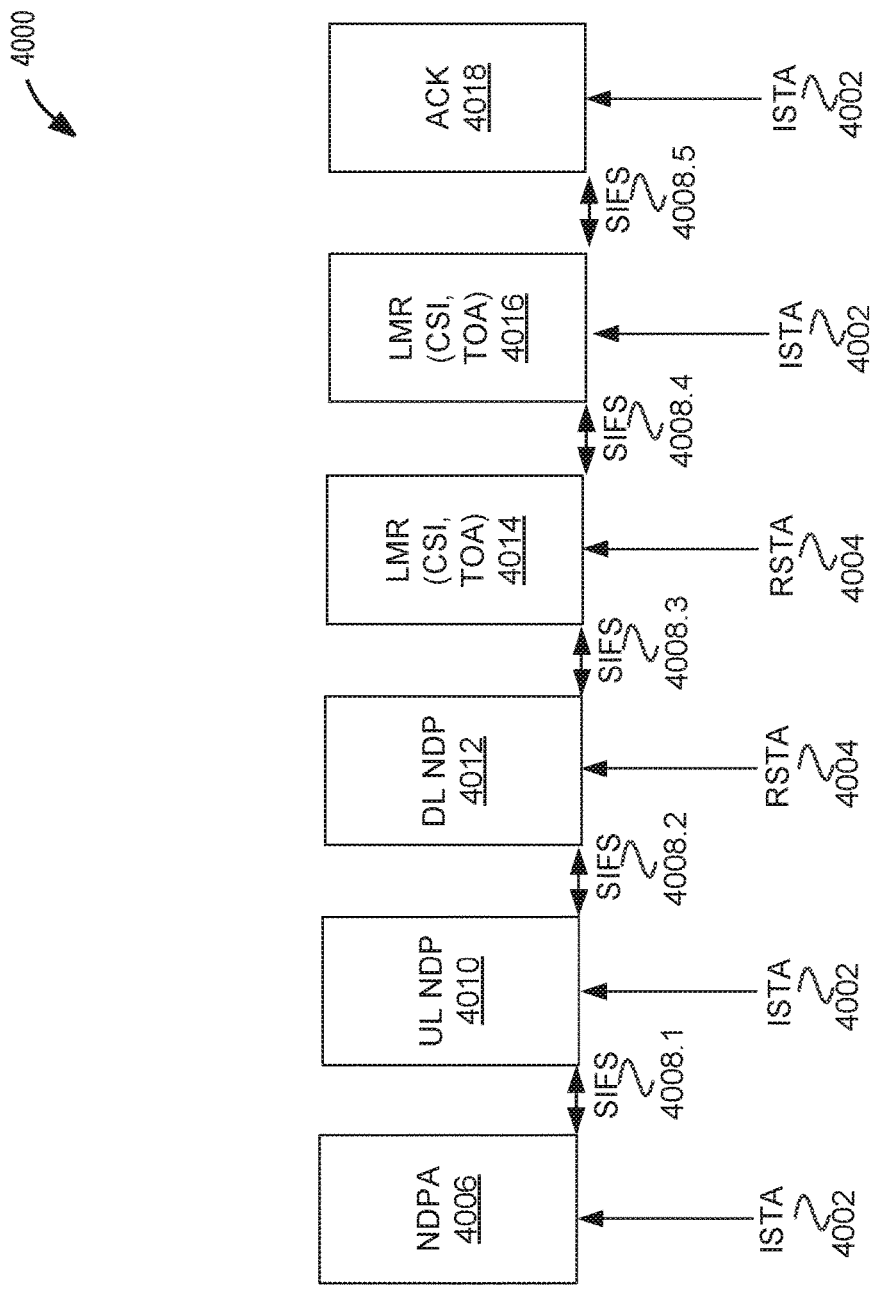
FIG. 40 illustrates a round N measurement sequence in accordance with some embodiments.

FIG. 40 illustrates a round N measurement sequence 4000 in accordance with some embodiments. FIG. 40 illustrates NDPA 4006, SIFS 4008.1, UL NDP 4010, SIFS 4008.2, DL NDP 4012, SIFS 4008.3, LMR (CSI, TOA) 4014, SIFS 4008.4, LMR (CSI, TOA) 4016, SIFS 4008.5, ACK 4018, ISTA 4002, and RSTA 4004. The indication of ISTA 4002 or RSTA 4004 indicates the transmitter of the PPDU. The ISTA 4002 and RSTA 4004 may be a HE AP 502 and/or HE STA 504. The NDPA 4006 may be a NDPA, e.g., 1110. The UL NDP 4010 may be a UL NDP, e.g., 1114. The DL NDP 4012 may be a DL NDP, e.g., 1116. The LMR (CSI, TOA) 4014 may be a LMR, e.g., 1118. The LMR (CSI, TOA) 4016 may be a LMR, e.g., ISTA-to-RSTA LMR 1120. The ACK 4018 may acknowledge the receipt of the LMR (CSI, TOA) 4016.

Figure 41:
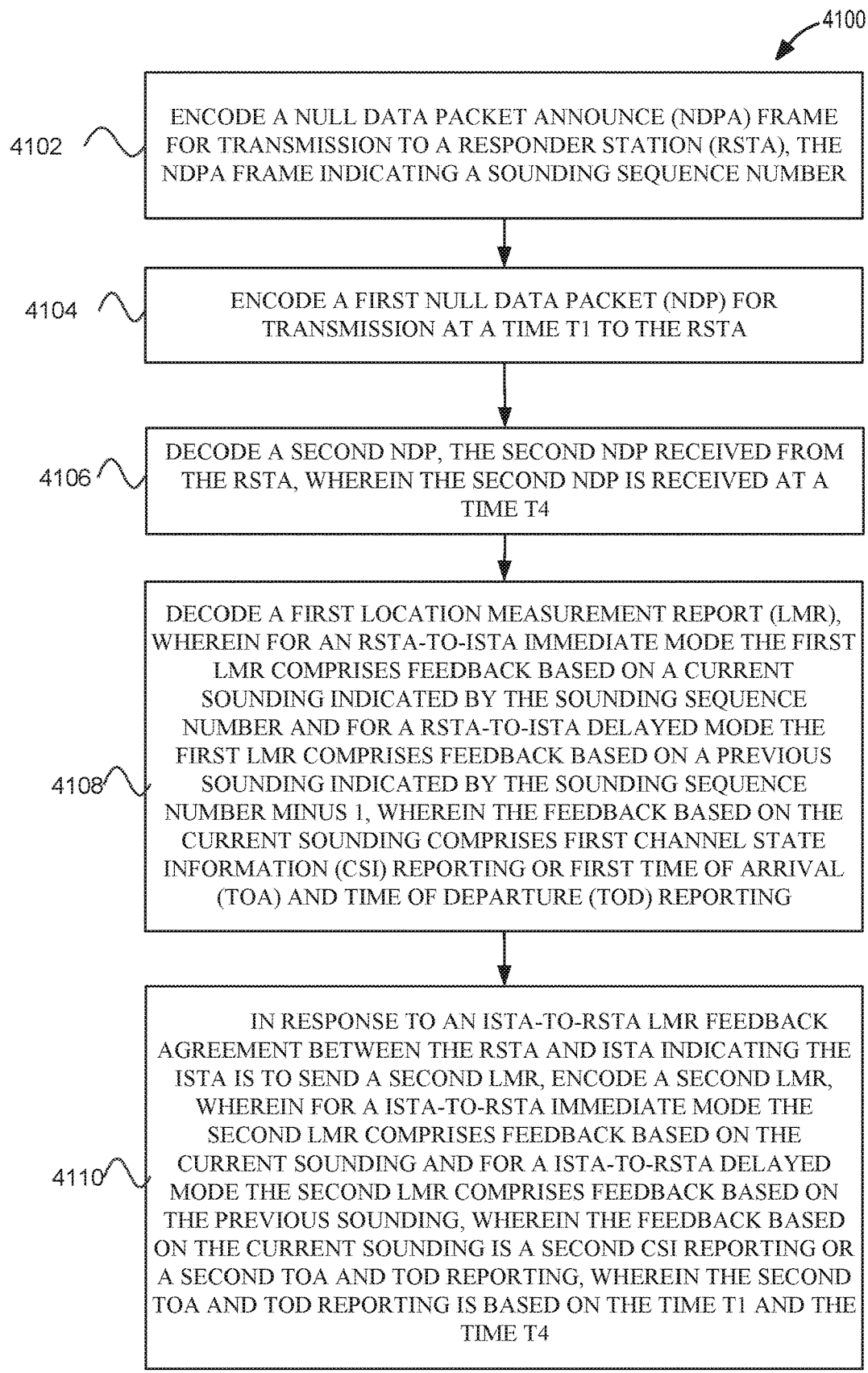
FIG. 41 illustrates a method for LMR in accordance with some embodiments.

FIG. 41 illustrates a method 4100 for LMR in accordance with some embodiments. The method 4100 begins at operation 4102 with encoding a NDPA frame for transmission to a RSTA, the NDPA frame indicating a sounding sequence number. For example, ISTA 1102 may encode NDPA 1110. The NDPA 1110 may include sounding dialog token 1510, which may indicate a sounding sequence number. The method 4100 may continue with generating signaling to cause the ISTA to transmit the NDPA frame to a RSTA. For example, an apparatus of the ISTA 1102 may generating signaling to cause the ISTA 1102 to transmit the NDPA 1110.

The method 4100 may continue at operation 4104 with encoding a first NDP for transmission at a time T1 to the RSTA. For example, ISTA 1102 may encode UL NDP 1114. For example, an apparatus of the ISTA 1102 may generate signaling to cause ISTA 1102 to transmit the UL NDP 1114 at time T1, e.g., 904 of FIG. 9. The method 4100 continues at operation 4106 with decoding a second NDP, the second NDP received from the RSTA, where the second NDP is received at a time T4. For example, ISTA 1102 may decode DL NDP 1116 that may be received at a time T4, e.g., time T4 910.

The method 4100 continues at operation 4108 with decoding a first LMR, wherein for an RSTA-to-ISTA immediate mode the first LMR comprises feedback based on a current sounding indicated by the sounding sequence number and for a RSTA-to-ISTA delayed mode the first LMR comprises feedback based on a previous sounding indicated by the sounding sequence number minus 1, where the feedback based on the current sounding comprises first CSI reporting or first TOA and TOD reporting. For example, ISTA 1102 may decode RSTA-to-ISTA LMR 1118 that may include a LMR frame 1700, 1800, 1900, which may include the CSI reporting and/or TOA and TOD reporting. The LMR frame 1700, 1800, 1900 may include either feedback from the current sounding sequence (RSTA-to-ISTA immediate mode) or the immediately previous sounding sequence (RSTA-to-ISTA delayed mode). In some embodiments, the sounding sequence number indicated by the NDPA 1110 indicates whether the RSTA-to-ISTA LMR 1118 has feedback for delayed or immediate, e.g., if the sounding sequence number in the NDPA 1110 is the same as a previous sounding sequence then it is delayed. The RSTA 1104 may transmit feedback that matches a sounding sequence in the NDPA 1110, in accordance with some embodiments, i.e., either a current sounding sequence or a previous sounding sequence.

The method 4100 continues at operation 4110 with in response to an ISTA-to-RSTA LMR feedback agreement between the RSTA and ISTA indicating the ISTA is to send a second LMR, encode a second LMR, where for a ISTA-to-RSTA immediate mode the second LMR includes feedback based on the current sounding and for a ISTA-to-RSTA delayed mode the second LMR comprises feedback based on the previous sounding, where the feedback based on the current sounding is a second CSI reporting or a second TOA and TOD reporting, where the second TOA and TOD reporting is based on the time T1 and the time T4, and generate signaling to cause the ISTA to transmit the second LMR to the RSTA.

For example, ISTA 802 may determine that there is a ISTA-to-RSTA LMR feedback agreement between the ISTA 802 and RSTA 804. In some embodiments, the LMR feedback agreement between the ISTA 802 and RSTA 804 may be formed at a service agreement. The ISTA 1102 may determine whether to encode the ISTA-to-RSTA LMR 1120 with the current feedback (e.g., from UL NDP 1114 and DL NDP 1116) if a feedback mode is an ISTA-to-RSTA immediate mode. If a feedback mode is an ISTA-to-RSTA delayed mode, then the feedback may be from a previous round, FTM sequence, or sounding sequence, e.g., the immediately previous sounding sequence. The RSTA-to-ISTA LMR 1118 and/or ISTA-to-RSTA LMR 1120 may include a dialog token field 1706 that indicates a round, FTM sequence, or sounding sequence. In some embodiments, a sounding sequence that is a same number as indicated in the NDPA 1110 may indicate that the ISTA-to-RSTA LMR 1120 or RSTA-to-ISTA LMR 1118 is an immediate feedback and a sounding sequence that is less than the number indicated in the NDPA 1110 (e.g., by 1) indicates the feedback is delayed.

In some embodiments, for a ISTA-to-RSTA delayed mode the second LMR comprises feedback based on the previous sounding, where the feedback based on the previous sounding is a TOA and TOD reporting from the previous sounding. In some embodiments, the NDPA 1110 may indicate not indicate a sounding sequence. In some embodiments, ISTA-to-RSTA immediate mode, ISTA-to-RSTA delayed mode, RSTA-to-ISTA immediate mode, and RSTA-to-ISTA delayed mode may be termed differently, e.g., immediate mode and delayed mode. In some embodiments, the ISTA-to-RSTA mode and RSTA-to-ISTA mode are both either delayed or immediate. In some embodiments, the ISTA-to-RSTA mode and RSTA-to-ISTA mode may be determined from the sounding dialog token field (e.g., 1510), e.g., the RSTA 804 may store the value of the previous sounding token field and if the two values are equal then the mode is delayed otherwise the mode is immediate.

Method 2000 may be performed by an ISTA 1102, a RSTA 1104, an apparatus of an ISTA 1102, or an apparatus of a RSTA 1104. Method 2000 may perform the operations in a different order and may include additional operations or may not include all the operations of method 2000.

The following first examples pertain to further embodiments. Example 1 is an apparatus of an initiator station (ISTA), the apparatus including memory; and processing circuitry coupled to the memory, the processing circuitry configured to: encode a null data packet announce (NDPA) frame; generate signaling to cause the ISTA to transmit the NDPA frame to a responder station (RSTA); encode a first null data packet (NDP); generate signal to cause the ISTA to transmit the first NDP at a time T1 to the RSTA; decode a second NDP, the second NDP from the RSTA, where the second NDP is received at a time T4; decode a first location measurement report (LMR), the first LMR including first channel state information (CSI) reporting or first time of arrival (TOA) and time of departure (TOD) reporting from the RSTA; and in response to an ISTA-to-RSTA feedback agreement between the RSTA and ISTA indicating the RSTA is to send a second LMR, encode the second LMR, the second LMR including a second CSI reporting or a second TOA TOD reporting, where the second TOA TOD reporting is based on time T1 and time T4, and generate signaling to cause the ISTA to transmit the second LMR to the RSTA.

In Example 2, the subject matter of Example 1 optionally includes where the processing circuitry is further configured to: generate signaling to cause the ISTA to transmit the second LMR to the RSTA a short interface space (SIFS) after receiving the first LMR.

In Example 3, the subject matter of any one or more of Examples 1-2 optionally include where the processing circuitry is further configured to: decode a fine timing measurement (FTM) frame and determine that the ISTA-to-RSTA feedback agreement between the RSTA and ISTA indicates the RSTA is to send the second LMR based on a value of one or more fields of the FTM frame.

In Example 4, the subject matter of any one or more of Examples 1-3 optionally include where the processing circuitry is further configured to: encode the second LMR to indicate an error if the second NDP is not received correctly by the ISTA.

In Example 5, the subject matter of any one or more of Examples 1-4 optionally include indicating when the second NDP was transmitted by the RSTA.

In Example 6, the subject matter of any one or more of Examples 1-5 optionally include where the processing circuitry is further configured to: determine a round trip time (RTT) based on ((the time T4–the time T1)–(the time T3–the time T2)).

In Example 7, the subject matter of Example 6 optionally includes where the processing circuitry is further configured to: determine a distance from the RSTA based on the RTT.

In Example 8, the subject matter of any one or more of Examples 1-7 optionally include where the processing circuitry is further configured to: encode a trigger based (TB) physical Layer Convergence Procedure (PLCP) Protocol Data Unit (PPDU) to comprise the second LMR; and generate signaling to cause the ISTA to transmit the TB PPDU to the RSTA.

In Example 9, the subject matter of any one or more of Examples 1-8 optionally include where the processing circuitry is further configured to: if a reporting type is delayed, encode the second LMR, the second LMR including a third CSI reporting or a third TOA TOD reporting, where the third TOA TOD reporting and the third CSI are based on a previous round of fine timing measurements, and otherwise if the reporting type is immediate encode the second LMR, the second LMR including the second CSI reporting or the second TOA TOD reporting, where the second TOA TOD reporting is based on time T1 and time T4.

In Example 10, the subject matter of any one or more of Examples 1-9 optionally include where the second CSI reporting is determined based on measured signals in receiving the second NDP.

In Example 11, the subject matter of any one or more of Examples 1-10 optionally include where the processing circuitry is further configured to: encode a physical Layer Convergence Procedure (PLCP) Protocol Data Unit (PPDU) to comprise the NDPA frame, the NDPA frame including an association identification (AID) of the RSTA; and generate signaling to cause the ISTA to transmit the PPDU to the RSTA.

In Example 12, the subject matter of any one or more of Examples 1-11 optionally include where the processing circuitry is further configured to: encode the NDPA frame to comprise a sounding dialog token field to indicate a previous fine timing measurement (FTM) round; and decode the first LMR, the first LMR including the first CSI reporting or the first TOA and TOD reporting from the RSTA, where the first CSI reporting or the first TOA and TOD reporting is for the previous FTM round.

In Example 13, the subject matter of any one or more of Examples 1-12 optionally include In Example 14, the subject matter of any one or more of Examples 1-13 optionally include transceiver circuitry coupled to the processing circuitry; and one or more antennas coupled to the transceiver circuitry.

Example 15 is a method performed by an apparatus of an initiator station (ISTA), the method including: encoding a null data packet announce (NDPA) frame; generating signaling to cause the ISTA to transmit the NDPA frame to a responder station (RSTA); encoding a first null data packet (NDP); generating signal to cause the ISTA to transmit the first NDP at a time T1 to the RSTA; decoding a second NDP, the second NDP from the RSTA, where the second NDP is received at a time T4; decoding a first location measurement report (LMR), the first LMR including first channel state information (CSI) reporting or first time of arrival (TOA) and time of departure (TOD) reporting from the RSTA; and in response to an ISTA-to-RSTA feedback agreement between the RSTA and ISTA indicating the RSTA is to send a second LMR, encoding the second LMR, the second LMR including a second CSI reporting or a second TOA TOD reporting, where the second TOA TOD reporting is based on time T1 and time T4, and generating signaling to cause the ISTA to transmit the second LMR to the RSTA.

In Example 16, the subject matter of Example 15 optionally includes where the method further includes: generate signaling to cause the ISTA to transmit the second LMR to the RSTA a short interfrace space (SIFS) after receiving the first LMR.

Example 17 is a non-transitory computer-readable storage medium that stores instructions for execution by one or more processors of an apparatus of a responder station (RSTA), the instructions to configure the one or more processors to: decode a null data packet announce (NDPA) frame, the NDPA frame received from an initiator station (ISTA); decode a first null data packet (NDP), where the first NDP is received at a time T2; encode a second NDP; generate signaling to cause the second NDP to be transmitted at a time T3 to the ISTA; encode a first location measurement report (LMR), the first LMR including first channel state information (CSI) reporting or first time of arrival (TOA) and time of departure (TOD), the first TOA and TOD based on the time T2 and the time T3; generate signaling to cause the first LMR to be transmitted to the ISTA; and in response to an ISTA-to-RSTA feedback agreement between the RSTA and ISTA indicating the ISTA is to transmit a second LMR to the RSTA, decode the second LMR, the second LMR including a second CSI reporting or a second TOA TOD reporting.

In Example 18, the subject matter of Example 17 optionally includes where the instructions further configure the one or more processors to: generate signaling to cause the first LMR to be transmitted to the ISTA a short interfrace space (SIFS) after receiving the first LMR.

In Example 19, the subject matter of any one or more of Examples 17-18 optionally include where the instructions further configure the one or more processors to: decode a fine timing measurement (FTM) frame and determine that the ISTA-to-RSTA feedback agreement between the RSTA and ISTA indicates the RSTA is to send the second LMR based on a value of one or more fields of the FTM frame.

In Example 20, the subject matter of any one or more of Examples 17-19 optionally include where the instructions further configure the one or more processors to: decode the NDPA frame, the NDP frame including a sounding dialog token field to indicate a previous fine timing measurement (FTM) round; and encode the first LMR, the first LMR including the first CSI reporting or the first TOA and TOD reporting from the RSTA, where the first CSI reporting or the first TOA and TOD reporting is for the previous FTM round.

In Example 21, the subject matter of any one or more of Examples 17-20 optionally include where the instructions further configure the one or more processors to: if a reporting type is delayed, encode the first LMR, the first LMR including a third CSI reporting or a third TOA TOD reporting, where the third TOA TOD reporting and the third CSI are based on a previous round of fine timing measurements, and otherwise if the reporting type is immediate, encode the first LMR, the first LMR including first CSI reporting or first TOA and TOD, the first TOA and TOD based on the time T2 and the time T3.

Example 22 is an apparatus of an initiator station (ISTA), the apparatus including memory; and processing circuitry coupled to the memory, the processing circuitry configured to: encode a null data packet announce (NDPA) frame for transmission to a responder station (RSTA), the NDPA frame; encode a first null data packet (NDP) for transmission at a time T1 to the RSTA; decode a second NDP, the second NDP received from the RSTA, where the second NDP is received at a time T4; decode a first location measurement report (LMR), where for an immediate mode the first LMR includes feedback based on a current sounding indicated by the sounding sequence number and for a delayed mode the first LMR includes feedback based on a previous sounding, where the feedback based on the current sounding includes first channel state information (CSI) reporting or first time of arrival (TOA) and time of departure (TOD) reporting; and in response to a LMR feedback agreement between the RSTA and ISTA indicating the ISTA is to send a second LMR, encode a second LMR, where for an immediate mode the second LMR includes feedback based on the current sounding and for a delayed mode the second LMR includes feedback based on the previous sounding, where the feedback based on the current sounding is a second CSI reporting or a second TOA and TOD reporting, where the second TOA and TOD reporting is based on the time T1 and the time T4, and generate signaling to cause the ISTA to transmit the second LMR to the RSTA.

The following first examples pertain to further embodiments. Example 1 is an apparatus of an initiator station (ISTA), the apparatus including memory; and processing circuitry coupled to the memory, the processing circuitry configured to: encode a null data packet announce (NDPA) frame for transmission to a responder station (RSTA), the NDPA frame indicating a sounding sequence number; encode a first null data packet (NDP) for transmission at a time T1 to the RSTA; decode a second NDP, the second NDP received from the RSTA, where the second NDP is received at a time T4; decode a first location measurement report (LMR), where for an RSTA-to-ISTA immediate mode the first LMR includes feedback based on a current sounding indicated by the sounding sequence number and for a RSTA-to-ISTA delayed mode the first LMR includes feedback based on a previous sounding indicated by the sounding sequence number minus 1, where the feedback based on the current sounding includes first channel state information (CSI) reporting or first time of arrival (TOA) and time of departure (TOD) reporting; and in response to an ISTA-to-RSTA LMR feedback agreement between the RSTA and ISTA indicating the ISTA is to send a second LMR, encode a second LMR, where for a ISTA-to-RSTA immediate mode the second LMR includes feedback based on the current sounding and for a ISTA-to-RSTA delayed mode the second LMR includes feedback based on the previous sounding, where the feedback based on the current sounding is a second CSI reporting or a second TOA and TOD reporting, where the second TOA and TOD reporting is based on the time T1 and the time T4, and generate signaling to cause the ISTA to transmit the second LMR to the RSTA.

In Example 2, the subject matter of Example 1 optionally includes where the processing circuitry is further configured to: refrain from acknowledging the first LMR. In Example 3, the subject matter of any one or more of Examples 1-2 optionally include where the processing circuitry is further configured to: after encode the NDPA frame, generate signaling to cause the ISTA to transmit the NDPA frame to a responder station (RSTA); and after the encode the NDP for transmission, generate signaling to cause the ISTA to transmit the NDPA frame to a responder station (RSTA).

In Example 4, the subject matter of any one or more of Examples 1-3 optionally include where the processing circuitry is further configured to: decode a fine timing measurement (FTM) response frame and determine that the ISTA-to-RSTA LMR feedback agreement between the RSTA and ISTA indicates the ISTA is to send the second LMR based on a value of one or more fields of the FTM response frame.

In Example 5, the subject matter of any one or more of Examples 1-4 optionally include where the processing circuitry is further configured to: encode the second LMR to indicate an error if the second NDP is not received correctly by the ISTA.

In Example 6, the subject matter of any one or more of Examples 1-5 optionally include indicating when the second NDP was transmitted by the RSTA. In Example 7, the subject matter of any one or more of Examples 1-6 optionally include where the processing circuitry is further configured to: determine a round trip time (RTT) based on ((the time T4–the time T1)–(the time T3–the time T2)).

In Example 8, the subject matter of any one or more of Examples 1-7 optionally include where the processing circuitry is further configured to: encode a trigger based (TB) physical Layer Convergence Procedure (PLCP) Protocol Data Unit (PPDU) to comprise the second LMR; and generate signaling to cause the ISTA to transmit the TB PPDU to the RSTA.

In Example 9, the subject matter of any one or more of Examples 1-8 optionally include where the processing circuitry is further configured to: encode the second LMR to comprise a dialog token field, where if the ISTA-to-RSTA immediate mode is equal to immediate, set a value of the dialog token field to be the sounding sequence number, and if ISTA-to-RSTA immediate mode is delayed, set the value of the value of the dialog token field to be the sounding sequence number minus 1.

In Example 10, the subject matter of any one or more of Examples 1-9 optionally include where the second CSI reporting is determined based on measured signals from one or more of the following group: measures signals in receiving the NDPA frame, measures signals in receiving the second NDP, measured signals a short interframe space (SIFS) before or after receiving the NDPA frame, and measured signals from the SIFS before or after the second NDP.

In Example 11, the subject matter of any one or more of Examples 1-10 optionally include where the processing circuitry is further configured to: encode a physical Layer Convergence Procedure (PLCP) Protocol Data Unit (PPDU) to comprise the NDPA frame, the NDPA frame including an association identification (AID) of the RSTA; and generate signaling to cause the ISTA to transmit the PPDU to the RSTA.

In Example 12, the subject matter of any one or more of Examples 1-11 optionally include wherein the ISTA and the RSTA are configured to operate in accordance with one or more of the following communication standards: an Institute of Electrical and Electronic Engineers (IEEE) 802.11ax, an IEEE 802.11 extremely-high throughput (EHT), IEEE 802.11az, and IEEE 802.11.

In Example 13, the subject matter of any one or more of Examples 1-12 optionally include transceiver circuitry coupled to the processing circuitry; and one or more antennas coupled to the transceiver circuitry.

Example 14 is a method performed by an apparatus of an initiator station (ISTA), the method including: encoding a null data packet announce (NDPA) frame for transmission to a responder station (RSTA), the NDPA frame indicating a sounding sequence number; encoding a first null data packet (NDP) for transmission at a time T1 to the RSTA; decoding a second NDP, the second NDP received from the RSTA, where the second NDP is received at a time T4; decoding a first location measurement report (LMR), where for an RSTA-to-ISTA immediate mode the first LMR includes feedback based on a current sounding indicated by the sounding sequence number and for a RSTA-to-ISTA delayed mode the first LMR includes feedback based on a previous sounding indicated by the sounding sequence number minus 1, where the feedback based on the current sounding includes first channel state information (CSI) reporting or first time of arrival (TOA) and time of departure (TOD) reporting; and in response to an ISTA-to-RSTA LMR feedback agreement between the RSTA and ISTA indicating the ISTA is to send a second LMR, encoding a second LMR, where for a ISTA-to-RSTA immediate mode the second LMR includes feedback based on the current sounding and for a ISTA-to-RSTA delayed mode the second LMR includes feedback based on the previous sounding, where the feedback based on the current sounding is a second CSI reporting or a second TOA and TOD reporting, where the second TOA and TOD reporting is based on the time T1 and the time T4, and generating signaling to cause the ISTA to transmit the second LMR to the RSTA.

In Example 15, the subject matter of Example 14 optionally includes indicating when the second NDP was transmitted by the RSTA. Example 16 is a non-transitory computer-readable storage medium that stores instructions for execution by one or more processors of an apparatus of a responder station (RSTA), the instructions to configure the one or more processors to: decode a null data packet announce (NDPA) frame, the NDPA frame received from an initiator station (ISTA); decode a first null data packet (NDP), where the first NDP is received at a time T2; encode a second NDP; generate signaling to cause the second NDP to be transmitted at a time T3 to the ISTA; encode a first location measurement report (LMR), the first LMR including first channel state information (CSI) reporting or first time of arrival (TOA) and time of departure (TOD) reporting, the first TOA and TOD reporting based on the time T2 and the time T3; generate signaling to cause the first LMR to be transmitted to the ISTA; and in response to an ISTA-to-RSTA LMR feedback agreement between the RSTA and ISTA indicating the ISTA is to transmit a second LMR to the RSTA, decode the second LMR, the second LMR including a second CSI reporting or a second TOA and TOD reporting.

In Example 17, the subject matter of Example 16 optionally includes where the instructions further configure the one or more processors to: generate signaling to cause the first LMR to be transmitted to the ISTA a short interfrace space (SIFS) after transmitting the second NDP.

In Example 18, the subject matter of any one or more of Examples 16-17 optionally include where the instructions further configure the one or more processors to: encode a fine timing measurement (FTM) response frame and determine that the ISTA-to-RSTA LMR feedback agreement between the RSTA and ISTA indicates the ISTA is to send the second LMR based on a value of one or more fields of the FTM response frame; and generate signaling to cause the FTM response frame to be transmitted to ISTA.

In Example 19, the subject matter of any one or more of Examples 16-18 optionally include where the instructions further configure the one or more processors to: decode the NDPA frame, the NDPA frame including a sounding dialog token field to identify a fine timing measurement (FTM) sequence; and encode the first LMR, the first LMR including a dialog token field and the first CSI reporting or the first TOA and TOD reporting from the RSTA, where if the dialog token field in the first LMR equals to the sounding dialog token in the NDPA frame, the LMR report type is immediate and if the dialog token field in the first LMR equals to the sounding dialog token indicated in a NDPA minus one from the NDPA, the LMR reporting type is delayed.

In Example 20, the subject matter of any one or more of Examples 16-19 optionally include where the instructions further configure the one or more processors to: if a reporting type is delayed, encode the first LMR, the first LMR including a third CSI reporting or a third TOA TOD reporting, where the third TOA TOD reporting and the third CSI are based on a previous round of fine timing measurements, and otherwise if the reporting type is immediate, encode the first LMR, the first LMR including first CSI reporting or first TOA and TOD, the first TOA and TOD based on the time T2 and the time T3.

Example 21 is a non-transitory computer-readable storage medium that stores instructions for execution by one or more processors of an apparatus of an initiator station (ISTA), the instructions to configure the one or more processors to: encode a null data packet announce (NDPA) frame for transmission to a responder station (RSTA), the NDPA frame indicating a sounding sequence number; encode a first null data packet (NDP) for transmission at a time T1 to the RSTA; decode a second NDP, the second NDP received from the RSTA, where the second NDP is received at a time T4; decode a first location measurement report (LMR), where for an RSTA-to-ISTA immediate mode the first LMR includes feedback based on a current sounding indicated by the sounding sequence number and for a RSTA-to-ISTA delayed mode the first LMR includes feedback based on a previous sounding indicated by the sounding sequence number minus 1, where the feedback based on the current sounding includes first channel state information (CSI) reporting or first time of arrival (TOA) and time of departure (TOD) reporting; and in response to an ISTA-to-RSTA LMR feedback agreement between the RSTA and ISTA indicating the ISTA is to send a second LMR, encode a second LMR, where for a ISTA-to-RSTA immediate mode the second LMR includes feedback based on the current sounding and for a ISTA-to-RSTA delayed mode the second LMR includes feedback based on the previous sounding, where the feedback based on the current sounding is a second CSI reporting or a second TOA and TOD reporting, where the second TOA and TOD reporting is based on the time T1 and the time T4, and generate signaling to cause the ISTA to transmit the second LMR to the RSTA.

In Example 22, the subject matter of Example 21 optionally includes where the instructions further configure the one or more processors to: refrain from acknowledging the first LMR. In Example 23, the subject matter of any one or more of Examples 21-22 optionally include where the instructions further configure the one or more processors to: after encode the NDPA frame, generate signaling to cause the ISTA to transmit the NDPA frame to a responder station (RSTA); and after the encode the NDP for transmission, generate signaling to cause the ISTA to transmit the NDPA frame to a responder station (RSTA).

In Example 24, the subject matter of any one or more of Examples 21-23 optionally include where the instructions further configure the one or more processors to: decode a fine timing measurement (FTM) response frame and determine that the ISTA-to-RSTA LMR feedback agreement between the RSTA and ISTA indicates the ISTA is to send the second LMR based on a value of one or more fields of the FTM response frame.

In Example 25, the subject matter of any one or more of Examples 21-24 optionally include where the instructions further configure the one or more processors to: encode the second LMR to indicate an error if the second NDP is not received correctly by the ISTA.

In Example 26, the subject matter of any one or more of Examples 21-25 optionally include indicating when the second NDP was transmitted by the RSTA. In Example 27, the subject matter of any one or more of Examples 21-26 optionally include where the instructions further configure the one or more processors to: determine a round trip time (RTT) based on ((the time T4–the time T1)–(the time T3–the time T2)).

In Example 28, the subject matter of any one or more of Examples 21-27 optionally include where the instructions further configure the one or more processors to: encode a trigger based (TB) physical Layer Convergence Procedure (PLCP) Protocol Data Unit (PPDU) to comprise the second LMR; and generate signaling to cause the ISTA to transmit the TB PPDU to the RSTA.

In Example 29, the subject matter of any one or more of Examples 21-28 optionally include where the instructions further configure the one or more processors to: encode the second LMR to comprise a dialog token field, where if the ISTA-to-RSTA immediate mode is equal to immediate, set a value of the dialog token field to be the sounding sequence number, and if ISTA-to-RSTA immediate mode is delayed, set the value of the value of the dialog token field to be the sounding sequence number minus 1.

In Example 30, the subject matter of any one or more of Examples 21-29 optionally include where the second CSI reporting is determined based on measured signals from one or more of the following group: measures signals in receiving the NDPA frame, measures signals in receiving the second NDP, measured signals a short interframe space (SIFS) before or after receiving the NDPA frame, and measured signals from the SIFS before or after the second NDP.

Example 31 is an apparatus of an initiator station (ISTA), the apparatus including: means for encoding a null data packet announce (NDPA) frame for transmission to a responder station (RSTA), the NDPA frame indicating a sounding sequence number; means for encoding a first null data packet (NDP) for transmission at a time T1 to the RSTA; means for decoding a second NDP, the second NDP received from the RSTA, where the second NDP is received at a time T4; means for decoding a first location measurement report (LMR), where for an RSTA-to-ISTA immediate mode the first LMR includes feedback based on a current sounding indicated by the sounding sequence number and for a RSTA-to-ISTA delayed mode the first LMR includes feedback based on a previous sounding indicated by the sounding sequence number minus 1, where the feedback based on the current sounding includes first channel state information (CSI) reporting or first time of arrival (TOA) and time of departure (TOD) reporting; and in response to an ISTA-to-RSTA LMR feedback agreement between the RSTA and ISTA indicating the ISTA is to send a second LMR, means for encoding a second LMR, where for a ISTA-to-RSTA immediate mode the second LMR includes feedback based on the current sounding and for a ISTA-to-RSTA delayed mode the second LMR includes feedback based on the previous sounding, where the feedback based on the current sounding is a second CSI reporting or a second TOA and TOD reporting, where the second TOA and TOD reporting is based on the time T1 and the time T4, and means for generating signaling to cause the ISTA to transmit the second LMR to the RSTA.

In Example 32, the subject matter of Example 31 optionally includes indicating when the second NDP was transmitted by the RSTA. Example 33 is an apparatus of a responder station (RSTA), the apparatus including memory; and processing circuitry coupled to the memory, the processing circuitry configured to: decode a null data packet announce (NDPA) frame, the NDPA frame received from an initiator station (ISTA); decode a first null data packet (NDP), where the first NDP is received at a time T2; encode a second NDP; generate signaling to cause the second NDP to be transmitted at a time T3 to the ISTA; encode a first location measurement report (LMR), the first LMR including first channel state information (CSI) reporting or first time of arrival (TOA) and time of departure (TOD) reporting, the first TOA and TOD reporting based on the time T2 and the time T3; generate signaling to cause the first LMR to be transmitted to the ISTA; and in response to an ISTA-to-RSTA LMR feedback agreement between the RSTA and ISTA indicating the ISTA is to transmit a second LMR to the RSTA, decode the second LMR, the second LMR including a second CSI reporting or a second TOA and TOD reporting.

In Example 34, the subject matter of Example 33 optionally includes where the instructions further configure the one or more processors to: generate signaling to cause the first LMR to be transmitted to the ISTA a short interfrace space (SIFS) after transmitting the second NDP.

In Example 35, the subject matter of any one or more of Examples 33-34 optionally include where the instructions further configure the one or more processors to: encode a fine timing measurement (FTM) response frame and determine that the ISTA-to-RSTA LMR feedback agreement between the RSTA and ISTA indicates the ISTA is to send the second LMR based on a value of one or more fields of the FTM response frame; and generate signaling to cause the FTM response frame to be transmitted to ISTA.

In Example 36, the subject matter of any one or more of Examples 33-35 optionally include where the instructions further configure the one or more processors to: decode the NDPA frame, the NDPA frame including a sounding dialog token field to identify a fine timing measurement (FTM)

sequence; and encode the first LMR, the first LMR including a dialog token field and the first CSI reporting or the first TOA and TOD reporting from the RSTA, where if the dialog token field in the first LMR equals to the sounding dialog token in the NDPA frame, the LMR report type is immediate and if the dialog token field in the first LMR equals to the sounding dialog token indicated in a NDPA minus one from the NDPA, the LMR reporting type is delayed.

In Example 37, the subject matter of any one or more of Examples 33-36 optionally include where the instructions further configure the one or more processors to: if a reporting type is delayed, encode the first LMR, the first LMR including a third CSI reporting or a third TOA TOD reporting, where the third TOA TOD reporting and the third CSI are based on a previous round of fine timing measurements, and otherwise if the reporting type is immediate, encode the first LMR, the first LMR including first CSI reporting or first TOA and TOD, the first TOA and TOD based on the time T2 and the time T3.

Example 38 is a method performed by a responder station (RSTA), the method including: decoding a null data packet announce (NDPA) frame, the NDPA frame received from an initiator station (ISTA); decoding a first null data packet (NDP), where the first NDP is received at a time T2; encoding a second NDP; generating signaling to cause the second NDP to be transmitted at a time T3 to the ISTA; encoding a first location measurement report (LMR), the first LMR including first channel state information (CSI) reporting or first time of arrival (TOA) and time of departure (TOD) reporting, the first TOA and TOD reporting based on the time T2 and the time T3; generating signaling to cause the first LMR to be transmitted to the ISTA; and in response to an ISTA-to-RSTA LMR feedback agreement between the RSTA and ISTA indicating the ISTA is to transmit a second LMR to the RSTA, decoding the second LMR, the second LMR including a second CSI reporting or a second TOA and TOD reporting.

In Example 39, the subject matter of Example 38 optionally includes where the method further includes: generating signaling to cause the first LMR to be transmitted to the ISTA a short interfrace space (SIFS) after transmitting the second NDP.

In Example 40, the subject matter of any one or more of Examples 38-39 optionally include where the method further includes: encoding a fine timing measurement (FTM) response frame and determine that the ISTA-to-RSTA LMR feedback agreement between the RSTA and ISTA indicates the ISTA is to send the second LMR based on a value of one or more fields of the FTM response frame; and generating signaling to cause the FTM response frame to be transmitted to ISTA.

In Example 41, the subject matter of any one or more of Examples 38-40 optionally include where the method further includes: decoding the NDPA frame, the NDPA frame including a sounding dialog token field to identify a fine timing measurement (FTM) sequence; and encoding the first LMR, the first LMR including a dialog token field and the first CSI reporting or the first TOA and TOD reporting from the RSTA, where if the dialog token field in the first LMR equals to the sounding dialog token in the NDPA frame, the LMR report type is immediate and if the dialog token field in the first LMR equals to the sounding dialog token indicated in a NDPA minus one from the NDPA, the LMR reporting type is delayed.

In Example 42, the subject matter of any one or more of Examples 38-41 optionally include where the method further includes: if a reporting type is delayed, encoding the first LMR, the first LMR including a third CSI reporting or a third TOA TOD reporting, where the third TOA TOD reporting and the third CSI are based on a previous round of fine timing measurements, and otherwise if the reporting type is immediate, encoding the first LMR, the first LMR including first CSI reporting or first TOA and TOD, the first TOA and TOD based on the time T2 and the time T3.

Example 43 is an apparatus of a responder station (RSTA), the apparatus including: means for decoding a null data packet announce (NDPA) frame, the NDPA frame received from an initiator station (ISTA); means for decoding a first null data packet (NDP), where the first NDP is received at a time T2; means for encoding a second NDP; means for generating signaling to cause the second NDP to be transmitted at a time T3 to the ISTA; means for encoding a first location measurement report (LMR), the first LMR including first channel state information (CSI) reporting or first time of arrival (TOA) and time of departure (TOD) reporting, the first TOA and TOD reporting based on the time T2 and the time T3; means for generating signaling to cause the first LMR to be transmitted to the ISTA; and in response to an ISTA-to-RSTA LMR feedback agreement between the RSTA and ISTA indicating the ISTA is to transmit a second LMR to the RSTA, means for decoding the second LMR, the second LMR including a second CSI reporting or a second TOA and TOD reporting.

In Example 44, the subject matter of Example 43 optionally includes where the apparatus further includes: means for generating signaling to cause the first LMR to be transmitted to the ISTA a short interfrace space (SIFS) after transmitting the second NDP.

In Example 45, the subject matter of any one or more of Examples 43-44 optionally include where the apparatus further includes: means for encoding a fine timing measurement (FTM) response frame and determine that the ISTA-to-RSTA LMR feedback agreement between the RSTA and ISTA indicates the ISTA is to send the second LMR based on a value of one or more fields of the FTM response frame; and means for generating signaling to cause the FTM response frame to be transmitted to ISTA.

In Example 46, the subject matter of any one or more of Examples 43-45 optionally include where the apparatus further includes: means for decoding the NDPA frame, the NDPA frame including a sounding dialog token field to identify a fine timing measurement (FTM) sequence; and means for encoding the first LMR, the first LMR including a dialog token field and the first CSI reporting or the first TOA and TOD reporting from the RSTA, where if the dialog token field in the first LMR equals to the sounding dialog token in the NDPA frame, the LMR report type is immediate and if the dialog token field in the first LMR equals to the sounding dialog token indicated in a NDPA minus one from the NDPA, the LMR reporting type is delayed.

In Example 47, the subject matter of any one or more of Examples 43-46 optionally include where the apparatus further includes: if a reporting type is delayed, means for encoding the first LMR, the first LMR including a third CSI reporting or a third TOA TOD reporting, where the third TOA TOD reporting and the third CSI are based on a previous round of fine timing measurements, and otherwise if the reporting type is immediate, means for encoding the first LMR, the first LMR including first CSI reporting or first TOA and TOD, the first TOA and TOD based on the time T2 and the time T3.

Example 48 is an apparatus of a responder station (RSTA), the apparatus including memory; and processing circuitry coupled to the memory, the processing circuitry configured to: decode a null data packet announce (NDPA) frame from a initiator station (ISTA), the NDPA frame indicating a sounding sequence number; decode a first null data packet (NDP), where the first NDP is received at a time t2.

In Example 49, the subject matter of Example 48 optionally includes where the processing circuitry is further configured to: refrain from acknowledging the second LMR.

In Example 50, the subject matter of any one or more of Examples 48-49 optionally include where the processing circuitry is further configured to: after encode the first LMR, generate signaling to cause the RSTA to transmit the first LMR to the ISTA.

In Example 51, the subject matter of any one or more of Examples 48-50 optionally include transceiver circuitry coupled to the processing circuitry; and one or more antennas coupled to the transceiver circuitry.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an initiating station (ISTA), the apparatus comprising memory; and processing circuitry coupled to the memory, the processing circuitry configured to:
   encode a null data packet announce (NDPA) frame for transmission to a responder station (RSTA), the NDPA frame comprising a sounding dialog token number field, the sounding dialog token number field indicating a value of a sounding dialog token counter;
   encode an uplink (UL) null data packet (NDP) for transmission to the RSTA at a time of departure (TOD);
   decode a downlink (DL) NDP, the DL NDP received from the RSTA, wherein the DL NDP is received at a time of arrival (TOA);
   decode a RSTA-to-ISTA location measurement report (LMR) from the RSTA, the RSTA-to-ISTA LMR comprising a dialog token field and feedback, wherein the immediate feedback the dialog token field indicates the value of the sounding dialog token counter and the feedback comprises a TOA at the RSTA of the UL NDP and a TOD at the RSTA of the DL NDP, and for delayed feedback the dialog token field indicates a previous value of the sounding dialog token counter and the feedback indicates a TOA at the RSTA of a previous UL NDP and a TOD at the RSTA of a previous DL NDP; and
   in response to a previous indication that the ISTA is to transmit an ISTA-to-RSTA LMR to the RSTA,
   encode an ISTA-to-RSTA LMR, the ISTA-to-RSTA LMR comprising the dialog token field and feedback, wherein for the immediate feedback the dialog token field indicates the value of the sounding dialog token counter and the feedback comprises the TOD at the ISTA of the UL NDP and the TOA at the ISTA of the DL NDP, and for the delayed feedback the dialog token field indicates the previous value of the sounding dialog token counter and the feedback comprises a TOD at the ISTA of a previous UL NDP and a TOA at the ISTA of a previous DL NDP, and generate signaling to cause the ISTA to transmit the ISTA-TO-RSTA LMR to the RSTA.

2. The apparatus of claim 1, wherein the processing circuitry is further configured to:
   encode the ISTA-TO-RSTA LMR to indicate an error if the DL NDP is not received correctly by the ISTA.

3. The apparatus of claim 1, wherein the processing circuitry is further configured to:
   decode a fine timing measurement (FTM) frame and determine that the feedback of the RSTA-to-ISTA LMR is the delayed feedback based on a field of the FTM frame indicating delayed feedback.

4. The apparatus of claim 1, wherein the processing circuitry is further configured to:
   decode a frame from the RSTA, the frame comprising the indication that the ISTA is to transmit the ISTA-to-RSTA LMR.

5. The apparatus of claim 1, wherein the processing circuitry is further configured to:
   refrain from acknowledging the RSTA-to-ISTA LMR.

6. The apparatus of claim 1, wherein the processing circuitry is further configured to:
   wait a fixed interval; and
   encode a second NDPA frame for transmission to the RSTA, the second NDPA frame comprising the sounding dialog token number field, the sounding dialog token number field indicating a value of one plus the value of the sounding dialog token counter.

7. The apparatus of claim 1, wherein decode the RSTA-to-ISTA LMR from the RSTA further comprises:
   decode the RSTA-to-ISTA LMR from the RSTA, the RSTA-to-ISTA comprising a field to indicate whether an error occurred in decoding the UL NDP or in transmitting the DL NDP.

8. The apparatus of claim 1, wherein the processing circuitry is further configured to:
   after encode the NDPA frame, generate signaling to cause the ISTA to transmit the NDPA frame to the RSTA; and
   after the encode the UL NDP for transmission, generate signaling to cause the ISTA to transmit the UL NDP to the RSTA.

9. The apparatus of claim 1, wherein the processing circuitry is further configured to:
   determine a round trip time (RTT) based on ((the TOA at the ISTA of the DL NDP–the TOD at the ISTA of the UL NDP)–(the TOD at the RSTA of the DL NDP–the TOA at the RSTA of the UL NDP)).

10. The apparatus of claim 1, wherein the processing circuitry is further configured to:
    encode a trigger based (TB) physical Layer Convergence Procedure (PLCP) Protocol Data Unit (PPDU) to comprise the ISTA-to-RSTA LMR; and
    generate signaling to cause the ISTA to transmit the TB PPDU to the RSTA.

11. The apparatus of claim 1, wherein the processing circuitry is further configured to:
    encode the ISTA-RSTA LMR to comprise channel state information (CSI), the CSI determined based on measured signals from one or more of measured signals in receiving the DL NDP frame, measured signals a short interframe space (SIFS) before receiving the DL NDP frame, or measured signals the SIFS after receiving the DL NDP frame.

12. The apparatus of claim 1, wherein generate signaling to cause the ISTA to transmit the ISTA-TO-RSTA LMR to the RSTA further comprises:
    generate signaling to cause the ISTA to transmit the ISTA-TO-RSTA LMR to the RSTA a short interframe space (SIFS) after receiving the RSTA-TO-ISTA LMR.

13. The apparatus of claim 1, wherein the ISTA and the RSTA are configured to operate in accordance with one or more of the following communication standards: an Institute of Electrical and Electronic Engineers (IEEE) 802.1 lax, an IEEE 802.11 extremely-high throughput (EHT), IEEE 802.11 az, and IEEE 802.11.

14. The apparatus of claim 1, further comprising a direct conversion mixer, the direct conversion mixer configured to directly downconvert radio frequency (RF) signals to baseband signals, wherein the processing circuitry is configured to decode the baseband signals, the baseband signals including the DL NDP.

15. The apparatus of claim 1, further comprising transceiver circuitry coupled to the processing circuitry, the transceiver circuitry coupled to two or more microstrip antennas for transmitting signaling in accordance with a multiple-input multiple-output (MIMO) technique.

16. A non-transitory computer-readable storage medium that stores instructions for execution by one or more processors of an apparatus of a initiator station (ISTA), the instructions to configure the one or more processors to:
- encode a null data packet announce (NDPA) frame for transmission to a responder station (RSTA), the NDPA frame comprising a sounding dialog token number field, the sounding dialog token number field indicating a value of a sounding dialog token counter;
- encode an uplink (UL) null data packet (NDP) for transmission to the RSTA at a time of departure (TOD);
- decode a downlink (DL) NDP, the DL NDP received from the RSTA, wherein the DL NDP is received at a time of arrival (TOA);
- decode a RSTA-to-ISTA location measurement report (LMR) from the RSTA, the RSTA-to-ISTA LMR comprising a dialog token field and feedback, wherein for immediate feedback the dialog token field indicates the value of the sounding dialog token counter and the feedback comprises a TOA at the RSTA of the UL NDP and a TOD at the RSTA of the DL NDP, and for delayed feedback the dialog token field indicates a previous value of the sounding dialog token counter and the feedback indicates a TOA at the RSTA of a previous UL NDP and a TOD at the RSTA of a previous DL NDP; and
- in response to a previous indication that the ISTA is to transmit an ISTA-to-RSTA LMR to the RSTA,
  - encode an ISTA-to-RSTA LMR, the ISTA-to-RSTA LMR comprising the dialog token field and feedback, wherein for the immediate feedback the dialog token field indicates the value of the sounding dialog token counter and the feedback comprises a TOD at the ISTA of the UL NDP and a TOA at the ISTA of the DL NDP, and for the delayed feedback the dialog token field indicates the previous value of the sounding dialog token counter and the feedback comprises a TOD at the ISTA of a previous UL NDP and a TOA at the ISTA of a previous DL NDP, and
  - generate signaling to cause the ISTA to transmit the ISTA-TO-RSTA LMR to the RSTA.

17. The non-transitory computer-readable storage medium of claim 16, wherein the instructions further configure the one or more processors to:
- encode the ISTA-RSTA LMR to indicate an error if the DL NDP is not received correctly by the ISTA.

18. A non-transitory computer-readable storage medium that stores instructions for execution by one or more processors of an apparatus of a responder station (RSTA), the instructions to configure the one or more processors to:
- decode a null data packet announce (NDPA) frame from an initiator station (ISTA), the NDPA frame comprising a sounding dialog token number field, the sounding dialog token number field indicating a value of a sounding dialog token counter;
- decode an uplink (UL) null data packet (NDP) from the ISTA at a time of arrival (TOA) at the RSTA of the UL NDP;
- encode a downlink (DL) NDP, the DL NDP for transmission to the ISTA, wherein the DL NDP is transmitted at a time of departure (TOD) at the RSTA;
- encode a RSTA-to-ISTA location measurement report (LMR), the RSTA-to-ISTA LMR comprising a dialog token field and feedback, wherein for immediate feedback the dialog token field indicates the value of the sounding dialog token counter and the feedback comprises the TOA at the RSTA of the UL NDP and the TOD at the RSTA of the DL NDP, and for delayed feedback the dialog token field indicates a previous value of the sounding dialog token counter and the feedback indicates the TOA at the RSTA of a previous UL NDP and the TOD at the RSTA of a previous DL NDP;
- generate signaling to cause the RSTA to transmit the RSTA-TO-ISTA LMR to the ISTA; and
- in response to a previous indication that the ISTA is to transmit an ISTA-to-RSTA LMR to the RSTA,
  - decode an ISTA-to-RSTA LMR, the ISTA-to-RSTA LMR comprising the dialog token field and feedback, wherein for the immediate feedback the dialog token field indicates the value of the sounding dialog token counter and the feedback comprises a TOD at the ISTA of the UL NDP and a TOA at the ISTA of the DL NDP, and for the delayed feedback the dialog token field indicates the previous value of the sounding dialog token counter and the feedback comprises TOD at the ISTA of a previous UL NDP and a TOA at the ISTA of a previous DL NDP.

19. The apparatus of claim 18, wherein the processing circuitry is further configured to:
- encode the RSTA-TO-ISTA LMR to indicate an error if the UL NDP is not received correctly by the RSTA.

20. The apparatus of claim 18, further comprising a direct conversion mixer, the direct conversion mixer configured to directly downconvert radio frequency (RF) signals to baseband signals, wherein the processing circuitry is configured to decode the baseband signals, the baseband signals including the UL NDP.

* * * * *